US011303476B2

United States Patent
Fujimoto et al.

(10) Patent No.: US 11,303,476 B2
(45) Date of Patent: Apr. 12, 2022

(54) COMMUNICATION APPARATUS, COMMUNICATION SYSTEM, COMMUNICATION CONTROL METHOD, COMMUNICATION PROGRAM AND DEVICE CONNECTION CONTROL PROGRAM

(71) Applicant: NEC CORPORATION, Tokyo (JP)

(72) Inventors: Go Fujimoto, Tokyo (JP); Tsukasa Kobayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 98 days.

(21) Appl. No.: 16/651,541

(22) PCT Filed: Jul. 12, 2018

(86) PCT No.: PCT/JP2018/026301
§ 371 (c)(1),
(2) Date: Mar. 27, 2020

(87) PCT Pub. No.: WO2019/064823
PCT Pub. Date: Apr. 4, 2019

(65) Prior Publication Data
US 2020/0267023 A1      Aug. 20, 2020

(30) Foreign Application Priority Data
Sep. 28, 2017   (JP) .............................. JP2017-188198

(51) Int. Cl.
*G06F 15/177* (2006.01)
*H04L 12/66* (2006.01)
(Continued)

(52) U.S. Cl.
CPC .............. *H04L 12/66* (2013.01); *H04L 45/74* (2013.01); *H04L 61/1511* (2013.01); *H04L 69/16* (2013.01); *H04L 69/22* (2013.01)

(58) Field of Classification Search
CPC ...... H04L 49/3009; H04L 47/10; H04L 69/22
(Continued)

(56) References Cited

U.S. PATENT DOCUMENTS 6,219,706 B1 * 4/2001 Fan ..................... H04L 63/0254
  709/225
9,026,712 B2   5/2015 Kwidzinski et al.
(Continued)

FOREIGN PATENT DOCUMENTS

JP    2006-067314 A    3/2006
JP    2008-165371 A    7/2008
(Continued)

OTHER PUBLICATIONS

Decision to Grand a Patent for corresponding JP 2017-188198, dated Feb. 5, 2019.
(Continued)

*Primary Examiner* — Wing F Chan
*Assistant Examiner* — Andrew Woo
(74) *Attorney, Agent, or Firm* — Sughrue Mion, PLLC

(57) ABSTRACT

A control means 111 sets, with respect to a packet transfer means 112, control information that defines an operation of the packet transfer means 112 according to header information of a packet. In a case of being set to a learning mode to learn a new record and in a case where an item corresponding to a condition that can be specified from an IP address is designated as an item a condition of which is to be learned, the control means 111 sets, in the packet transfer means 112, control information indicating permission for communication by a new packet when header information of the new packet is notified by the packet transfer means 112. Then, the control means 111 adds, to the list, a record in which a condition specified from an IP address in the header information is described in the designated item.

16 Claims, 34 Drawing Sheets

| ... | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | ... any | ... | www.sssss.com | any | any | Ethernet2 | |
| 2 | ... any | ... | www.ttttt.com | any | any | Ethernet1 | ADDED BY LEARNING |
| 3 | ... any | ... | any | /bin/abc | any | Ethernet1 | DESTINATION PORT NUMBER 20 AND 21 IS NOT PERMITTED |
| 4 | ... any | ... | any | /bin/def | any | Ethernet1 | ADDED BY LEARNING |
| 5 | ... any | ... | any | any | root | Ethernet2 | |
| 6 | ... any | ... | any | any | deamon | Ethernet1 | ADDED BY LEARNING |
| : | any | : | : | : | : | : | : |

(51) Int. Cl.
  *H04L 45/74* (2022.01)
  *H04L 61/4511* (2022.01)
  *H04L 69/16* (2022.01)
  *H04L 69/22* (2022.01)
(58) Field of Classification Search
  USPC .......................................... 709/220; 370/329
  See application file for complete search history.

(56) References Cited

U.S. PATENT DOCUMENTS

| | | |
|---|---|---|
| 2006/0037084 A1 | 2/2006 | Brown et al. |
| 2016/0299865 A1 | 10/2016 | Hetzler et al. |

FOREIGN PATENT DOCUMENTS

| | | |
|---|---|---|
| JP | 2009-239525 A | 10/2009 |
| JP | 2009-272659 A | 11/2009 |
| JP | 2010-502115 A | 1/2010 |
| JP | 2015-095789 A | 5/2015 |
| JP | 2015-525991 A | 9/2015 |
| JP | 2016-042319 A | 3/2016 |
| JP | 2016-178530 A | 10/2016 |
| JP | 2017-005402 A | 1/2017 |
| JP | 6114214 B2 | 4/2017 |
| JP | 2017-130963 A | 7/2017 |
| WO | 2012/144583 A1 | 10/2012 |
| WO | 2014/155699 A1 | 10/2014 |
| WO | 2017/073089 A1 | 5/2017 |

OTHER PUBLICATIONS

Decision for Grant a Patent for corresponding JP 2018-180337, dated Jan. 21, 2020.
International Search Report for PCT/JP2018/026301, dated Sep. 18, 2018.

* cited by examiner

FIG. 3

| | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | any | ... | www.sssss.com | any | any | Ethernet2 | |
| 2 | any | ... | www.tttt.com | any | any | Ethernet1 | ADDED BY LEARNING |
| 3 | any | ... | any | /bin/abc | any | Ethernet1 | DESTINATION PORT NUMBER 20 AND 21 IS NOT PERMITTED |
| 4 | any | ... | any | /bin/def | any | Ethernet1 | ADDED BY LEARNING |
| 5 | any | ... | any | any | root | Ethernet2 | |
| 6 | any | ... | any | any | deamon | Ethernet1 | ADDED BY LEARNING |
| : | : | ... | : | : | : | : | : |

FIG. 4

| | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | any | ... | www.sssss.com | any | any | Ethernet2 | |
| 2 | any | ... | www.ttttt.com | any | any | Ethernet1 | ADDED BY LEARNING |
| 3 | any | ... | any | /bin/abc | any | Ethernet1 | DESTINATION PORT NUMBER 20 AND 21 IS NOT PERMITTED |
| 4 | any | ... | any | /bin/def | any | Ethernet1 | ADDED BY LEARNING |
| 5 | any | ... | any | any | root | Ethernet2 | |
| 6 | any | ... | any | any | deamon | Ethernet1 | ADDED BY LEARNING |
| : | : | : | : | : | : | : | : |
| n-2 | 192.168.2.0/24 | ... | any | any | any | Ethernet2 | any |
| n-1 | 192.168.3.0/24 | ... | any | any | any | wlan0 | any |
| n | any | ... | any | any | any | Ethernet1 | any |

(n-2)TH TO nTH RECORD IS INITIAL ADDITION RECORD.

FIG. 5

| 1 | PERMIT COMMUNICATION TO www.sssss.com |
| 2 | PERMIT COMMUNICATION TO www.uuuuu.com (LEARNING MODE) |
| 3 | PERMIT COMMUNICATION OF /usr/bin/abc |
| 4 | PERMIT COMMUNICATION OF /usr/bin/def (LEARNING MODE) |

FIG. 6

| LEARNING CONDITION | INPUT INTERFACE | TRANS- MISSION SOURCE MAC ADDRESS | DESTINATION MAC ADDRESS | TRANS- MISSION SOURCE IP ADDRESS | DESTINATION IP ADDRESS | COMMUNICATION PROTOCOL | TRANS- MISSION SOURCE PORT NUMBER | DESTINATION PORT NUMBER | TRANS- MISSION SOURCE PROCESS NAME | DESTINATION PROCESS NAME |
|---|---|---|---|---|---|---|---|---|---|---|
| | | | | | | | | | | |

| TRANS- MISSION SOURCE DOMAIN NAME | DESTINATION DOMAIN NAME | USER NAME OF TRANSMISSION SOURCE PROCESS | OUTPUT INTERFACE |
|---|---|---|---|
| | | | SPECIFIED FROM INITIAL ADDITION RECORD |

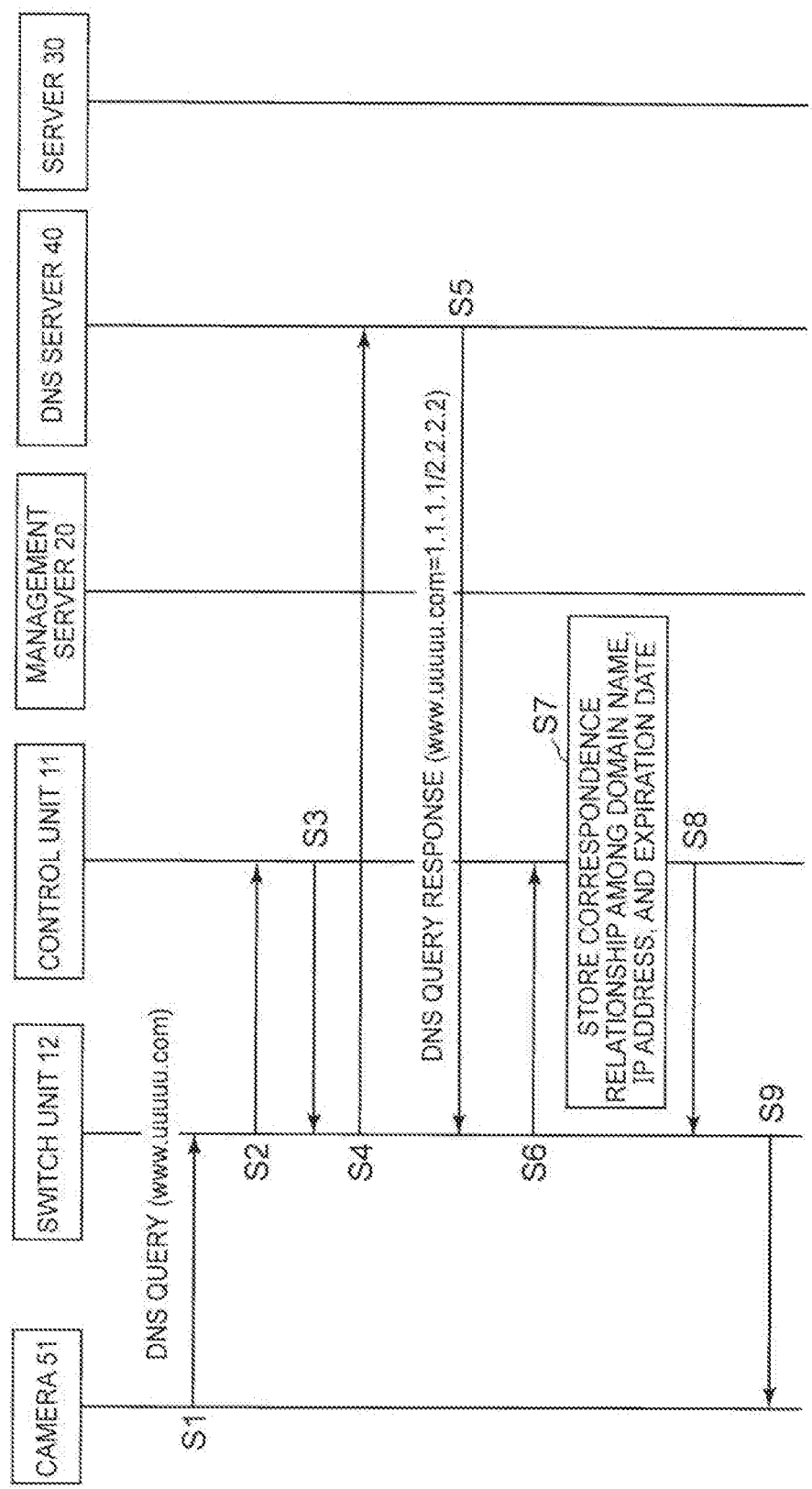

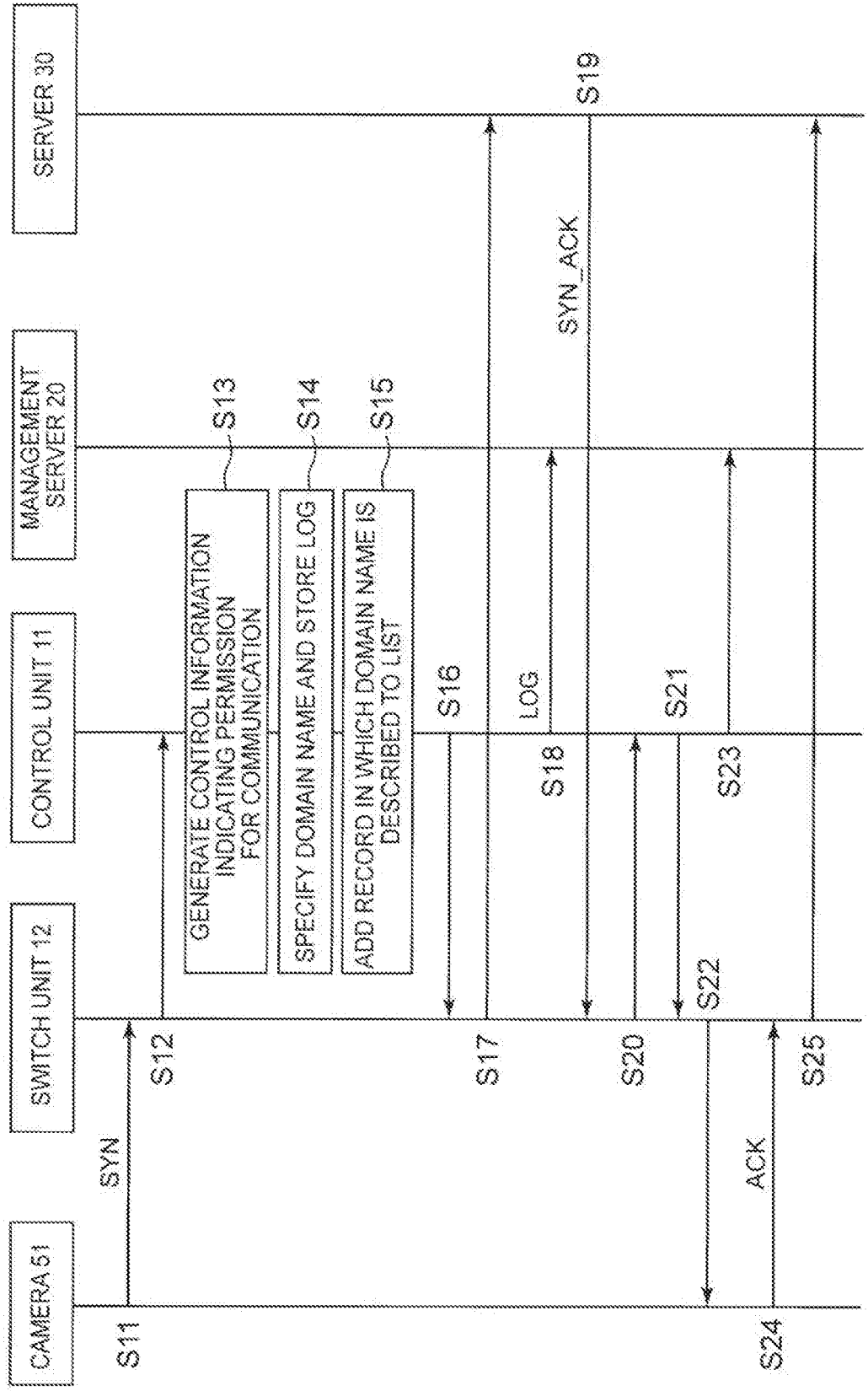

FIG. 12

| | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | any | ... | www.sssss.com | any | any | Ethernet2 | |
| 2 | any | ... | www.tttt.com | any | any | Ethernet1 | ADDED BY LEARNING |
| 3 | any | ... | any | /bin/abc | any | Ethernet1 | DESTINATION PORT NUMBER 20 AND 21 IS NOT PERMITTED |
| 4 | any | ... | any | /bin/def | any | Ethernet1 | ADDED BY LEARNING |
| 5 | any | ... | any | any | root | Ethernet2 | |
| 6 | any | ... | any | any | deamon | Ethernet1 | ADDED BY LEARNING |
| : | : | ... | : | : | : | : | : |
| n-2 | 192.168.2.0/24 | ... | any | any | any | Ethernet2 | any |
| n-1 | 192.168.3.0/24 | ... | any | any | any | wlan0 | any |
| n | any | ... | any | any | any | Ethernet1 | any |
| | any | ... | www.uuuuu.com | any | any | Ethernet1 | ADDED BY LEARNING |

(n-2)TH TO nTH RECORD IS INITIAL ADDITION RECORD.

FIG. 14

| | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | any | ... | www.sssss.com | any | any | Ethernet2 | |
| 2 | any | ... | www.ttttt.com | any | any | Ethernet1 | ADDED BY LEARNING |
| 3 | any | ... | any | /bin/abc | any | Ethernet1 | DESTINATION PORT NUMBER 20 AND 21 IS NOT PERMITTED |
| 4 | any | ... | any | /bin/def | any | Ethernet1 | ADDED BY LEARNING |
| 5 | any | ... | any | any | root | Ethernet2 | |
| 6 | any | ... | any | any | deamon | Ethernet1 | ADDED BY LEARNING |
| : | any | ... | : | : | : | : | : |
| m | any | ... | www.uuuuu.com | any | any | Ethernet1 | ADDED BY LEARNING |

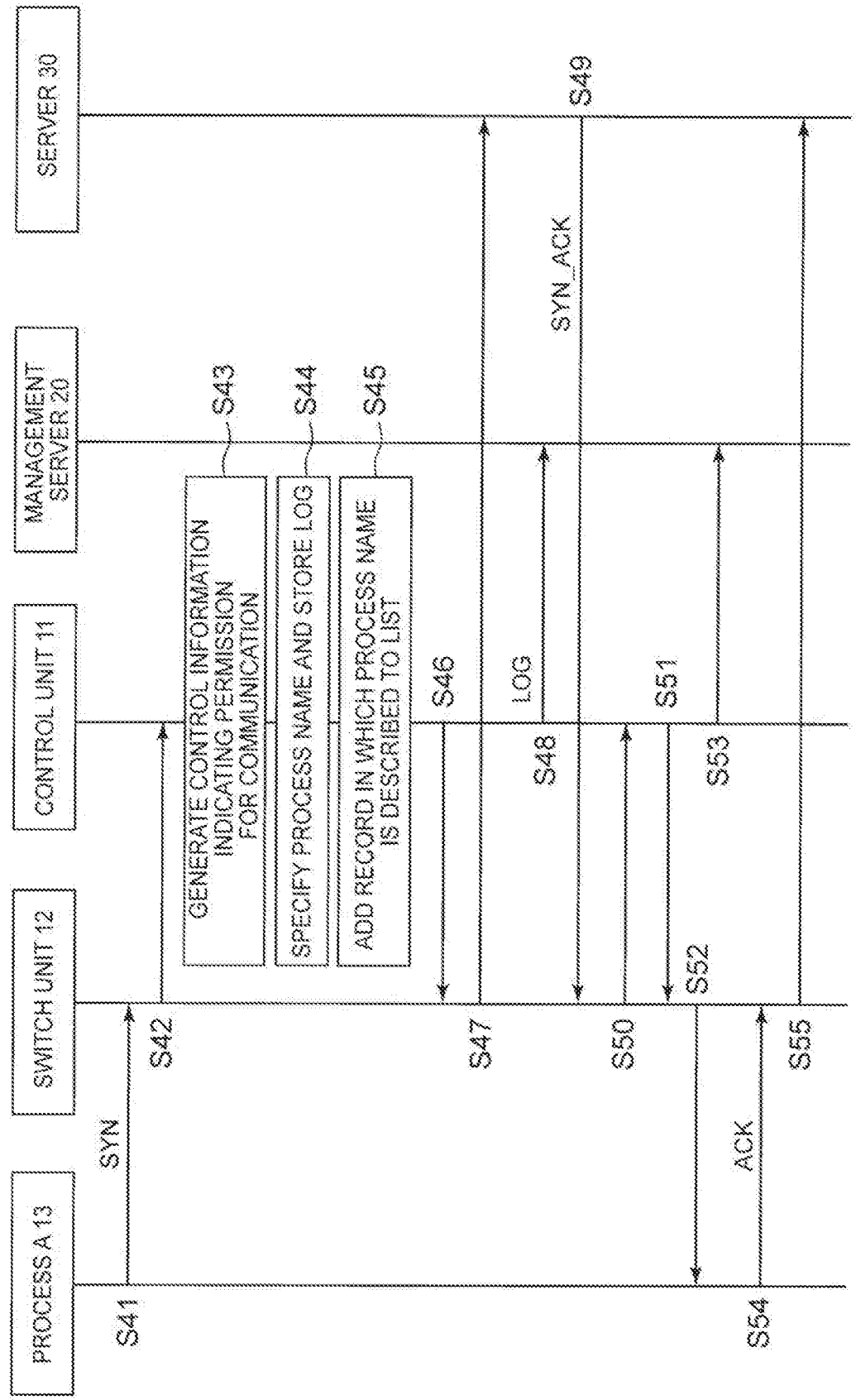

FIG. 16

| | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | any | ... | www.sssss.com | any | any | Ethernet2 | |
| 2 | any | ... | www.tttt.com | any | any | Ethernet1 | ADDED BY LEARNING |
| 3 | any | ... | any | /bin/abc | any | Ethernet1 | DESTINATION PORT NUMBER 20 AND 21 IS NOT PERMITTED |
| 4 | any | ... | any | /bin/def | any | Ethernet1 | ADDED BY LEARNING |
| 5 | any | ... | any | any | root | Ethernet2 | |
| 6 | any | ... | any | any | deamon | Ethernet1 | ADDED BY LEARNING |
| ... | any | ... | ... | ... | ... | ... | ... |
| n-2 | 192.168.2.0/24 | ... | any | any | any | Ethernet2 | any |
| n-1 | 192.168.3.0/24 | ... | any | any | any | wlan0 | any |
| n | any | ... | any | any | any | Ethernet1 | any |
| | any | ... | any | /bin/ghi | any | Ethernet1 | ADDED BY LEARNING |

(n-2)TH TO nTH RECORD IS INITIAL ADDITION RECORD.

FIG. 18

| | DESTINATION IP ADDRESS | ... | DESTINATION DOMAIN NAME | TRANSMISSION SOURCE PROCESS NAME | USER NAME OF TRANSMISSION SOURCE PROCESS | OUTPUT INTERFACE | SUPPLEMENTARY INFORMATION |
|---|---|---|---|---|---|---|---|
| 1 | any | ... | www.sssss.com | any | any | Ethernet2 | |
| 2 | any | ... | www.ttttt.com | any | any | Ethernet1 | ADDED BY LEARNING |
| 3 | any | ... | any | /bin/abc | any | Ethernet1 | DESTINATION PORT NUMBER 20 AND 21 IS NOT PERMITTED |
| 4 | any | ... | any | /bin/def | any | Ethernet1 | ADDED BY LEARNING |
| 5 | any | ... | any | any | root | Ethernet2 | |
| 6 | any | ... | any | any | deamon | Ethernet1 | ADDED BY LEARNING |
| ... | any | ... | ... | ... | ... | ... | ... |
| m | any | ... | any | /bin/ghi | any | Ethernet1 | ADDED BY LEARNING |

FIG. 20

| VID | PID | SERIAL NUMBER | SUPPLEMENTARY INFORMATION |
|---|---|---|---|
| 00:00:00 | 00:00:00 | 01234 | |
| 00:00:01 | 00:00:01 | any | |
| 00:00:02 | 00:00:02 | any | |
| 00:00:03 | 00:00:03 | ABCDE | |
| 00:00:04 | 00:00:04 | any | ADDED BY LEARNING |

FIG. 21

| BD ADDRESS | SUPPLEMENTARY INFORMATION |
|---|---|
| AAAAAAA | |
| BBBBBBB | ADDED BY LEARNING |

FIG. 22

| VID | PID | SERIAL NUMBER |
|---|---|---|
| 1 | 1 | 0 |

FIG. 23

| BD ADDRESS |
|---|
| 1 |

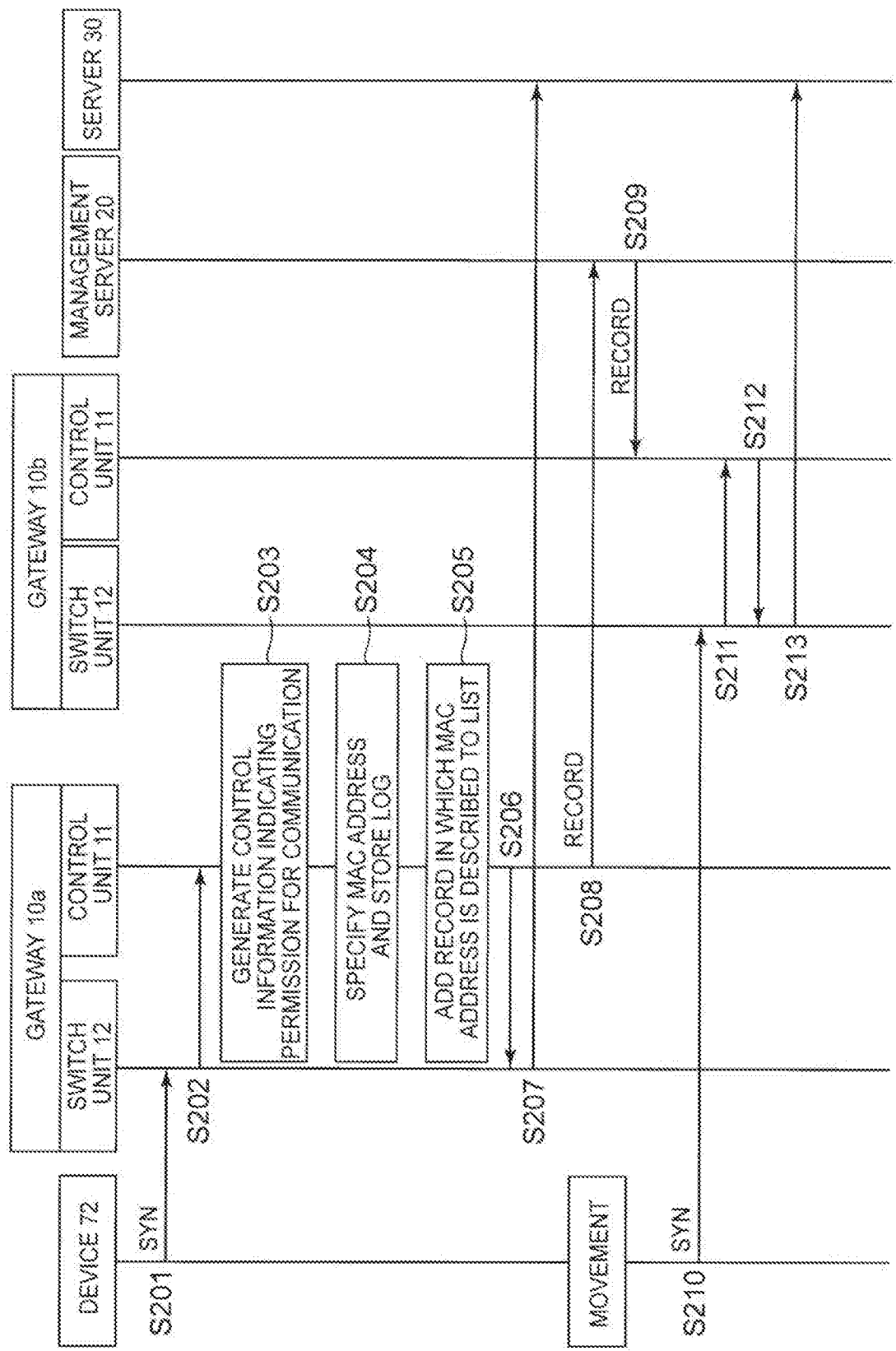

FIG. 29

| LEARNING CONDITION | INPUT INTERFACE | TRANS-MISSION SOURCE MAC ADDRESS | DESTINATION MAC ADDRESS | TRANS-MISSION SOURCE IP ADDRESS | DESTINATION IP ADDRESS | COMMUNICATION PROTOCOL | TRANS-MISSION SOURCE PORT NUMBER | DESTINATION PORT NUMBER | TRANS-MISSION SOURCE PROCESS NAME | DESTINATION PROCESS NAME |
|---|---|---|---|---|---|---|---|---|---|---|
| 1 | 0 | 1 | 0 | 0 | 0 | 0 | 0 | 0 | 0 | 0 |

| TRANS-MISSION SOURCE DOMAIN NAME | DESTINATION DOMAIN NAME | USER NAME OF TRANSMISSION SOURCE PROCESS | OUTPUT INTERFACE |
|---|---|---|---|
| 0 | 0 | 0 | SPECIFIED FROM INITIAL ADDITION RECORD |

FIG. 30

| TRANSMISSION SOURCE MAC ADDRESS | ... | OUTPUT INTERFACE | SUPPLEMENTARY INFORMATION |
|---|---|---|---|
| ... | ... | | |
| 11:22:33:44:55:66 | ... | Ethernet1 | ADDED BY LEARNING |

FIG. 34

| VID | PID | SERIAL NUMBER | SUPPLEMENTARY INFORMATION |
|---|---|---|---|
| 00:00:05 | 00:00:05 | any | ADDED BY LEARNING |

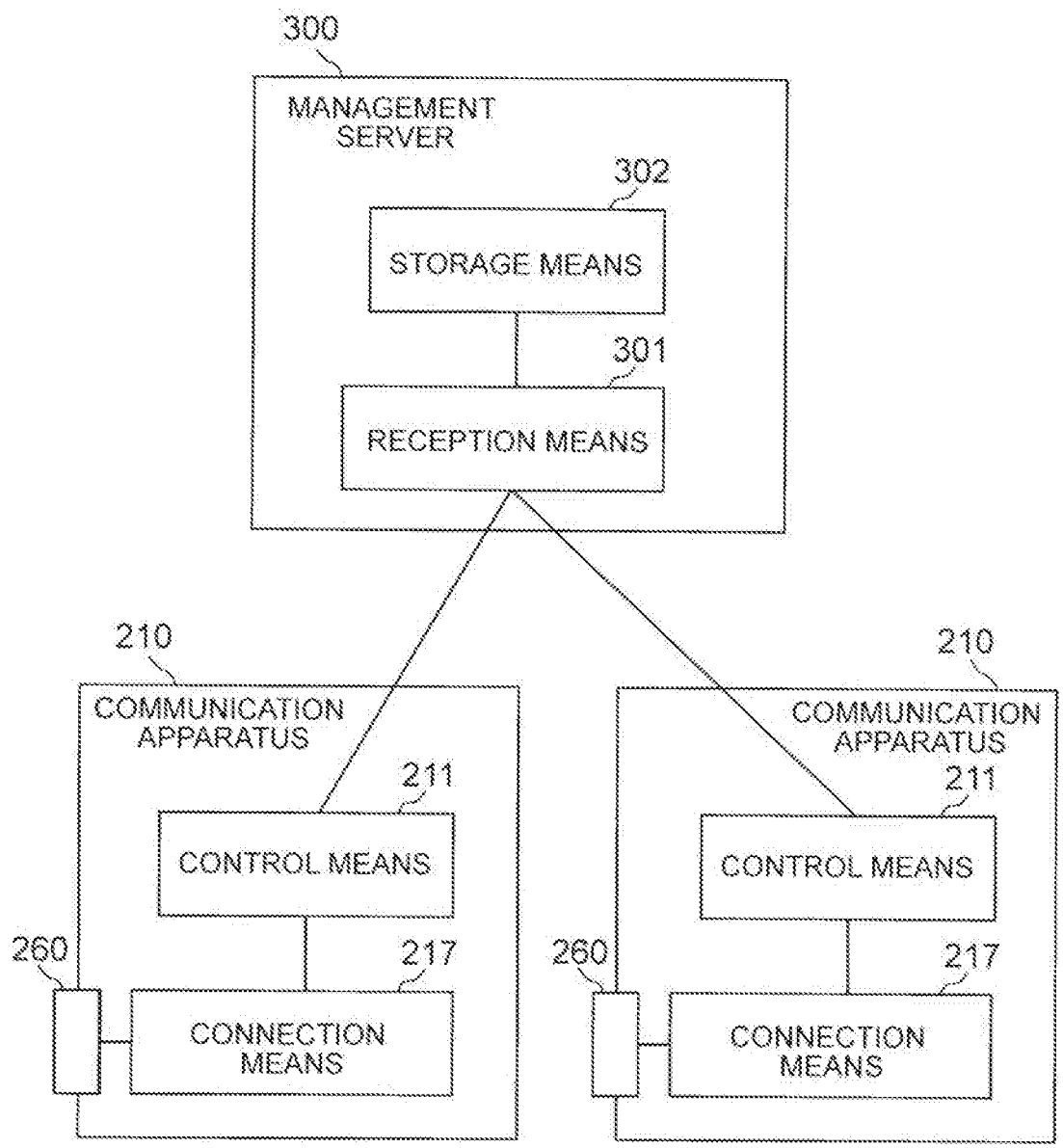

COMMUNICATION APPARATUS, COMMUNICATION SYSTEM, COMMUNICATION CONTROL METHOD, COMMUNICATION PROGRAM AND DEVICE CONNECTION CONTROL PROGRAM

CROSS REFERENCE TO RELATED APPLICATIONS

This application is a National Stage of International Application No. PCT/JP2018/026301 filed Jul. 12, 2018, claiming priority based on Japanese Patent Application No. 2017-188198 filed Sep. 28, 2017, the contents of all of which are incorporated herein by reference.

TECHNICAL FIELD

The present invention relates to a communication apparatus, a communication system, and a communication control method, a device connection control method, a communication program, a device connection control program applied to the communication apparatus, and a communication apparatus management method applied to the communication system.

BACKGROUND ART

OpenFlow has been known as a protocol with which a control apparatus controls a switch that transfers a packet.

In OpenFlow, the control apparatus sets a flow entry in the switch. Then, the switch processes the received packet according to the flow entry. The flow entry is information that defines an operation (such as transfer, discarding, or the like) with respect to a packet. The flow entry is set for each packet flow. When the switch receives a packet, in a case where there is a flow entry corresponding to a flow of the packet, the switch processes the packet according to the flow entry. On the other hand, in a case where there is no flow entry corresponding to the flow of the received packet, the switch gives a notification thereof to the control apparatus. Then, the control apparatus determines a flow entry corresponding to the flow of the packet, and sets the flow entry in the switch.

Also, a network apparatus that learns an address by storing a transmission source address of a received packet into address information indicating a packet transferred by the network device is disclosed in PTL 1.

Also, a packet relay apparatus that relays a packet and generates a whitelist is disclosed in PTL 2. The whitelist in PTL 2 is, for example, a list of packets permitted to be transferred by the packet relay apparatus. Moreover, the packet relay apparatus disclosed in PTL 2 determines whether a state is a generation state of generating a whitelist or an operation state of performing transfer using a whitelist. Also, the packet relay apparatus disclosed in PTL 2 includes a plurality of packet receiving units, and can select a packet receiving unit to be an object of whitelist generation and control, and a packet receiving unit excluded from the object of whitelist generation and control.

Also, a communication control apparatus that manages a whitelist is disclosed in PTL 3. The whitelist in PTL 3 has a communication partner column. Also, a fully qualified domain name (FQDN) is disclosed in PTL 3 as an example of identification information to identify a communication partner.

CITATION LIST

Patent Literature

PTL 1: Japanese Patent No. 6114214
PTL 2: WO 2017/073089
PTL 3: WO 2014/155699

SUMMARY OF INVENTION

Technical Problem

In a case where a communication apparatus determines whether to permit or not to permit a packet transfer according to a whitelist, it is necessary to set a whitelist in the communication apparatus.

In the Internet of things (IoT), there are the large number and many kinds of devices and application software, and operation man-hours become enormous when setting operation for all devices and application software is performed.

Also, in a case where an administrator creates a whitelist based on Internet protocol (IP) addresses, the administrator cannot easily grasp an IP address corresponding to a transmission source or a destination, and creating a whitelist is not easy.

Thus, it is preferable that a whitelist describing not only IP addresses but also various conditions can be easily generated. Also, it is preferable that the whitelist include a condition that can be easily understood by the administrator.

Also, it is conceivable that a communication apparatus determines whether to permit or not to permit connection between the communication apparatus and a different device according to a whitelist. In that case, there is also a problem that operation man-hours in creation of a whitelist are increased.

Also, in a case where a list used for determination of whether to permit or not to permit communication by a packet is generated by a plurality of communication apparatuses, it is preferable that the list can be managed.

Similarly, in a case where a list used for determination of whether to permit or not to permit connection between a communication apparatus and a different device is generated by a plurality of communication apparatuses, it is preferable that the list can be managed.

Thus, the present invention is to provide a communication apparatus, a communication control method, and a communication program that can generate a list, which is used for determination of whether to permit or not to permit communication by a packet, in such a manner that a condition that can be easily understood by an administrator is also included.

Also, the present invention is to provide a communication apparatus, a device connection control method, and a device connection control program that can generate a list used for determination of whether to permit or not to permit connection of a different device.

Also, the present invention is to provide a communication system and a communication apparatus management method that can manage a list, which is used for determination of whether to permit or not to permit communication by a packet, in a case where the list is generated by a plurality of communication apparatuses.

Also, the present invention is to provide a communication system and a communication apparatus management method that can manage a list, which is used for determination of whether to permit or not to permit connection of a different device, in a case where the list is generated by a plurality of communication apparatuses.

Solution to Problem

A communication apparatus according to the present invention includes: a packet transfer means that transfers a packet; and a control means that sets, with respect to the packet transfer means, control information that defines an operation of the packet transfer means according to header information of the packet, wherein the packet transfer means notifies, when receiving a new packet that is a packet for which control information that matches header information is not set yet, the control means of the header information of the new packet, the control means holds a list of records including a plurality of items in each of which a condition for permitting communication can be described, a condition being described in at least a part of the plurality of items, sets, in the packet transfer means, control information indicating permission for communication by the new packet in a case where information included in the header information or information specified from an IP address included in the header information is described in any of the records in the list when the header information is notified by the packet transfer means, and sets, in the packet transfer means, control information indicating non-permission for communication by the new packet in a case where information included in the header information or information specified from an IP address included in the header information is not described in any of the records in the list, and the control means sets, in a case of being set to a learning mode to learn a new record and in a case where an item corresponding to a condition that can be specified from an IP address is designated as an item a condition of which is to be learned, control information indicating permission for communication by the new packet in the packet transfer means when the header information of the new packet is notified by the packet transfer means, and adds, to the list, a record in which a condition specified from the IP address in the header information is described in the designated item.

A communication apparatus according to the present invention is a communication apparatus with a connection interface for a device, the apparatus including: a connection means that connects a device inserted into the connection interface with the communication apparatus; and a control means that controls the connection means, wherein the connection means connects, when a device is inserted into the connection interface, the device with the communication apparatus, and notifies the control means of identification information of the device, the control means holds a list of records including one or more items in each of which identification information of a device can be described, identification information of a device being described in at least one item, permits the connection between the device and the communication apparatus when the identification information of the device is notified by the connection means and in a case where the identification information is described in any of the records in the list, and does not permit the connection between the device and the communication apparatus in a case where the identification information is not described in any of the records in the list, the connection means disconnects the connection between the device and the communication apparatus in a case where the connection between the device and the communication apparatus is not permitted, and the control means permits, in a case of being set to a learning mode to learn a new record and in a case where an item corresponding to a kind of identification information to be learned is designated, the connection between the device and the communication apparatus when the identification information of the device is notified by the connection means, and adds, to the list, a record in which identification information corresponding to the item is described in the designated item.

Also, a communication system according to the present invention includes: a plurality of communication apparatuses; and a management server that manages the plurality of communication apparatuses, wherein each of the communication apparatuses includes a packet transfer means that transfers a packet, and a control means which sets, with respect to the packet transfer means, control information that defines an operation of the packet transfer means according to header information of the packet, the packet transfer means notifies, when receiving a new packet that is a packet for which control information that matches header information is not set yet, the control means of the header information of the new packet, the control means holds a list of records including a plurality of items in each of which a condition for permitting communication can be described, a condition being described in at least a part of the plurality of items, sets, in the packet transfer means, control information indicating permission for communication by the new packet in a case where information included in the header information or information specified from an IP address included in the header information is described in any of the records in the list when the header information is notified by the packet transfer means, and sets, in the packet transfer means, control information indicating non-permission for communication by the new packet in a case where information included in the header information or information specified from the IP address of included in the header information is not described in any of the records in the list, the control means sets, when header information of a new packet is notified by the packet transfer means, control information indicating permission for communication by the new packet in the packet transfer means in a case of being set to a learning mode to learn a new record and in a case where an item corresponding to identification information of a device in a transmission source of a packet is designated as an item a condition of which is to be learned, and adds a record, in which identification information of a device in a transmission source of the new packet is described in the designated item, to the list and transmits the record to the management server, and the management server includes a reception means that receives the record, and a storage means that stores the record.

Also, a communication system according to the present invention includes: a plurality of communication apparatuses; and a management server that manages the plurality of communication apparatuses, wherein each of the communication apparatuses includes a connection interface for a device, a connection means that connects a device inserted into the connection interface with the communication apparatus, and a control means that controls the connection means, the connection means connects, when a device is inserted into the connection interface, the device and the communication apparatus, and notifies the control means of identification information of the device, the control means holds a list of records including one or more items in each of which identification information of a device can be described, identification information of a device being described in at least one item, permits the connection between the device and the communication apparatus when the identification information of the device is notified by the connection means and in a case where the identification information is described in any of the records in the list, and does not permit the connection between the device and the communication apparatus in a case where the identification information is not described in any of the records in the list, the connection means disconnects the connection between the device and the communication apparatus in a case where the connection between the device and the communication apparatus is not permitted, the control means permits, in a case of being set to a learning mode to learn a new record and in a case where an item corresponding to a kind of identification information to be learned is designated, the connection between the device and the communication apparatus when the identification information of the device is notified by the connection means, and adds a record, in which identification information corresponding to a designated item is described in the item, to the list and transmits the record to the management server, and the management server includes a reception means that receives the record, and a storage means that stores the record.

Also, a communication control method according to the present invention is a communication control method applied to a communication apparatus including a packet transfer means that transfers a packet, and a control means that sets, with respect to the packet transfer means, control information that defines an operation of the packet transfer means according to header information of the packet, the method including: notifying, when receiving a new packet that is a packet for which control information matching header information is not set yet, the control means of the header information of the new packet, notifying being performed by the packet transfer means; holding a list of records including a plurality of items in each of which a condition for permitting communication can be described, a condition being described in at least a part of the plurality of items, setting, in the packet transfer means, control information indicating permission for communication by the new packet in a case where information included in the header information or information specified from an IP address included in the header information is described in any of the records in the list when the header information is notified by the packet transfer means, and setting, in the packet transfer means, control information indicating non-permission for communication by the new packet in a case where information included in the header information or information specified from the IP address included in the header information is not described in any of the records in the list, holding and setting being performed by the control means; and setting, in a case of being set to a learning mode to learn a new record and in a case where an item corresponding to a condition that can be specified from the IP address is designated as an item a condition of which is to be learned, control information indicating permission for communication by the new packet in the packet transfer means when the header information of the new packet is notified by the packet transfer means, and adding, to the list, a record in which a condition specified from the IP address in the header information is described in the designated item, setting and adding being performed by the control means.

Also, a device connection control method according to the present invention is a device connection control method applied to a communication apparatus including a connection interface for a device, a connection means that connects a device inserted into the connection interface with the communication apparatus, and a control means that controls the connection means, the method including: connecting, when a device is inserted into the connection interface, the device and the communication apparatus, and notifying the control means of identification information of the device, connecting and notifying being performed by the connection means; holding a list of records including one or more items in each of which identification information of a device can be described, identification information of a device being described in at least one item, permitting the connection between the device and the communication apparatus when the identification information of the device is notified by the connection means and in a case where the identification information is described in any of the records in the list, and not permitting the connection between the device and the communication apparatus in a case where the identification information is not described in any of the records in the list, holding, permitting, and not permitting being performed by the control means; disconnecting the connection between the device and the communication apparatus in a case where the connection between the device and the communication apparatus is not permitted, disconnecting being performed by the connection means; and permitting, in a case of being set to a learning mode to learn a new record and in a case where an item corresponding to a kind of identification information to be learned is designated, the connection between the device and the communication apparatus when the identification information of the device is notified by the connection means, and adding, to the list, a record in which identification information corresponding to a designated item is described in the item, permitting and adding being performed by the control means.

Also, a communication apparatus management method according to the present invention is a communication apparatus management method applied to a communication system including a plurality of communication apparatuses and a management server that manages the plurality of communication apparatuses, each of the communication apparatuses including a packet transfer means that transfers a packet and a control means that sets, with respect to the packet transfer means, control information that defines an operation of the packet transfer means according to header information of the packet, the method including: notifying, when receiving a new packet that is a packet for which control information matching header information is not set yet, the control means of the header information of the new packet, notifying being performed by the packet transfer means; holding a list of records including a plurality of items in each of which a condition for permitting communication can be described, a condition being described in at least a part of the plurality of items, setting, in the packet transfer means, control information indicating permission for communication by the new packet in a case where information included in the header information or information specified from an IP address included in the header information is described in any of the records in the list when the header information is notified by the packet transfer means, and setting, in the packet transfer means, control information indicating non-permission for communication by the new packet in a case where information included in the header information or information specified from the IP address included in the header information is not described in any of the records in the list, holding and setting being performed by the control means; setting, when header information of a new packet is notified by the packet transfer means, control information indicating permission for communication by the new packet in the packet transfer means in a case of being set to a learning mode to learn a new record and in a case where an item corresponding to identification information of a device in a transmission source of a packet is designated as an item a condition of which is to be learned, and adding, to the list, a record in which identification information of a device in a transmission source of the new packet is described in the designated item and transmitting the record to the management server, setting, adding, and transmitting being performed by the control means; and receiving the record and storing the record, receiving and storing being performed by the management server.

Also, a communication apparatus management method according to the present invention is a communication apparatus management method applied to a communication system including a plurality of communication apparatuses and a management server that manages the plurality of communication apparatuses, each of the communication apparatuses including a connection interface for a device, a connection means that connects a device inserted into the connection interface with the communication apparatus, and a control means that controls the connection means, the method including: connecting, when a device is inserted into the connection interface, the device and the communication apparatus, and notifying the control means of identification information of the device, connecting and notifying being performed by the connection means; holding a list of records including one or more items in each of which identification information of a device can be described, identification information of a device being described in at least one item, permitting the connection between the device and the communication apparatus when the identification information of the device is notified by the connection means and in a case where the identification information is described in any of the records in the list, and not permitting the connection between the device and the communication apparatus in a case where the identification information is not described in any of the records in the list, holding, permitting, and not permitting being performed by the control means; disconnecting the connection between the device and the communication apparatus in a case where the connection between the device and the communication apparatus is not permitted, disconnecting being performed by the connection means; permitting, in a case of being set to a learning mode to learn a new record and in a case where an item corresponding to a kind of identification information to be learned is designated, the connection between the device and the communication apparatus when the identification information of the device is notified by the connection means, and adding, to the list, a record in which identification information corresponding to a designated item is described in the item, and transmitting the record to the management server, permitting, adding, and transmitting being performed by the control means; and receiving the record and storing the record, receiving and storing being performed by the management server.

Also, a communication program according to the present invention is a communication program installed in a computer including a packet transfer means that transfers a packet and a control means that sets, with respect to the packet transfer means, control information that defines an operation of the packet transfer means according to header information of the packet, the program causing a computer to execute notification processing in which the packet transfer means notifies, when receiving a new packet that is a packet for which control information matching header information is not set yet, the control means of header information of the new packet, control information setting processing in which the control means holds a list of records including a plurality of items in each of which a condition for permitting communication can be described, a condition being described in at least a part of the plurality of items, sets, in the packet transfer means, control information indicating permission for communication by the new packet in a case where information included in the header information or information specified from an IP address included in the header information is described in any of the records in the list when the header information is notified by the packet transfer means, and sets, in the packet transfer means, control information indicating non-permission for communication by the new packet in a case where information included in the header information or information specified from the IP address of included in the header information is not described in any of the records in the list, control information setting processing in a learning mode in which processing the control means sets, in a case of being set to a learning mode to learn a new record and in a case where an item corresponding to a condition that can be specified from the IP address is designated as an item a condition of which is to be learned, control information indicating permission for communication by the new packet in the packet transfer means when the header information of the new packet is notified by the packet transfer means, and record adding processing in which the control means adds, to the list, a record in which a condition specified from the IP address in the header information is described in the designated item.

Also, a device connection control program according to the present invention is a device connection control program installed in a computer including a connection interface for a device, a connection means that connects a device inserted into the connection interface with the computer, and a control means that controls the connection means, the program causing the computer to execute notification processing in which the connection means connects, when a device is inserted into the connection interface, the device and the computer and notifies the control means of identification information of the device, connection control processing in which the control means holds a list of records including one or more items in each of which identification information of a device can be described, identification information of a device being described in at least one item, permits the connection between the device and the computer when the identification information of the device is notified by the connection means and in a case where the identification information is described in any of the records in the list, and does not permit the connection between the device and the computer in a case where the identification information is not described in any of the records in the list, connection disconnection processing in which the connection means disconnects the connection between the device and the computer in a case where the connection between the device and the computer is not permitted, connection control processing for a learning mode in which processing the control means permits, in a case of being set to a learning mode to learn a new record and in a case where an item corresponding to a kind of identification information to be learned is designated, the connection between the device and the computer when the identification information of the device is notified by the connection means, and record adding processing in which the control means adds, to the list, a record in which identification information corresponding to a designated item is described in the item.

Advantageous Effects of Invention

According to the present invention, it is possible to generate a list used for determination of whether to permit or not to permit communication by a packet in such a manner that a condition easily understood by an administrator is also included.

Also, according to the present invention, it is possible to generate a list used for determination of whether to permit or not to permit connection of a different device.

Also, according to the present invention, in a case where a list used for determination of whether to permit or not to permit communication by a packet is generated by a plurality of communication apparatuses, the list can be managed.

Also, according to the present invention, in a case where a list used for determination of whether to permit or not to permit connection of a different device is generated by a plurality of communication apparatuses, the list can be managed.

BRIEF DESCRIPTION OF DRAWINGS

FIG. 3 It depicts a schematic diagram illustrating an example of a list held by a control unit.

FIG. 4 It depicts a schematic diagram illustrating an example of the list to which an initial addition record is added.

FIG. 5 It depicts a schematic diagram illustrating an example of a log of a case where control information indicating permission for communication is set in a switch unit.

FIG. 6 It depicts a schematic diagram illustrating an example of a learning item setting table.

FIG. 10 It depicts a sequence diagram illustrating an example of processing progress in the learning mode.

FIG. 11 It depicts a sequence diagram illustrating an example of processing progress in the learning mode.

FIG. 12 It depicts a schematic diagram illustrating an example of the list to which a record is added in Step S15.

FIG. 14 It depicts a schematic diagram illustrating an example of the list.

FIG. 15 It depicts a sequence diagram illustrating a different example of processing progress in the learning mode.

FIG. 16 It depicts a schematic diagram illustrating an example of the list to which a record is added in Step S45.

FIG. 18 It depicts a schematic diagram illustrating an example of the list.

FIG. 20 It depicts a schematic diagram illustrating an example of a list for a USB.

FIG. 21 It depicts a schematic diagram illustrating an example of a list for BLE.

FIG. 22 It depicts a schematic diagram illustrating an example of a learning item setting table for a USB.

FIG. 23 It depicts a schematic diagram illustrating an example of a learning item setting table for BLE.

FIG. 28 It depicts a sequence diagram illustrating an example of processing progress of a case where a management server manages a record in the first management mode.

FIG. 29 It depicts a schematic diagram illustrating an example of setting of a learning item setting table.

FIG. 30 It depicts a schematic diagram illustrating an example of a record added to a list in Step S205.

FIG. 34 It depicts a schematic diagram illustrating an example of a record added to the list for a USB in Step S406.

FIG. 39 It depicts a block diagram illustrating a different example of an outline of a communication system of the present invention.

DESCRIPTION OF EMBODIMENTS

In the following, exemplary embodiments of the present invention will be described with reference to the drawings.

First Exemplary Embodiment

Figure 1:
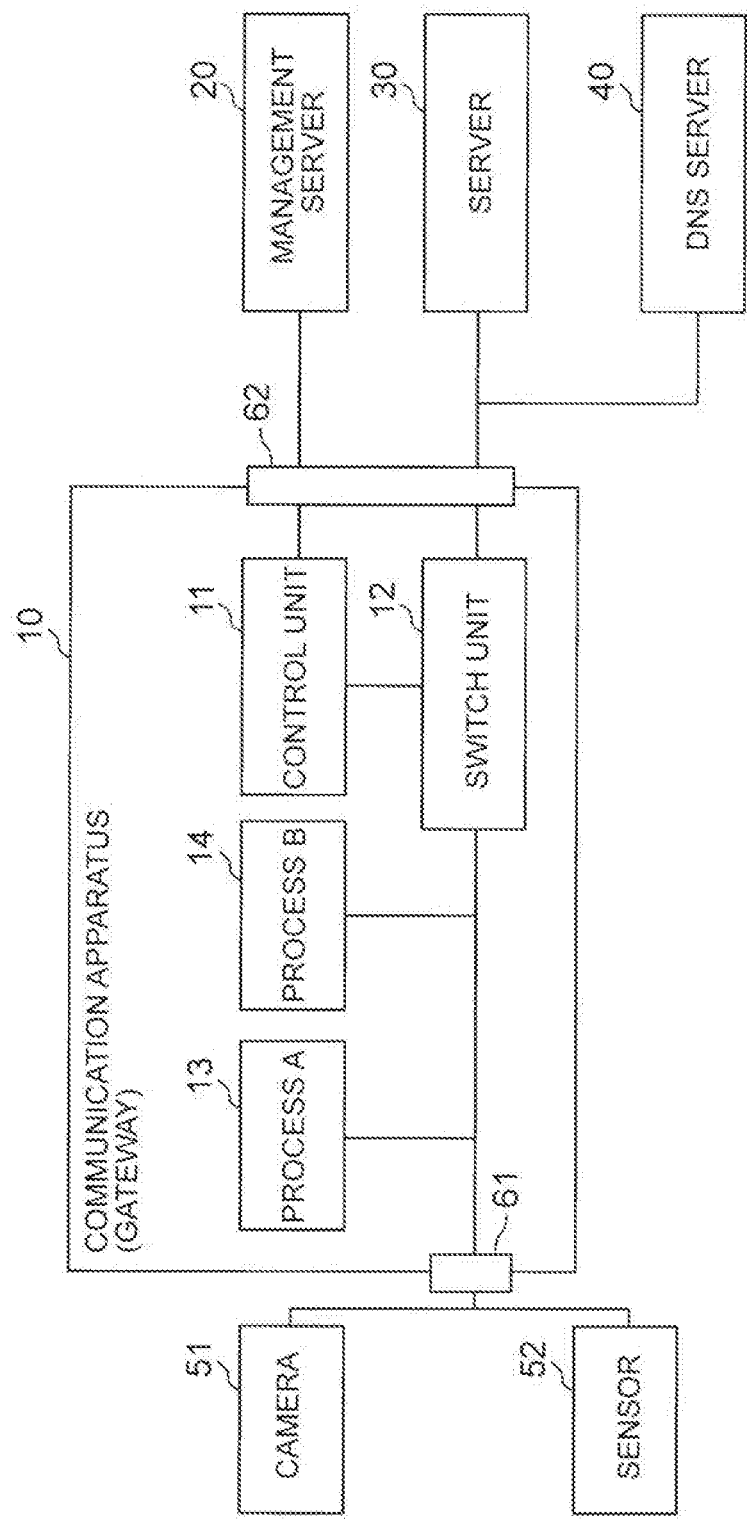
FIG. 1 It depicts a block diagram illustrating an example of a communication apparatus of a first exemplary embodiment of the present invention.

FIG. 1 is a block diagram illustrating an example of a communication apparatus of the first exemplary embodiment of the present invention. In each exemplary embodiment, a case where a communication apparatus 10 of the present invention is a gateway will be described as an example. The gateway 10 includes a control unit 11, a switch unit 12, a communication interface 61 for a wireless local area network (LAN) (hereinafter, referred to as wireless LAN IF 61), and a communication interface 62 for Ethernet (registered trademark) (hereinafter, referred to as Ethernet IF 62).

In the example illustrated in FIG. 1, the gateway 10 is connected to a management server 20, a domain name system (DNS) server 40, and a general server 30 via the Ethernet IF 62 and a communication network. The management server 20 transmits a part created by an administrator of a list (described later) to the gateway 10, and receives a log from the gateway 10. The server 30 processes data acquired by a camera 51 or a sensor 52, for example. Also, the camera 51 and the sensor 52 are connected to the gateway 10 via the wireless LAN IF 61. The camera 51 and the sensor 52 are examples of devices connected under the gateway 10. An apparatus connected under the gateway 10 is not limited to the camera 51 or the sensor 52.

Although being, for example, a cloud server, the management server 20 may be a server other than the cloud server. The same applies to the server 30 and the DNS server 40.

The camera 51 and the sensor 52 communicate with the server 30 via the gateway 10. Also, a process A 13 or a process B 14 inside the gateway 10 may communicate with the server 30. Also, for example, the server 30 may access the camera 51. Note that the number of processes in the gateway 10 is not specifically limited.

Figure 2:
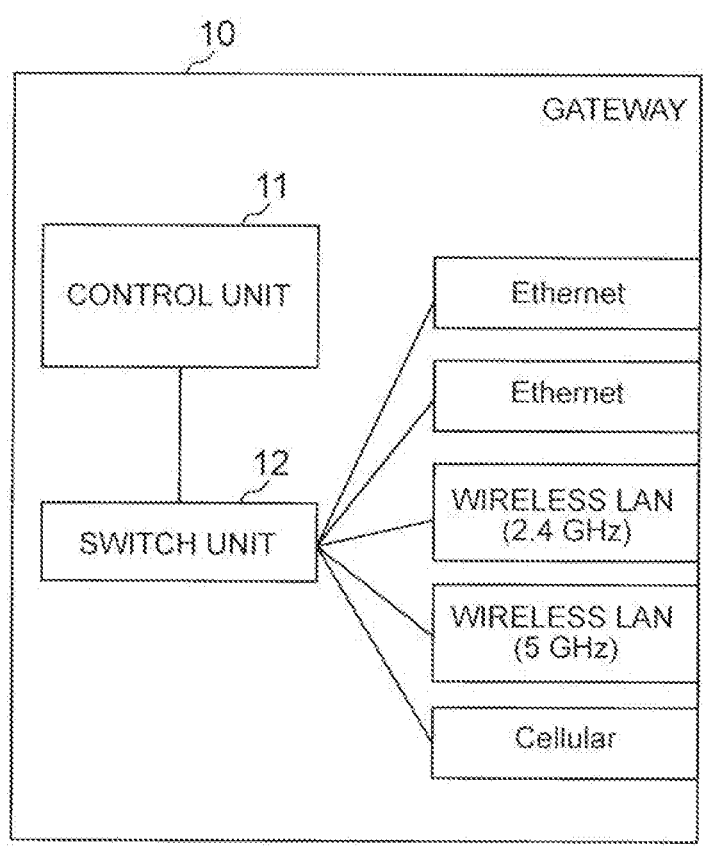
FIG. 2 It depicts a view for describing an example of a communication interface provided in a gateway.

Note that the communication interfaces included in the gateway 10 are not limited to the wireless LAN IF 61 and the Ethernet IF 62. FIG. 2 is a view for describing an example of communication interfaces included in the gateway 10. For example, the gateway 10 includes, as communication interfaces, communication interfaces such as Ethernet, a wireless LAN (2.4 GHz), a wireless LAN (5 GHz), and Cellular. These communication interfaces are physical communication interfaces. In FIG. 2, a case where two kinds of communication interfaces of the wireless LAN are provided and two communication interfaces of Ethernet are provided is exemplified.

The switch unit 12 transfers a packet. The switch unit 12 can be also referred to as a packet transfer means 12.

The control unit 11 controls the switch unit 12 by setting, in the switch unit 12, control information (corresponding to flow entry in OpenFlow) that defines an operation of the switch unit 12 according to header information of the packet. The control unit 11 may control the switch unit 12 according to OpenFlow, for example. However, a protocol with which the control unit 11 controls the switch unit 12 may not be OpenFlow.

A packet for which control information matching header information is not set yet in the switch unit 12 is referred to as a new packet. When receiving a new packet, the switch unit 12 notifies the control unit 11 of header information of the new packet. When notified of the header information, the control unit 11 sets control information matching the header information in the switch unit 12.

The control unit 11 holds a list of records including a plurality of items in each of which a condition for permitting communication can be described, a condition being described in at least a part of the plurality of items. Then, when the header information (header information of new packet) is notified by the switch unit 12, the control unit 11 determines whether information included in the header information or information specified from an IP address included in the header information is described in any of the records in the list. In a case where the information included in the header information or the information specified from the IP address included in the header information is described in any of the records in the list, the control unit 11 sets, in the switch unit 12, control information indicating permission for communication by the new packet. Also, in a case where the information included in the header information or the information specified from the IP address included in the header information is not described in any of the records in the list, the control unit 11 sets, in the switch unit 12, control information indicating non-permission for communication by the new packet.

It is possible to say that the above list is a whitelist.

Also, in a case of being set to a learning mode to learn a new record, the control unit 11 learns a new record and adds the record to the list. There is a case where a learning a new record and adding the record to a list is referred to as learning of a list.

The switch unit 12 and the control unit 11 will be described in more detail.

The switch unit 12 is logically connected to various physical communication interfaces exemplified in FIG. 2. In a case where the switch unit 12 receives a packet from the outside of the gateway 10 or outputs a packet to the outside of the gateway 10, the switch unit 12 receives a packet or outputs a packet via any of the communication interfaces.

The switch unit 12 has a function of recognizing header information of a packet. Then, in a case where a new packet (that is, packet for which control information matching header information is not set yet) is received, a notification of header information of the packet is given to the control unit 11. Also, notifying the control unit 11 of header information of a packet means inquiring of the control unit 11 about control information corresponding to the header information. The switch unit 12 holds the received new packet even after notifying the control unit 11 of the header information.

When control information corresponding to the header information is set by the control unit 11 as a result of notification of the header information (inquiry about control information), the switch unit 12 processes the held new packet according to the control information.

Control information indicating permission for communication by the new packet designates an output of a packet matching the header information and a communication interface to be used in the output. Thus, in a case where the control information indicating permission for communication by the new packet is set, the switch unit 12 outputs the held new packet from a communication interface designated by the control information. Also, the control information matches header information of a packet in the same flow as the new packet. Thus, subsequently, in a case of receiving a packet in the same flow as the new packet, the switch unit 12 outputs the packet from the communication interface designated by the control information without notifying the control unit 11 of header information.

Also, control information indicating non-permission for communication by the new packet designates to discard a packet matching the header information. Thus, in a case where the control information indicating non-permission for communication by the new packet is set, the switch unit 12 discards the held new packet according to the control information. Also, the control information matches header information of a packet in the same flow as the new packet.

Thus, subsequently, in a case where a packet in the same flow as the new packet is received, the switch unit 12 discards the packet according to the control information without notifying the control unit 11 of header information.

When receiving a notification of header information of a packet from the switch unit 12, the control unit 11 sets, in the switch unit 12, control information defining an operation of the switch unit 12 according to the header information. The control unit 11 determines whether to set control information indicating permission for communication by the packet or to set control information indicating non-permission for communication by the packet on the basis of the held list.

FIG. 3 is a schematic diagram illustrating an example of a list (whitelist) held by the control unit 11. In FIG. 3, a number of each record in the list is also illustrated for convenience. Each of the records in the list includes a plurality of items in which conditions for permitting communication can be described. Then, a condition is described in at least a part of the plurality of items.

The example illustrated in FIG. 3 includes items such as a "destination domain name," a "transmission source process name," a "user name of a transmission source process," and a "destination IP address." The items included in the record are not limited to these, and items corresponding to a "transmission source IP address," a "transmission source media access control (MAC) address," a "destination MAC address," and the like may be included, for example.

In the example illustrated in FIG. 3, a specific destination domain name is described as a condition for permitting communication in the item of a "destination domain name" and the other items are set to any (arbitrary) in the first and second records. Also, in the third and fourth records, a specific process name is described as a condition for permitting communication in the item of a "transmission source process name," and the other items are set to any. Also, in the fifth and sixth records, a specific user name is described as a condition for permitting communication in the item of a "user name of a transmission source process," and the other items are set to any. Note that conditions may be described in two or more items.

Note that the domain name, the process name, and the user name of a process are specified by utilization of an IP address included in header information.

In the item of an "output interface," a communication interface described, as an output destination of a packet, in control information that is generated in a case where a condition described in a record is satisfied and that indicates permission for communication is described.

In supplementary information, information indicating an exception, information indicating that a record is added by learning, or the like is described. For example, it is described that "destination port numbers 20 and 21 are not permitted" in the third record illustrated in FIG. 3. In this case, a transmission source process name specified by utilization of an IP address included in header information is "/bin/abc." Even when a condition described in the third record is satisfied, in a case where a destination port number included in the header information is 20 or 21, the control unit 11 sets control information indicating non-permission for communication. Also, in the example illustrated in FIG. 3, "added by learning" is described in the second, fourth, and sixth records. This indicates that the second, fourth, and sixth records are records added by learning. Also, the first, third, and fifth records are records acquired by an input into the management server 20 by an administrator of the gateway 10 and transmission by the management server 20 to the control unit 11. That is, the first, third, and fifth records are records created by the administrator.

A state in which the control unit 11 learns a new record is referred to as a learning mode. Before the learning mode is set, an item a condition of which is learned in an added record (that is, item in which condition is described) is designated by the administrator. This designation of an item is performed by utilization of a learning item setting table (described later). In the present exemplary embodiment, it is assumed that at least an item corresponding to a condition that can be specified from an IP address (such as "destination domain name," "transmission source process name," "user name of transmission source process," or the like) is designated.

In the learning mode, when header information of a new packet is notified by the switch unit 12, the control unit 11 always sets, in the switch unit 12, control information indicating permission for communication by the new packet.

Also, the control unit 11 creates a record in which a condition (such as destination domain name or the like) specified from an IP address in the header information is described in a designated item, and adds the record to a list. The operation of creating a record and adding the record to the list may be performed after the learning mode is over. However, here, a case where the control unit 11 creates a record describing a condition and performs adding thereof during the learning mode will be described as an example.

Also, when being set to the learning mode, the control unit 11 adds one or more records to the list. The control unit 11 performs this processing immediately after being set to the learning mode. The one or more records added immediately after the learning mode is set are referred to as initial addition records. The processing of creating a record in which a condition (such as destination domain name or the like) specified from an IP address is described in a designated item, and adding the record to the list is processing different from the processing of adding one or more initial addition records to the list.

The control unit 11 includes, in the one or more initial addition records, an initial addition record in which "any" is described in all items in which conditions can be described. Also, the control unit 11 describes a specific communication interface in an item of an "output interface" in each of the initial addition records.

After the one or more initial addition records are added immediately after the learning mode is set, the control unit 11 newly creates a record when header information of a new packet is notified. In this record, the control unit 11 describes a specific condition (such as specific domain name) in a designated item among items corresponding to the condition. Moreover, the control unit 11 describes a specific communication interface in an item of an "output interface." Here, the control unit 11 determines a condition of which initial addition record among the one or more initial addition records is satisfied by information included in the header information of the new packet (destination IP address in present exemplary embodiment), and specifies an initial addition record a condition of which satisfies the information. Then, the control unit 11 describes a communication interface, which is described in the initial addition record, in an item an "output interface" in the newly-created record. Also, in an item of supplementary information in the record, the control unit 11 describes that the record is added by learning.

A state in which the control unit 11 determines whether to permit or not to permit packet communication on the basis of the list without learning a record is referred to as an operation mode.

The administrator sets the control unit 11 to one of the learning mode and the operation mode. For example, the administrator inputs, into the management server 20, whether to set the learning mode or the operation mode, and the management server 20 sets the control unit 11 to the learning mode or the operation mode according to the input.

As described above, the control unit 11 adds the one or more initial addition records to the list immediately after being set to the learning mode. FIG. 4 is a schematic diagram illustrating an example of the list to which an initial addition record is added. In the example illustrated in FIG. 4, the (n−2)th record to the nth record are initial addition records. As described above, the control unit 11 includes, in the one or more initial addition records, an initial addition record in which "any" is described in all items in which conditions can be described. In the example illustrated in FIG. 4, in the nth record, "any" is described in all items in which conditions can be described. Also, in each of the (n−2)th and (n−1)th records, a specific address is described in an item of a "destination IP address" among the items indicating conditions. Also, in each of the initial addition records, a specific communication interface is described in an item of an "output interface." In the following, an operation in which the control unit 11 sets an initial addition record will be described.

When being set to the learning mode, the control unit 11 specifies a correspondence relationship between a destination IP address and an output interface, and describes a specific address and communication interface in an item of a "destination IP address" and an item of an "output interface" of an initial addition record according to the correspondence relationship.

For example, it is assumed that a destination IP address "192.168.2.0/24" and a communication interface "Ethernet2" are associated with each other in a network configuration. Also, it is assumed that a destination IP address "192.168.3.0/24" and a communication interface "wlan0" are associated with each other. Also, it is assumed that a different destination IP address (destination IP address other than "192.168.2.0/24" and "192.168.3.0/24") is associated with a communication interface "Ethernet1." In this case, as an initial addition record, the control unit 11 adds a record in which "192.168.2.0/24" is described as the "destination IP address," "Ethernet2" is described as the "output interface," and "any" is described in the other items (see (n−2)th record illustrated in FIG. 4) to the list. Similarly, as an initial addition record, the control unit 11 adds a record in which "192.168.3.0/24" is described as the "destination IP address," "wlan0" is described as the "output interface," and "any" is described in the other items (see (n−1)th record illustrated in FIG. 4) to the list. Also, on the basis of the association between the different destination IP address (destination IP address other than "192.168.2.0/24" and "192.168.3.0/24") and the communication interface "Ethernet1," the control unit 11 adds a record in which "Ethernet1" is described as the "output interface" and "any" is described in other items (see nth record illustrated in FIG. 4) to the list as an initial addition record. Note that an initial addition record in which all items other than the "output interface" are "any" has lower priority than other initial addition records.

As described above, the control unit 11 creates, as one of the initial addition records, a record in which "any" is described in all items other than the "output interface." Thus, in the initial addition records, there is a record in which "any" is described in all items in which conditions can be described.

In records other than the initial addition records, there is no record in which "any" is described in all items in which conditions can be described.

Note that in a case of being switched from the learning mode to the operation mode, the control unit 11 deletes all the initial addition records from the list.

Next, an operation of when the control unit 11 receives a notification of header information of a new packet from the switch unit 12 after adding the initial addition records in the learning mode will be described. The control unit 11 checks a destination IP address of the header information against destination IP addresses described in the initial addition records in descending order of priority of the initial addition records. In a case where the two match up, the control unit 11 creates a record in which the destination IP address is described in an item of the "destination IP address," a condition (such as destination domain name or the like) specified from an IP address in the header information is described in a previously-designated item, a communication interface described in the initial addition record is described in an item of the "output interface," and addition being performed by learning is described in an item of the "supplementary information." The control unit 11 describes "any" in all other items in the record and adds the record to the list. Also, the control unit 11 sets, in the switch unit 12, control information indicating permission for communication by the new packet. Also, in a case where the destination IP addresses do not match up, the control unit 11 performs similar processing by using an initial addition record of the next priority. Even when no match with the destination IP address is kept acquired, the control unit 11 assumes that a destination IP address in the initial addition record in which "any" is described in all items in which conditions can be described (nth record illustrated in FIG. 4) matches the destination IP address in the header information. In this case, the control unit 11 creates a record in which a condition (such as destination domain name or the like) specified from the IP address in the header information is described in a previously-designated item, a communication interface described in the initial addition record is described in an item of the "output interface," and addition being performed by learning is described in an item of "supplementary information." The control unit 11 describes "any" in all other items in the record and adds the record to the list. Also, the control unit 11 sets, in the switch unit 12, control information indicating permission for communication by the new packet.

In the initial addition records, there is a record in which "any" is described in all items in which conditions can be described. Thus, in the learning mode, when header information of a new packet is notified by the switch unit 12, the control unit 11 always sets, in the switch unit 12, control information indicating permission for communication by the new packet.

In the following, in order to simplify the description, it is assumed that a new record is created on the assumption that a destination IP address of header information of a new packet matches a destination IP address in an initial addition record in which "any" is described in all items in which conditions can be described (nth record illustrated in FIG. 4). That is, in order to simplify the description, the description will be made on the assumption that a new record is created on the basis of the last initial addition record illustrated in FIG. 4. That is, the description will be made on the assumption that the header information of the new packet does not match the (n−2)th record and the (n−1)th record illustrated in FIG. 4, but matches the nth record.

Also, in a case where the control unit 11 sets control information indicating permission for communication in the switch unit 12, a condition (such as specific domain name, process name, user name, or the like) in a list serving as a basis of the permission or a log describing information specified from the IP address is transmitted to the management server 20. Also, in a case of being the learning mode, the control unit 11 also describes in the log that the mode is the learning mode.

FIG. 5 is a schematic diagram illustrating an example of a log of a case where control information indicating permission for communication is set in the switch unit 12. In FIG. 5, a number of each log is also illustrated for convenience. In the example illustrated in FIG. 5, the first and third logs are logs created in the operation mode. The first log indicates that communication is permitted since a domain name (www.sssss.com) specified from an IP address is described in the list in the operation mode. The third log indicates that communication is permitted since a process name (/usr/bin/abc) specified from an IP address is described in the list in the operation mode. Also, the second and fourth logs are logs created in the learning mode. In the learning mode, the control unit 11 always sets, in the switch unit 12, control information indicating permission for communication. The second log indicates that a domain name specified from an IP address is "www.uuuuu.com." The fourth log indicates that a process name specified from the IP address is "/usr/bin/def."

Also, in a case of setting, in the switch unit 12, control information indicating non-permission for communication, the control unit 11 transmits a log indicating this to the management server 20.

Also, in a case of being notified of header information in which a destination IP address and a transmission source IP address are opposite to those in header information corresponding to the already-set control information indicating permission for communication, the control unit 11 sets, in the switch unit 12, control information to transmit a packet to the destination IP address included in the header information.

Next, a learning item setting table will be described. The learning item setting table is used to designate an item corresponding to a condition to be learned in the learning mode. FIG. 6 is a schematic diagram illustrating an example of the learning item setting table. In FIG. 6, the learning item setting table is illustrated in two stages for convenience.

Columns from the "input interface" to the "user name of a transmission source process" illustrated in FIG. 6 are used to designate whether a condition is to be learned in the learning mode. The administrator describes, in a case of designating that a condition is to be learned in the learning mode, "1" in a column corresponding to the condition, and describes, in a case of designating that a condition is not a condition to be learned, "0" in a column corresponding to the condition. For example, in a case of designating only the "destination domain name" as a condition to be learned in the learning mode, the administrator describes "1" in a column of the "destination domain name," and describes "0" in the other columns from the "input interface" to the "user name of a transmission source process." In this case, a record in which a specific domain name is described in an item of the "destination domain name" and "any" is described in items corresponding to other conditions is generated. Note that "1" may be described in a plurality of columns. However, for example, in a case where a new record is generated on the basis of the (n−2)th or (n−1)th record illustrated in FIG. 4, a specific destination domain name is described in the newly generated record even when "0" is described in a column of the "destination domain name" in the learning item setting table.

Any one of the following four kinds of learning conditions is described in a column of the learning condition. That is, the administrator selects any one of the following first to fourth learning conditions and describes the mode in the column of the learning condition.

First learning condition: A specific condition to be described in a new record is specified on the basis of a packet transmitted by a device under the gateway 10 (such as camera 51 or the like) with a general server 30 as a destination.

Second learning condition: A specific condition to be described in a new record is specified on the basis of a packet transmitted by a general server 30 with a device under the gateway 10 (such as camera 51 or the like) as a destination.

Third learning condition: A specific condition to be described in a new record is specified on the basis of a packet a transmission source of which is a process of the gateway 10.

Fourth learning condition: A specific condition to be described in a new record is specified on the basis of a packet a destination of which is a process of the gateway 10.

However, the above first to fourth learning conditions are examples, and a method of dividing the learning conditions is not limited to the above example.

Note that according to a communication interface of the gateway 10 which interface receives a packet, the control unit 11 can distinguish a packet transmitted by a device under the gateway 10 with the server 30 as a destination from a packet transmitted by the server 30 with a device under the gateway 10 as a destination. For example, the control unit 11 can determine that a packet received by the wireless LAN IF 61 is the former and a packet received by the Ethernet IF 62 is the latter.

Also, it is set that a communication interface described in an initial addition record that matches header information of a new packet is described in a column of the "output interface" in the learning item setting table (see FIG. 6). Thus, for example, in a case where the control unit 11 generates a new record on the basis of the (n−2)th record described in FIG. 4, "Ethernet2" is described as an "output interface" in the new record. Also, for example, in a case where the control unit 11 generates a new record on the basis of the nth record described in FIG. 4, "Ethernet1" is described as an "output interface" in the new record.

The administrator sets contents of the learning item setting table by using the management server 20. That is, the management server 20 receives an input of contents of the learning item setting table from the administrator and notifies the control unit 11 of the contents. Then, the control unit 11 holds a learning item setting table storing the contents set by the administrator.

Figure 7:
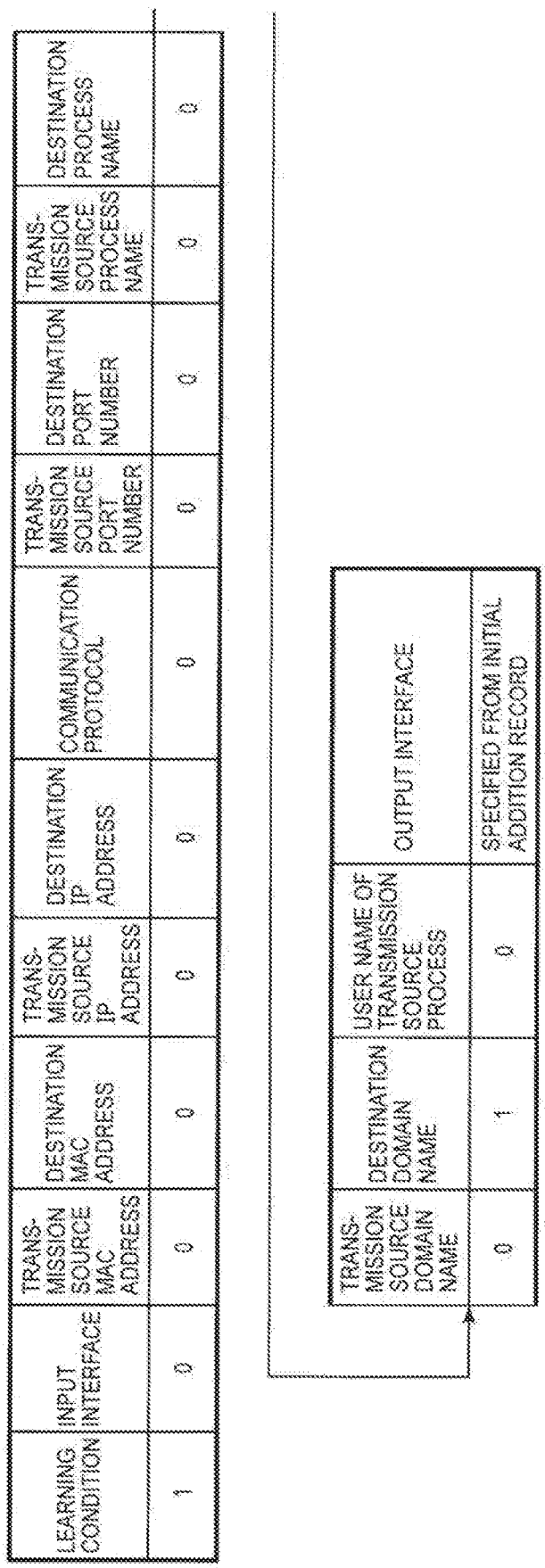
FIG. 7 It depicts a schematic diagram illustrating an example of a learning item setting table in which a first learning condition is designated and only a "destination domain name" is designated as a condition to be learned in a learning mode.

FIG. 7 is an example of a learning item setting table in which the first learning condition is designated and only a "destination domain name" is designated as a condition to be learned in the learning mode. It is assumed that the learning item setting table illustrated in FIG. 7 is set and the learning mode is set. In this case, when header information of a packet received by the wireless LAN IF 61 is notified by the switch unit 12, the control unit 11 sets, in the switch unit 12, control information indicating permission for communication by the packet. Moreover, a destination domain name is specified from an IP address included in the header information.

Note that it is assumed that "1" is described not only in the column of the destination domain name but also in a column of a destination IP address in the example illustrated in FIG. 7. In this case, the control unit 11 also specifies the destination IP address from the notified header information. Also, in this case, the control unit 11 may specify only a destination domain name in a case where the destination domain name can be specified from the IP address, and may specify a destination IP address in a case where a destination domain name cannot be specified.

Figure 8:
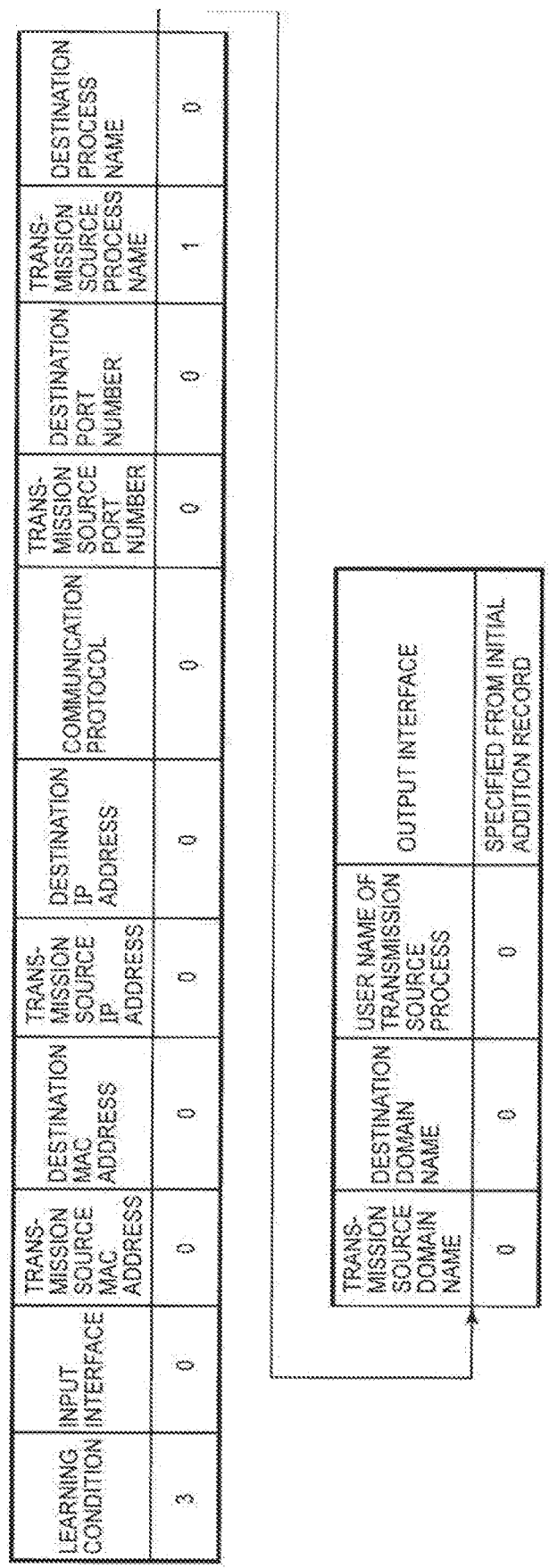
FIG. 8 It depicts a schematic diagram illustrating an example of a learning item setting table in which a third learning condition is designated and only a "transmission source process name" is designated as a condition to be learned in the learning mode.

FIG. 8 is an example of a learning item setting table in which the third learning condition is designated and only a "transmission source process name" is designated as a condition to be learned in the learning mode. It is assumed that the learning item setting table illustrated in FIG. 8 is set and the learning mode is set. In this case, when header information of a packet generated by a process is notified by the switch unit 12, the control unit 11 sets, in the switch unit 12, control information indicating permission for communication by the packet. Moreover, a transmission source process name is specified by utilization of an IP address included in the header information.

Figure 9:
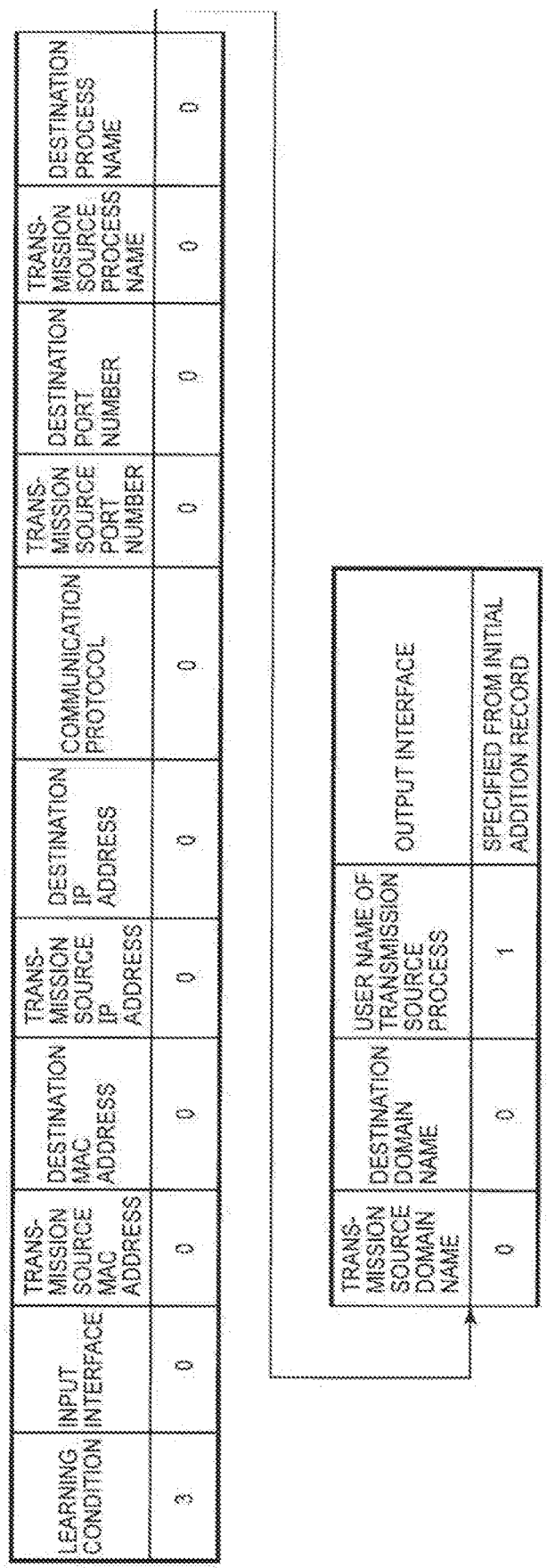
FIG. 9 It depicts a schematic diagram illustrating an example of a learning item setting table in which a third learning condition is designated and only a "user name of a transmission source process" is designated as a condition to be learned in the learning mode.

FIG. 9 is an example of a learning item setting table in which the third learning condition is designated and only a "user name of a transmission source process" is designated as a condition to be learned in the learning mode. It is assumed that the learning item setting table illustrated in FIG. 9 is set and the learning mode is set. In this case, when header information of a packet generated by a process is notified by the switch unit 12, the control unit 11 sets, in the switch unit 12, control information indicating permission for communication by the packet. Moreover, a user name of a transmission source process is specified by utilization of an IP address included in the header information.

A case where only one kind of a condition to be learned is designated is illustrated in each of FIG. 7 to FIG. 9. However, a plurality of kinds of conditions to be learned may be set.

Also, regardless of the operation mode or the learning mode, the control unit 11 sets control information indicating permission for communication in the switch unit 12 with respect to a packet having an IP address of the DNS server 40 as a destination IP address (DNS query), or a packet having the IP address of the DNS server 40 as a transmission source IP address (DNS query response) independently from the list.

Also, when the switch unit 12 receives the DNS query response from the DNS server 40, the control unit 11 extracts a correspondence relationship between a domain name and an IP address from the DNS query response, and stores the correspondence relationship. The DNS query response is a packet transmitted by the DNS server 40 as a response to the DNS query, and includes a domain name included in the DNS query and an IP address acquired by the DNS server 40 through name resolution. For example, the camera 51 transmits a DNS query and receives a DNS query response. Subsequently, the camera 51 transmits a packet with an IP address included in the DNS query response as a destination IP address. Here, since storing a relationship between the IP address and the domain name, the control unit 11 can specify a domain name from the destination IP address.

The control unit 11 stores a correspondence relationship between a domain name and an IP address, and also stores an expiration date of the correspondence relationship. Then, the control unit 11 deletes an expired correspondence relationship from a storage area.

The control unit 11 and the switch unit 12 are realized, for example, by a central processing unit (CPU) of a computer that operates according to a communication program. In this case, the CPU reads a communication program from a program recording medium such as a program storage apparatus (not illustrated) of the computer, and operate as the control unit 11 and the switch unit 12 according to the program.

Next, an example of processing progress in the first exemplary embodiment will be described. FIG. 10 and FIG. 11 are sequence diagrams illustrating an example of processing progress in the learning mode. Here, a case where the learning item setting table illustrated in FIG. 7 is set will be described as an example. That is, a case where the first learning condition is designated and a "destination domain name" is designated as a condition to be learned in the learning mode will be described as an example. Also, it is assumed that the control unit 11 is set to the learning mode by the administrator and adds initial addition records ((n−2)th, (n−1)th, and nth record) illustrated in FIG. 4 to the list. As described above, in order to simplify the description, it is assumed that a new record is created on the basis of the last initial addition record (nth record).

First, in a case where communication with the server 30 is performed via the gateway 10, the camera 51 transmits a DNS query including a domain name "www.uuuuu.com" (Step S1).

The switch unit 12 receives the DNS query. Here, it is assumed that the DNS query is a new packet. In this case, the switch unit 12 notifies the control unit 11 of header information of the DNS query (Step S2). Note that a case where the switch unit 12 notifies the control unit 11 of the header information by sending a copy of the received packet to the control unit 11 will be described here as an example. Also, the switch unit 12 holds the DNS query received from the camera 51.

A destination IP address of the DNS query is an IP address of the DNS server 40. In this case, the control unit 11 sets control information, which indicates permission for communication, in the switch unit 12 without referring to the list (Step S3). That is, the control unit 11 sets, in the switch unit 12, control information that defines to output a packet from a communication interface used for communication with the DNS server 40. Note that, for example, the control unit 11 may hold a list of destination IP addresses communication of which should be permitted (IP address of predetermined specific server), separately from the list exemplified in FIG. 4. Then, since the IP address of the DNS server 40 is included in the list, the control unit 11 sets, in the switch unit 12, control information indicating permission for communication in Step S3, as described above.

Next, the switch unit 12 outputs the held DNS query from a designated communication interface according to the control information set in Step S3 (Step S4). As a result, the DNS server 40 receives the DNS query.

Then, the DNS server 40 requests an IP address corresponding to the domain name "www.uuuuu.com" included in the DNS query. The DNS server 40 transmits a DNS query response including the domain name and the IP address and information indicating an expiration date of a correspondence between the two (Step S5).

The switch unit 12 receives the DNS query response. This DNS query response is a new packet. In this case, the switch unit 12 notifies the control unit 11 of header information of the DNS query response by sending a copy of the DNS query response to the control unit 11 (Step S6). Also, the switch unit 12 holds the received DNS query response.

The control unit 11 newly stores a correspondence relationship among the domain name "www.uuuuu.com," the IP address, and the expiration date with reference to the DNS query response (Step S7).

Also, a transmission source IP address of the DNS query response is an IP address of the DNS server 40. In this case, the control unit 11 sets control information, which indicates permission for communication, in the switch unit 12 without referring to the list (Step S8). That is, the control unit 11 sets, in the switch unit 12, control information that defines to output a packet from a communication interface used for communication with the camera 51.

Next, the switch unit 12 outputs the held DNS query response from the designated communication interface according to the control information set in Step S8 (Step S9). As a result, the camera 51 receives the DNS query response. Then, the camera 51 recognizes an IP address corresponding to "www.uuuuu.com" (that is, IP address of server 30).

Although omitted in the above description, the control unit 11 notifies the management server 20 of contents of the control information after Step S3 and S8.

Subsequent operations will be described with reference to FIG. 11.

The camera 51 transmits an SYN packet a destination of which is the IP address of the server 30 (Step S11).

The switch unit 12 receives the SYN packet. This SYN packet is a new packet. That is, control information that matches header information of the SYN packet is not set in the switch unit 12 yet. In this case, the switch unit 12 notifies the control unit 11 of the header information of the SYN packet (Step S12). Also, the switch unit 12 holds the SYN packet.

Since the header information of the SYN packet matches the nth record illustrated in FIG. 4, the control unit 11 generates control information, which indicates permission for communication by the SYN packet, as control information corresponding to the header information of the SYN packet (Step S13). Here, as an output destination of the packet, the control unit 11 describes, in the control information, a communication network described as an "output destination interface" in the nth record illustrated in FIG. 4.

Also, the control unit 11 specifies a destination domain name from a destination IP address included in the header information notified in Step S12, generates a log in which the destination domain name, information indicating permission for communication, and a mode being the learning mode are described, and stores the log (Step S14). The control unit 11 stores the correspondence relationship among the domain name "www.uuuuu.com," the IP address, and the expiration date in Step S7. The control unit 11 specifies a destination domain name on the basis of the destination IP address included in the header information and the correspondence relationship. In the present example, the control unit 11 generates and stores a second log illustrated in FIG. 5.

Moreover, the control unit 11 adds a record in which the destination domain name specified in Step S14 is described to the list (Step S15). In an item of an output interface of this record, the control unit 11 describes a communication network described as an "output destination interface" in the nth record illustrated in FIG. 4. Also, for example, the control unit 11 describes "added by learning" as supplementary information of this record. The control unit 11 describes "any" in all the other items. An example of the list to which the record is added in Step S15 is illustrated in FIG. 12. The last record illustrated in FIG. 12 is the record added in Step S15.

Next, the control unit 11 sets the control information generated in Step S13 in the switch unit 12 (Step S16). The switch unit 12 outputs the held SYN packet according to the control information. That is, the switch unit 12 outputs the held SYN packet from the communication interface designated in the control information (Step S17). As a result, the server 30 receives the SYN packet.

Also, the control unit 11 transmits the log generated in Step S14 to the management server 20 (Step S18). In the present example, the control unit 11 transmits the second log illustrated in FIG. 5 to the management server 20.

The server 30 transmits, as a response to the SYN packet, an SYN_ACK packet, a transmission source of which is the IP address of the server 30, with the IP address of the camera 51 as a destination (Step S19). That is, a destination IP address and a transmission source IP address are opposite in the SYN_ACK packet and the SYN packet.

The switch unit 12 receives the SYN_ACK packet. Control information that matches header information of this SYN_ACK packet is not set in the switch unit 12 yet. In this case, the switch unit 12 notifies the control unit 11 of the header information of the SYN_ACK packet (Step S20). Also, the switch unit 12 holds the SYN_ACK packet.

Here, a destination IP address and a transmission source IP address in the header information of the SYN_ACK packet are opposite to the destination IP address and transmission source IP address in the header information corresponding to the already-set control information indicating permission for communication (control information set in Step S16). Thus, the control unit 11 sets, in the switch unit 12, control information for transmitting a packet to the destination IP address included in the header information of the SYN_ACK packet. That is, the control unit 11 sets, in the switch unit 12, control information that defines to output a packet from a communication interface used for communication with the camera 51 indicated by the destination IP address (Step S21).

The switch unit 12 outputs the held SYN_ACK packet according to the control information set in Step S21 (Step S22). As a result, the camera 51 receives the SYN_ACK packet.

Also, for example, the control unit 11 transmits information indicating contents of "communication permitted" to the management server 20 (Step S23).

The camera 51 that receives the SYN_ACK packet transmits an ACK packet (Step S24). Header information of the ACK packet is the same as the header information of the SYN packet. Thus, the control information set in Step S16 matches the header information of the ACK packet. Thus, the switch unit 12 outputs an ACK packet according to the control information (Step S25). As a result, the server 30 receives the ACK packet.

Figure 13:
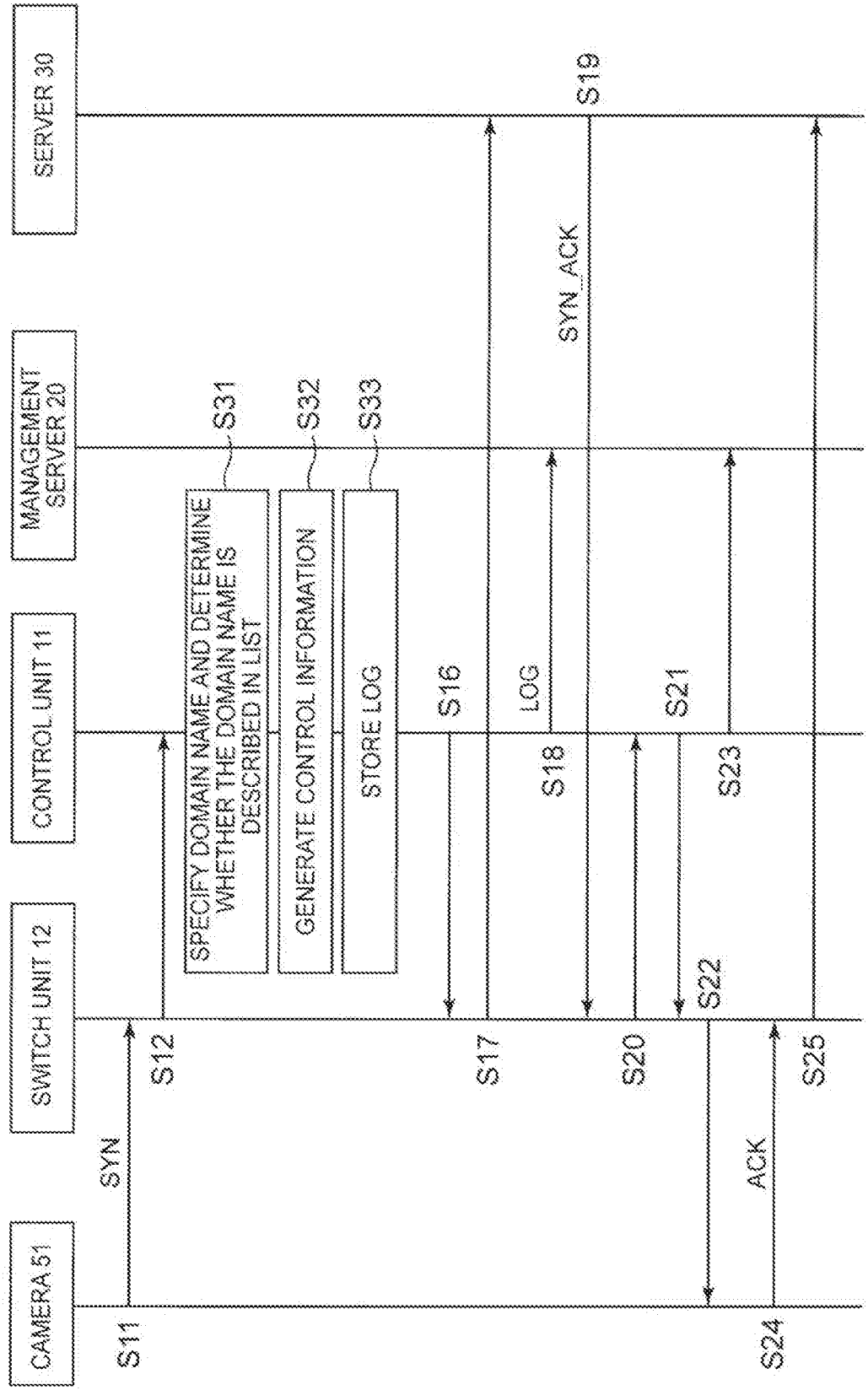
FIG. 13 It depicts a sequence diagram illustrating an example of processing progress in an operation mode.

FIG. 13 is a sequence diagram illustrating an example of processing progress in the operation mode. Here, a case where the control unit 11 holds the list illustrated in FIG. 14 will be described as an example. In a case of being switched from the learning mode to the operation mode, the control unit 11 deletes all the initial addition records from the list. Thus, there is no initial addition record in the list illustrated in FIG. 14. Also in the following example, a case where the camera 51 communicates with the server 30 via the gateway 10 will be described as an example.

Operations in Steps S1 to S9 are similar to the operations in Steps S1 to S9 in the learning mode (see FIG. 10), and a description thereof is omitted here. In FIG. 13, processing progress after Step S9 in the operation mode is illustrated. Also, an operation similar to the already-described operation is indicated by a sign identical to that in FIG. 11, and a detailed description thereof is omitted arbitrarily.

Steps S11 and S12 are similar to Steps S11 and S12 in the learning mode (see FIG. 11), and a description thereof is omitted.

When header information is notified by the switch unit 12, the control unit 11 determines whether information included in the header information or information specified from an IP address included in the header information is described in any record in the list. In the present example, in a case of referring to the mth record illustrated in FIG. 14, the control unit 11 specifies a destination domain name from a destination IP address included in the header information. The control unit 11 stores the correspondence relationship among the domain name "www.uuuuu.com," the IP address, and the expiration date in Step S7. The control unit 11 specifies a destination domain name "www.uuuuu.com" on the basis of the destination IP address included in the header information and the correspondence relationship. In the mth record in FIG. 14, "www.uuuuu.com" is described as the destination domain name. Thus, the control unit 11 determines that a record describing the destination domain name specified from the destination IP address exists in the list (Step S31).

Thus, the control unit 11 generates control information indicating permission for communication by the SYN packet (Step S32). Here, as an output destination of the packet, the control unit 11 describes, in the control information, an output interface described in a record in which the destination domain name specified in Step S31 is described. In the present example, the control unit 11 describes an output interface "Ethernet1" described in the mth record illustrated in FIG. 14 in the control information.

Also, the control unit 11 generates and stores a log in which the destination domain name specified from the destination IP address and information indicating that communication is permitted are described (Step S33). Note that in the present exemplary embodiment, it is assumed that a log that is not described to be in the learning mode is a log generated in the operation mode. For example, the control unit 11 generates a log describing "permit communication to www.uuuuu.com."

Next, the control unit 11 sets the control information generated in Step S32 in the switch unit 12 (Step S16). The switch unit 12 outputs the held SYN packet from a communication interface designated in the control information (Step S17). As a result, the server 30 receives the SYN packet.

Also, the control unit 11 transmits the log generated in Step S33 to the management server 20 (Step S18).

Operations in and after Step S19 are similar to the already-described operations in and after Step S19 in the learning mode (see FIG. 11), and a description thereof is omitted.

Also, in Step S31, it is assumed that the control unit 11 determines that the information included in the header information or the information specified from the IP address included in the header information is not described in any record in the list. In this case, the control unit 11 generates, in Step S32, control information indicating non-permission for communication by the SYN packet. That is, the control unit 11 generates control information, which defines discarding of the packet, as control information corresponding to the notified header information. Also, in Step S33, the control unit 11 generates and stores a log describing that the communication is not permitted.

Then, the control unit 11 sets the control information in the switch unit 12 in Step S16. The switch unit 12 discards the held SYN packet according to the control information. Thus, in this case, the SYN packet is not transmitted to the server 30, and processing in and after Step S19 is not performed.

Also, the control unit 11 transmits the log generated in Step S33 (log describing that communication is not permitted, in present example) to the management server 20 (Step S18).

When receiving the log from the control unit 11 in the learning mode or the operation mode, the management server 20 stores the log and displays the log according to operation by the administrator. Thus, the administrator can browse the log.

Also, in the above example, a case where the control unit 11 adds a new record to the list in Step S15 while being set in the learning mode has been described. An operation of adding a new record to a list may be executed when the learning mode is released (that is, when switching from learning mode to operation mode is performed). In this case, when generating a log in Step S14, the control unit 11 also describes a communication interface to be an output destination of a packet (communication interface described in control information in Step S13) in the log. The control unit 11 may store the log in Step S14. When being released from the learning mode, the control unit 11 may generate, on the basis of the stored log, a record in which a condition for permitting communication (destination domain name "www.uuuuu.com" in above example) and an output interface are described and in which "added by learning" is described as supplementary information, and may add the record to the list. Also, in a case where header information is notified for a plurality of times during the learning mode, the control unit 11 generates records the number of which corresponds to the number of times thereof, and adds the records to the list. This point is similar in an example described later.

Also, the control unit 11 transmits the log to the management server 20, and the management server 20 stores the log. Then, the administrator who browses the log may set contents of the record to be added. In this case, the management server 20 displays the log according to operation by the administrator. Then, the record to be added is input by the administrator, and the management server 20 transmits the record to the control unit 11. The control unit 11 adds the record received from the management server 20 to the list. A record may be added to the list by such a method.

FIG. 15 is a sequence diagram illustrating a different example of processing progress in the learning mode. Here, a case where the learning item setting table illustrated in FIG. 8 is set will be described as an example. That is, a case where the third learning condition is designated and a "transmission source process name" is designated as a condition to be learned in the learning mode will be described as an example. It is assumed that the control unit 11 adds an initial addition record to a list by being set to the learning mode. In the present example, it is assumed that the (n-2)th to nth records illustrated in FIG. 4 are added. Also, in order to simplify a description, the description will be made on the assumption that a new record is created on the basis of the last initial addition record illustrated in FIG. 4 (nth record illustrated in FIG. 4).

First, a process A 13 transmits an SYN packet a destination of which is an IP address of the server 30 (Step S41).

The switch unit 12 receives the SYN packet. This SYN packet is a new packet. That is, control information that matches header information of the SYN packet is not set in the switch unit 12 yet. In this case, the switch unit 12 notifies the control unit 11 of the header information of the SYN packet (Step S42). Also, the switch unit 12 holds the SYN packet.

Since the header information of the SYN packet matches the nth record illustrated in FIG. 4, the control unit 11 generates control information, which indicates permission for communication by the SYN packet, as control information corresponding to the header information of the SYN packet (Step S43). Here, as an output destination of the packet, the control unit 11 describes, in the control information, a communication network described as an "output destination interface" in the nth record illustrated in FIG. 4.

Also, the control unit 11 specifies a transmission source process name by using a destination IP address included in the notified header information, and generates and stores a log in which the transmission source process name, information indicating permission for communication, and a mode being the learning mode are described (Step S44). In the present exemplary embodiment, it is assumed that a process name is a process name described along with a process path name unless otherwise mentioned.

In the following, processing in which the control unit 11 specifies a transmission source process name will be described. More specifically, the control unit 11 specifies a transmission source process name from a destination IP address, a destination port number, and a protocol included in header information. This method may be a known method. In the following, an example of an operation in which the control unit 11 specifies a transmission source process name will be described.

The control unit 11 acquires a destination IP address, a destination port number, and a protocol from header information notified by the switch unit 12.

Then, with the destination IP address and the destination port number as keys, the control unit 11 searches for an i-node number used by a process for socket communication. For example, a CPU of the gateway 10 describes the correspondence relationship among the destination IP address, the destination port number, and the i-node number in a predetermined file corresponding to the protocol. The control unit 11 searches the file for the i-node number with the destination IP address and the destination port number as keys. On the basis of the protocol acquired from the header information, the control unit 11 specifies a file in which an i-node number is to be searched for.

Next, the control unit 11 detects a process ID corresponding to the i-node number. For example, the CPU describes a correspondence relationship between the i-node number and the process ID in a file under a plurality of predetermined paths. The control unit 11 detects a process ID corresponding to the i-node number from these files.

Next, with the process ID as a key, the control unit 11 searches for a process name itself (process name in which process path name is not described) and a process path name of the process. For example, the CPU describes a correspondence relationship between the process name itself and the process ID in a predetermined file corresponding to the process ID (referred to as first file). Also, the CPU describes a correspondence relationship between the process ID and the process path in a different predetermined file corresponding to the process ID (referred to as second file). The control unit 11 searches the first file for a process name itself with the process ID as a key, and searches the second file for a process path name with the process ID as a key.

Next, the control unit 11 connects the retrieved process path name and the process name. As a result, the process path name described along with the process path name is specified.

In the present example, it is assumed that "/bin/ghi" is specified as a transmission source process name.

After Step S44, the control unit 11 adds a record in which the specified transmission source process name is described to the list (Step S45). In an item of an output interface of this record, the control unit 11 describes a communication network described as an "output destination interface" in the nth record illustrated in FIG. 4. Also, for example, the control unit 11 describes "added by learning" as supplementary information of this record. The control unit 11 describes "any" in all the other items. An example of the list to which the record is added in Step S45 is illustrated in FIG. 16. The last record illustrated in FIG. 16 is the record added in Step S45.

Next, the control unit 11 sets the control information generated in Step S43 in the switch unit 12 (Step S46). The switch unit 12 outputs the held SYN packet from the communication interface designated in the control information according to the control information (Step S47). As a result, the server 30 receives the SYN packet.

Also, the control unit 11 transmits the log generated in Step S44 to the management server 20 (Step S48).

As a response to the SYN packet, the server 30 transmits an SYN_ACK packet, a transmission source of which is an IP address of the server 30, with the transmission source IP address of the SYN packet as a destination (Step S49). That is, a destination IP address and a transmission source IP address are opposite in the SYN_ACK packet and the SYN packet.

The switch unit 12 receives the SYN_ACK packet. Control information that matches header information of this SYN_ACK packet is not set in the switch unit 12 yet. In this case, the switch unit 12 notifies the control unit 11 of the header information of the SYN_ACK packet (Step S50). Also, the switch unit 12 holds the SYN_ACK packet.

Here, a destination IP address and a transmission source IP address in the header information of the SYN_ACK packet are opposite to the destination IP address and transmission source IP address in the header information corresponding to the already-set control information indicating permission for communication (control information set in Step S46). Thus, the control unit 11 sets, in the switch unit 12, control information for transmitting a packet to the destination IP address included in the header information of the SYN_ACK packet (Step S51).

The switch unit 12 sends the held SYN_ACK packet to the process A 13 according to the control information set in Step S51 (Step S52).

Also, for example, the control unit 11 transmits information indicating contents of "communication permitted" to the management server 20 (Step S53).

The process A 13 that receives the SYN_ACK packet transmits an ACK packet (Step S54). Header information of the ACK packet is the same as the header information of the SYN packet. Thus, the control information set in Step S46 matches the header information of the ACK packet. Thus, the switch unit 12 outputs an ACK packet according to the control information (Step S55). As a result, the server 30 receives the ACK packet.

Figure 17:
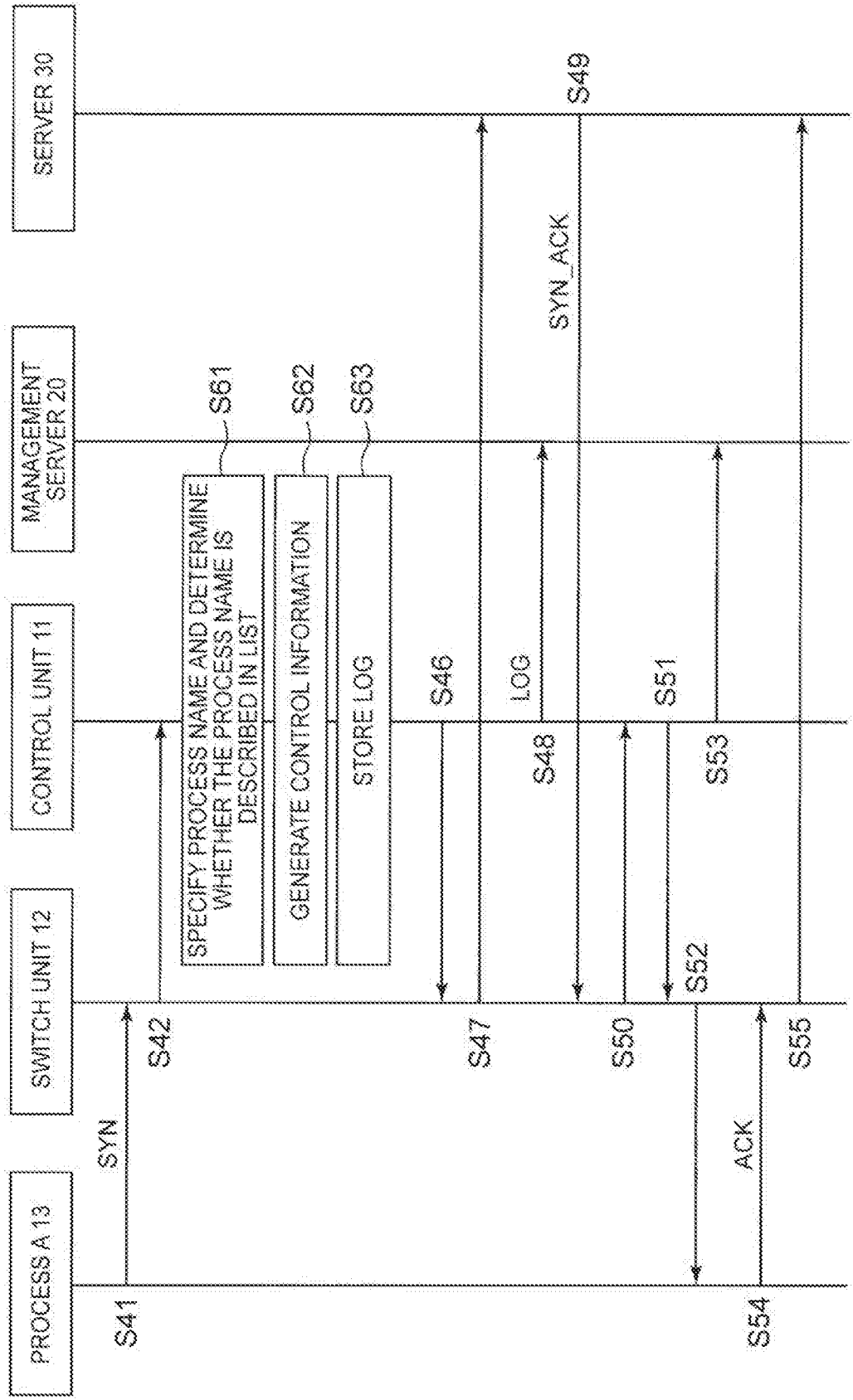
FIG. 17 It depicts a sequence diagram illustrating an example of processing progress in the operation mode.

FIG. 17 is a sequence diagram illustrating an example of processing progress in the operation mode. Here, a case where the control unit 11 holds the list illustrated in FIG. 18 will be described as an example. In a case of being switched from the learning mode to the operation mode, the control unit 11 deletes all the initial addition records from the list. Thus, there is no initial addition record in the list illustrated in FIG. 18. Also, in the following example, a case where the process A 13 communicates with the server 30 will be described as an example.

Steps S41 and S42 are similar to Steps S41 and S42 in the learning mode (see FIG. 15), and a description thereof is omitted.

When header information is notified by the switch unit 12, the control unit 11 determines whether information included in the header information or information specified from an IP address included in the header information is described in any record in the list. In the present example, in a case of referring to the mth record illustrated in FIG. 18, the control unit 11 specifies a transmission source process name from a destination IP address included in the header information. More specifically, a transmission source process name is specified from a destination IP address, a destination port number, and a protocol included in the header information. Here, it is assumed that the specified transmission source process name is "/bin/ghi." The control unit 11 determines that a record in which the transmission source process name "/bin/ghi" is described exists in the list (Step S61).

Thus, the control unit 11 generates control information indicating permission for communication by the SYN packet (Step S62). Here, as an output destination of the packet, the control unit 11 describes, in the control information, an output interface described in the record in which the transmission source process name specified in Step S61 is described. In the present example, the control unit 11 describes, in the control information, an output interface "Ethernet1" described in the mth record illustrated in FIG. 18.

Also, the control unit 11 generates and stores a log in which the specified transmission source process name and information indicating that communication is permitted are described (Step S63). The control unit 11 generates, for example, a log describing "permit communication by/bin/ghi."

Next, the control unit 11 sets the control information generated in Step S62 in the switch unit 12 (Step S46). The switch unit 12 outputs the held SYN packet from a communication interface designated in the control information (Step S47). As a result, the server 30 receives the SYN packet.

Also, the control unit 11 transmits the log generated in Step S63 to the management server 20 (Step S48).

Operations in and after Step S49 are similar to the already-described operations in and after Step S49 in the learning mode (see FIG. 15), and a description thereof is omitted.

Also, in Step S61, it is assumed that the control unit 11 determines that the information included in the header information or the information specified from the IP address included in the header information is not described in any record in the list. In this case, the control unit 11 generates, in Step S62, control information indicating non-permission for communication by the SYN packet. That is, the control unit 11 generates control information, which defines discarding of the packet, as control information corresponding to the notified header information. Also, in Step S63, the control unit 11 generates and stores a log describing that the communication is not permitted.

Then, the control unit 11 sets the control information in the switch unit 12 in Step S46. The switch unit 12 discards the held SYN packet according to the control information. Thus, in this case, the SYN packet is not transmitted to the server 30, and processing in and after Step S49 is not performed.

Also, the control unit 11 transmits the log generated in Step S63 (log describing that communication is not permitted, in present example) to the management server 20 (Step S48).

As described above, an operation of adding a new record to a list may be executed when the learning mode is released (that is, when switching from learning mode to operation mode is performed). In this case, when generating a log in Step S44, the control unit 11 also describes a communication interface to be an output destination of a packet (communication interface described in control information in Step S43) in the log. The control unit 11 may store the log in Step S44, and may generate a record in which a condition for permitting communication (transmission source process name "/bin/ghi" in above example) and an output interface are described and in which "added by learning" is described as supplementary information and add the record to the list on the basis of the stored log when the learning mode is released.

Also, the control unit 11 transmits the log to the management server 20, and the management server 20 stores the log. Then, the administrator who browses the log may set contents of the record to be added. In this case, the management server 20 displays the log according to operation by the administrator. Then, the record to be added is input by the administrator, and the management server 20 transmits the record to the control unit 11. The control unit 11 adds the record received from the management server 20 to the list. A record may be added to the list by such a method.

Also, a "user name of a transmission source process" may be designated as a condition to be learned in the learning mode. For example, a learning item setting table exemplified in FIG. 9 may be set. In this case, in a case of being set to the learning mode, the control unit 11 may specify a user name of a transmission source process instead of performing the operation of specifying the transmission source process name in the above-described example (see FIG. 15).

Also, the control unit 11 specifies a user name of a transmission source process in a case of referring to a record, in which a "user name of a transmission source process" is described, in the operation mode.

In the following, processing in which the control unit 11 specifies a user name of a transmission source process will be described. More specifically, the control unit 11 specifies a user name of a transmission source process from a destination IP address, a destination port number, and a protocol included in header information. This method may be a known method. In the following, an example of an operation in which the control unit 11 specifies a user name of a transmission source process will be described.

The control unit 11 acquires a destination IP address, a destination port number, and a protocol from header information notified by the switch unit 12. Next, with the destination IP address and the destination port number as keys, the control unit 11 searches for an i-node number used by a process for socket communication. Next, the control unit 11 detects a process ID corresponding to the i-node number. These operations are similar to the already-described operation for detecting a process ID. As described above, the control unit 11 determines a file, in which an i-node number should be searched for, on the basis of the protocol acquired from the header information.

Next, by using a command for displaying a process being executed, the control unit 11 acquires a user name of the process (execution user name) with the process ID as a key.

According to the present exemplary embodiment, the control unit 11 can add a record of a list (whitelist) as described above. Thus, it is possible to generate a list while controlling an increase in man-hours of the administrator.

Also, in the present exemplary embodiment, a record describing a condition, which is easily understood by a user, such as a destination domain name, a transmission source process name, or a user name of a transmission source process can be added to the list, as described in the above example.

Note that a description format of the list is not necessarily a table format. For example, each record may be described in a series of character strings. Also, in this case, a description of an item corresponding to any may be omitted. This point is in a similar manner in an exemplary embodiment described later.

Second Exemplary Embodiment

Figure 19:
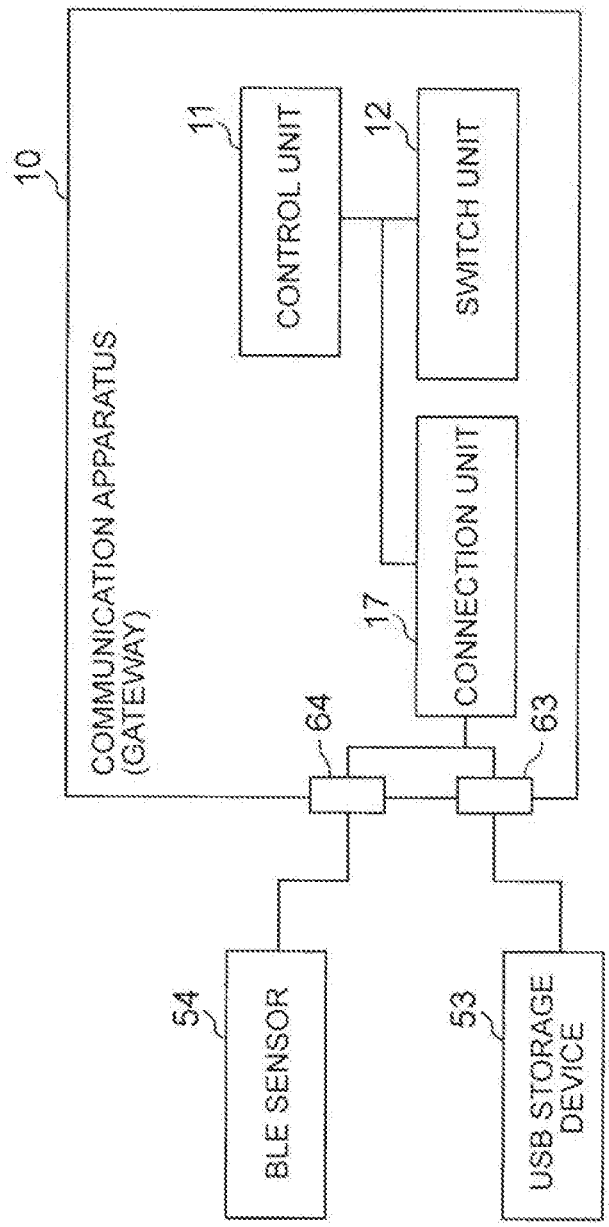
FIG. 19 It depicts a block diagram illustrating an example of a communication apparatus of a second exemplary embodiment of the present invention.

FIG. 19 is a block diagram illustrating an example of a communication apparatus (gateway) of the second exemplary embodiment of the present invention. Here, a case where the gateway 10 in the second exemplary embodiment has the components of the gateway 10 in the first exemplary embodiment will be described as an example. However, a control unit 11 and a switch unit 12 among the components described in the first exemplary embodiment are illustrated in FIG. 19. Also, the gateway 10 in the second exemplary embodiment includes a connection interface of a device, and connects a device inserted into the connection interface with the gateway 10. Here, "connect" means to bring the device inserted into the connection interface and the gateway 10 into a state in which data transmission/reception therebetween can be performed.

The control unit 11 controls not only the switch unit 12 but also a connection unit 17. A detail of the operation in which the control unit 11 controls the connection unit 17 will be described later.

Note that the gateway 10 is not necessarily a gateway including the components described in the first exemplary embodiment. In that case, a control unit that controls a connection unit 17 by an operation (described later) is provided.

In the example illustrated in FIG. 19, the gateway 10 includes a universal serial bus (USB) interface 63 and a Bluetooth (registered trademark) low energy (BLE) interface 64 as connection interfaces for a device. For example, a USB storage device 53 is attached to/detached from the USB interface 63. For example, a BLE sensor 54 is attached to/detached from the BLE interface 64. In the following, a case where a device (USB storage device 53) is inserted into the USB interface 63 will be described as an example. However, a case where a device (such as BLE sensor 54) is inserted into the BLE interface 64 is in a similar manner.

When the USB storage device 53 is inserted into the USB interface 63, the connection unit 17 once connects the USB storage device 53 and the gateway 10. Then, the connection unit 17 transmits identification information of the USB storage device 53 to the control unit 11, and disconnects connection between the USB storage device 53 and the gateway 10 or keeps the connection state according to the control by the control unit 11.

The control unit 11 holds a list of records in which identification information of a device is described. In a case where the notified identification information is not described in any of the records in the list, the control unit 11 does not permit the connection between the USB storage device 53 and the gateway 10 and notifies the connection unit 17 of that. In this case, the connection unit 17 disconnects the connection between the USB storage device 53 and the gateway 10. In a case where the notified identification information is described in any of the records in the list, the control unit 11 permits the connection between the USB storage device 53 and the gateway 10. In this case, the control unit 11 does not give a notification to the connection unit 17. The connection unit 17 keeps the connection state between the USB storage device 53 and the gateway 10 unless there is a notification by the control unit 11. It is possible to say that the above list is a whitelist.

Also, a kind of identification information is not limited to one, and there may be a plurality of kinds of identification information. Thus, in the above list, the record includes one or more items in which identification information of a device can be described, and identification information of a device is described in at least one item. Also, the record may include an item of supplementary information.

The control unit 11 is set to a learning mode or an operation mode and adds a record by learning similarly to the first exemplary embodiment. In the record added by learning, "added by learning" is described in the item of supplementary information, for example.

FIG. 20 is an example of a list used for a device connected to the USB interface 63 (hereinafter, referred to as list for USB). There are three kinds of identification information of the device connected to the USB interface 63, these being a vendor ID (VID), a product ID (PID), and a serial number. Thus, a record in the list for a USB includes items of the three kinds of identification information and an item of supplementary information, and identification information of a specific device is described in items of one or more kinds of identification information.

FIG. 21 is an example of a list used for a device connected to the BLE interface 64 (hereinafter, referred to as list for BLE). In the present exemplary embodiment, a description will be made on the assumption that there is one kind of identification information (Bluetooth device (BD) address) of a device connected to the BLE interface 64. A record of the list for BLE includes an item of the one kind of identification information (BD address) and an item of supplementary information, and a specific BD address is described in the item of the BD address.

The control unit 11 separately holds the list for a USB (see FIG. 20) and the list for BLE (see FIG. 21).

By using a management server 20 (see FIG. 1, not illustrated in FIG. 19), an administrator sets the control unit 11 to the learning mode or the operation mode. In other words, the management server 20 sets the control unit 11 to the learning mode or the operation mode according to an instruction of the administrator.

When being set to the learning mode, the control unit 11 adds an initial addition record to a list. In the second exemplary embodiment, the initial addition record is a record in which any is set to all items. Also, in the second exemplary embodiment, one initial addition record is added to one list. Also, when being set to the operation mode, the control unit 11 deletes the initial addition record from the list.

However, as described above, the control unit 11 holds the list for a USB and the list for BLE separately. Thus, when setting the control unit 11 to the learning mode, the administrator designates whether only a record in the list for a USB is learned, only a record of the list for BLE is learned, or both of the record of the list for a USB and the record in the list for BLE are learned.

In a case where it is designated that only the record in the list for a USB is learned, the control unit 11 adds an initial addition record (record in which any is set to all item) only to the list for a USB. Then, the control unit 11 learns only the record in the list for a USB, and performs an operation in the operation mode with respect to a device inserted into the BLE interface 64.

In a case where it is designated that only the record in the list for BLE is learned, the control unit 11 adds an initial addition record (record in which any is set to all item) only to the list for BLE. Then, the control unit 11 learns only the record in the list for BLE, and performs an operation in the operation mode with respect to a device inserted into the USB interface 63.

In a case where it is designated that both of the record in the list for a USB and the record in the list for BLE are learned, the control unit 11 adds an initial addition record to each of the list for a USB and the list for BLE. Then, the control unit 11 learns each of the record in the list for a USB and the record in the list for BLE.

Also, in the present exemplary embodiment, the control unit 11 holds a learning item setting table for the USB interface 63 (learning item setting table for USB, in the following) and a learning item setting table for the BLE interface 64 (learning item setting table for BLE, in the following).

FIG. 22 is a schematic diagram illustrating an example of the learning item setting table for a USB. The learning item setting table for a USB includes columns of a "VID," a "PID," and a "serial number." The administrator describes "1" in a column corresponding to identification information to be learned, and describes "0" in a column corresponding to identification information that is not a learning object. In the example illustrated in FIG. 22, a VID and a PID are set as learning objects among the three kinds of identification information.

FIG. 23 is a schematic diagram illustrating an example of the learning item setting table for BLE. The learning item setting table for BLE includes a column of a BD address. The administrator describes "1" in the column of a BD address in a case where a BD address is to be learned, and describes "0" in the column of a BD address in a case where the BD address is not a learning object.

By using a management server 20 (see FIG. 1, not illustrated in FIG. 19), the administrator sets contents of each learning item setting table. That is, the management server 20 receives an input of contents of the learning item setting table for a USB and the learning item setting table for BLE from the administrator, and notifies the control unit 11 of the contents. Then, the control unit 11 holds the learning item setting table for a USB and the learning item setting table for BLE in which tables the contents set by the administrator are stored.

In a case where it is designated to learn a record in the list for a USB, an initial addition record in which any is set for all items is added to the list for a USB. Thus, for a device inserted into the USB interface 63, the control unit 11 always permits connection.

In a case where it is designated to learn a record in the list for BLE, an initial addition record in which any is set for all items is added to the list for BLE. Thus, for a device inserted into the BLE interface 64, the control unit 11 always permits connection.

The control unit 11 and the connection unit 17 that perform the operation of the second exemplary embodiment are realized by a CPU of a computer that operates according to a device connection control program. In this case, the CPU reads the program from a program recording medium such as a program storage apparatus (not illustrated) of the computer, and operates as the control unit 11 and the connection unit 17 in the second exemplary embodiment according to the program.

Next, an example of processing progress in the second exemplary embodiment will be described. In the following, a case where a device is connected to the USB interface 63 will be described as an example. However, processing progress of a case where a device is connected to the BLE interface 64 is similar.

Figure 24:
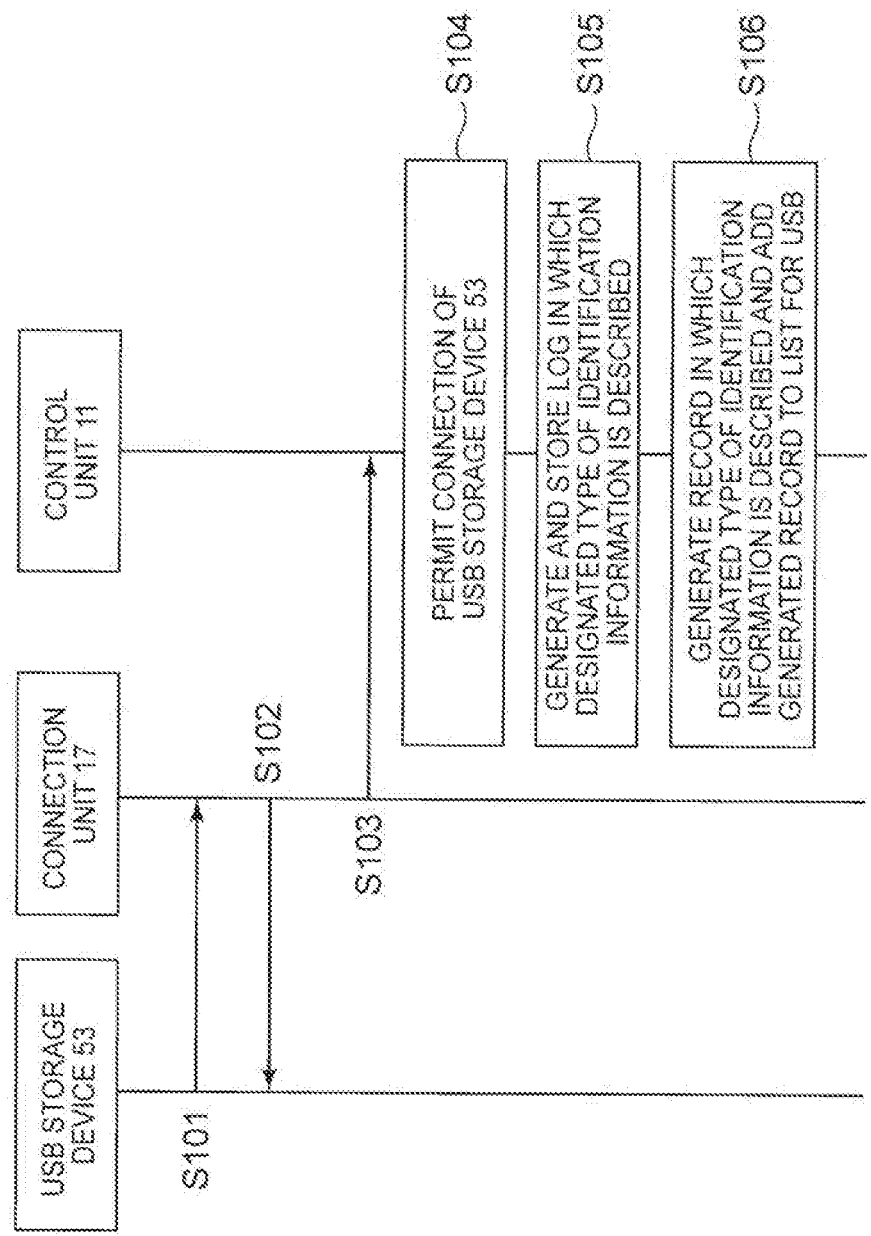
FIG. 24 It depicts a sequence diagram illustrating an example of processing progress in a learning mode.

FIG. 24 is a sequence diagram illustrating an example of processing progress in the learning mode. Here, a case where the learning item setting table for a USB illustrated in FIG. 22 is set will be described as an example. That is, a case where a VID and a PID are designated as kinds of identification information to be learned will be described as an example. Also, it is assumed that the control unit 11 is set to the learning mode and an initial addition record (record in which any is set for all item) is added to the list for a USB.

When the USB storage device 53 is inserted into the USB interface 63 (Step S101), the connection unit 17 connects the USB storage device 53 and the gateway 10 (Step S102). Also, in Step S102, the connection unit 17 acquires various kinds of identification information (VID, PID, and serial number) of the USB storage device 53 from the USB storage device 53.

The connection unit 17 notifies the control unit 11 of the various kinds of identification information (VID, PID, and serial number) (Step S103).

In a case where notifications of the VID, the PID, and the serial number are received, the control unit 11 permits the connection between the USB storage device 53 and the gateway 10 since the initial addition record is added to the list for a USB (Step S104). The control unit 11 does not give a notification to the connection unit 17 in a case of permitting the connection. The connection unit 17 keeps the connection state between the USB storage device 53 and the gateway 10 unless there is a notification by the control unit 11.

Also, the control unit 11 generates and stores a log in which identification information of a kind designated in the learning item setting table for a USB (VID and PID, in present example) among the various kinds of identification information notified in Step S103, connection being permitted, and a mode being the learning mode are described (Step S105).

Moreover, the control unit 11 generates a record in which a specific VID and PID are described in items designated in the learning item setting table for a USB (VID and PID, in present example) among the various kinds of identification information notified in Step S103 and in which it is described in an item of supplementary information that addition is performed by learning, and adds the record to the list for a USB (Step S106). Note that the control unit 11 describes "any" in an item of a serial number. For example, a record corresponding to the last line in FIG. 20 is generated, and the record is added to the list.

Figure 25:
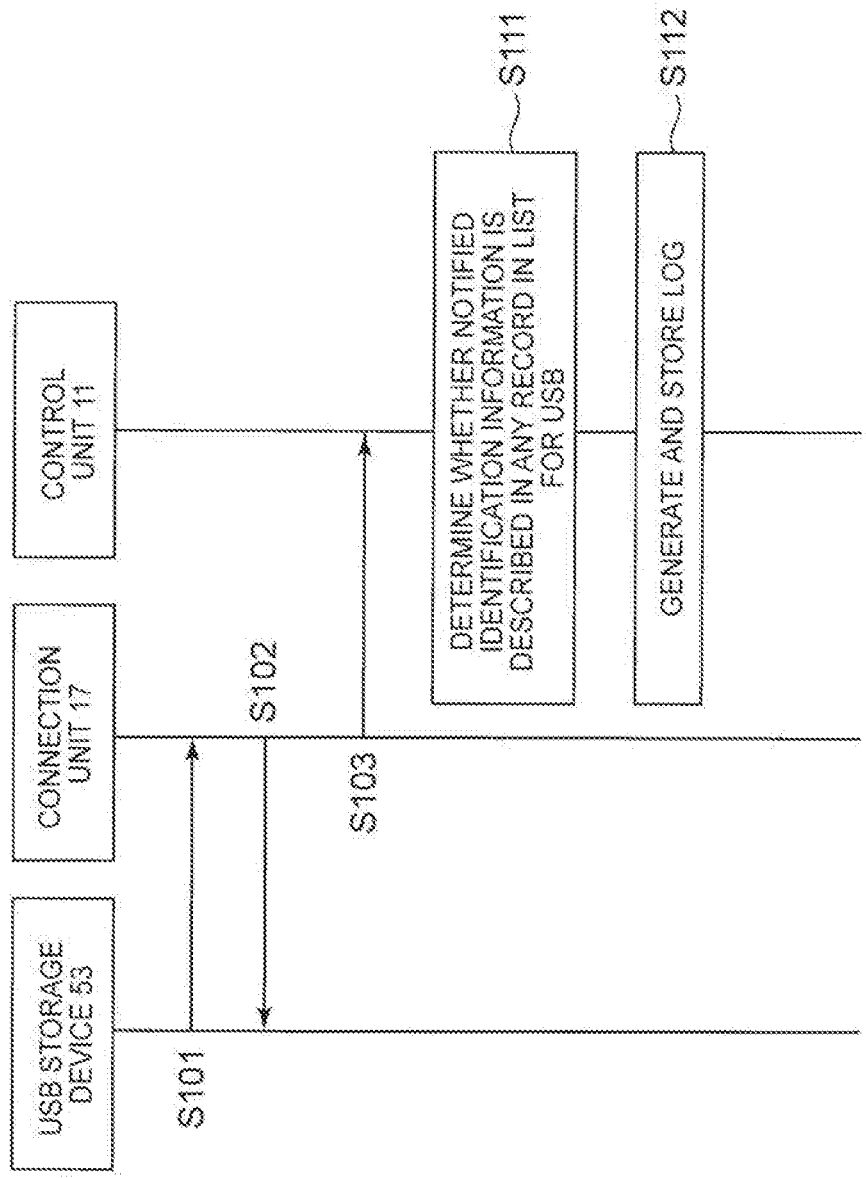
FIG. 25 It depicts a sequence diagram illustrating an example of processing progress in an operation mode.

FIG. 25 is a sequence diagram illustrating an example of processing progress in the operation mode. Here, a case where the control unit 11 holds the list for a USB exemplified in FIG. 20 will be described as an example. When being set to the operation mode, the control unit 11 deletes an initial addition record (record in which any is set for all item). In the following, a case where a USB storage device 53 with a VID being "00:00:04" and a PID being "00:00:04" is inserted into the USB interface 63 will be described as an example.

Steps S101 to S103 are similar to Steps S101 to S103 in the learning mode, and a description thereof is omitted.

When receiving a notification of various kinds of identification information (VID, PID, and serial number), the control unit 11 determines whether the identification information is described in any record (Step S111). In the present example, the VID is "00:00:04" and the PID is "00:00:04." Also, in the record corresponding to the last line in FIG. 20, "00:00:04" is described as a VID, "00:00:04" is described as a PID, and "any" is described as a serial number. Thus, in the present example, the control unit 11 determines that a record in which the notified VID and PID are described exists. Moreover, in a case where a record describing the notified identification information exists in the list, the control unit 11 permits the connection between the USB storage device 53 and the gateway 10. As described above, the control unit 11 does not give a notification to the connection unit 17 in a case of permitting the connection, and the connection unit 17 keeps the connection between the USB storage device 53 and the gateway 10 when there is no notification by the control unit 11.

Also, the control unit 11 generates and stores a log (Step S112). In the present example, the control unit 11 generates and stores a log in which the identification information (VID "00:00:04" and PID "00:00:04") that matches the identification information described in the record, and the connection being permitted are described.

Also, it is assumed that the control unit 11 determines in Step S111 that the identification information notified by the connection unit 17 is not described in any record in the list for a USB. In this case, the control unit 11 does not permit the connection between the USB storage device 53 and the gateway 10, and notifies the connection unit 17 of that. When receiving the notification that the connection is not permitted, the connection unit 17 disconnects the connection between the USB storage device 53 and the gateway 10. Also, in Step S112, the control unit 11 generates and stores a log describing that the connection is not permitted.

Note that, regardless of whether the connection is permitted or the connection is not permitted, the control unit 11 transmits the generated log to the management server 20 (see FIG. 1, not illustrated in FIG. 19).

In the above example, a case where the control unit 11 adds a new record to the list in Step S106 while being set to the learning mode has been described. An operation of adding a new record to a list may be executed when the learning mode is released (that is, when switching from learning mode to operation mode is performed). In this case, when the learning mode is released, the control unit 11 generates a record similar to the record generated in Step S106 on the basis of the stored log, and adds the record to the list.

Also, the control unit 11 transmits the log generated in Step S105 to the management server 20, and the management server 20 stores the log. Then, the administrator who browses the log may set contents of the record to be added. In this case, the management server 20 displays the log according to operation by the administrator. Then, the record to be added is input by the administrator, and the management server 20 transmits the record to the control unit 11. The control unit 11 adds the record received from the management server 20 to the list. A record may be added to the list by such a method.

According to the present exemplary embodiment, the control unit 11 can add a record of a USB list or a BLE list. Thus, it is possible to generate a whitelist (USB list or BLE list) while controlling an increase in man-hours of the administrator.

Third Exemplary Embodiment

Figure 26:
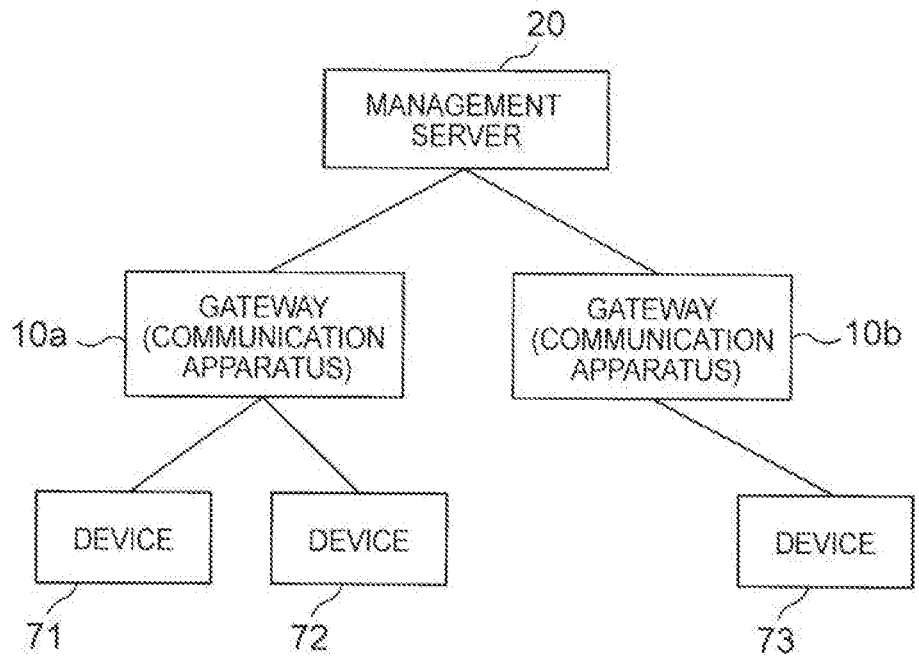
FIG. 26 It depicts a schematic diagram illustrating an example of a communication system of a third exemplary embodiment of the present invention.

FIG. 26 is a schematic diagram illustrating an example of a communication system of the third exemplary embodiment of the present invention. The communication system of the third exemplary embodiment of the present invention includes a plurality of communication apparatuses (gateway) 10a and 10b, and a management server 20 that manages the plurality of communication apparatuses. Each of the gateways 10a and 10b can communicate with the management server 20 via a communication network. Note that in a case of not being specifically distinguished, the gateways 10a and 10b are simply referred to as the "gateway 10." In FIG. 26, the two gateways 10 are illustrated. However, the number of gateways 10 is not specifically limited as long as the number is two or more.

Also, in each of the gateways 10, there is a device that communicates with a general server 30 (see FIG. 1) via the gateway 10 or a device that is attached to/detached from a connection interface provided in the gateway 10. Devices 71 to 73 illustrated in FIG. 26 represent such devices. The devices 71 to 73 may be devices that perform communication via the gateway 10. Also, the devices 71 to 73 may be devices that are attached to/detached from a connection interface provided in the gateway 10.

Each of the devices 71 to 73 is, for example, a portable device and is movable. For example, the device 72 that performs communication via the gateway 10a may move, and the device 72 may perform communication via the gateway 10b after the movement. Also, for example, the device 72 inserted into a connection interface of the gateway 10a may be detached from the gateway 10a and inserted into a connection interface of the gateway 10b.

Each of the gateways 10a and 10b is the gateway 10 described in the first exemplary embodiment or the gateway 10 described in the second exemplary embodiment. Also, each of the gateways 10a and 10b may have both of the function of the gateway 10 described in the first exemplary embodiment and the function of the gateway 10 described in the second exemplary embodiment.

The management server 20 manages a record in a list learned by each gateway 10. As modes in which the management server 20 manages a learned record, there are the following two kinds of management modes, for example.

First management mode: The management server 20 causes gateways 10 to mutually hold a record learned by an arbitrary gateway 10.

Second management mode: In a case where a record learned by an arbitrary gateway 10 is also held in a different gateway 10, the management server 20 causes the different gateway 10 to delete the record from the record. That is, in a case where an arbitrary gateway 10 newly learns a record, the management server 20 causes only that gateway 10 to hold the record.

In the first management mode, an effect that a different gateway 10 does not need to learn a record learned by one gateway 10 even when a device moves.

In the second management mode, an old record is not left in a gateway 10 that is no longer used by a device due to a movement of the device. Thus, security vulnerability can be controlled, and easiness of maintenance can be improved. Also, it is possible to improve a speed of record searching processing.

Also, in the present exemplary embodiment, a record describing identification information of a device is to be managed.

In the following, a case where each of the devices 71 to 72 is a device that communicates with a general server 30 (see FIG. 1) via a gateway 10 will be described as an example. In this case, each gateway 10 is the gateway 10 described in the first exemplary embodiment (see FIG. 1). However, a control unit 11 of the gateway 10 (see FIG. 1) also performs an operation of transmitting a record, which is added to a list by learning, to the management server 20. As described above, in the present exemplary embodiment, a record describing identification information of a device is a management object. Here, a case where identification information of a device is a MAC address of the device and the gateway 10 learns a record describing a "transmission source MAC address" will be described as an example.

Figure 27:
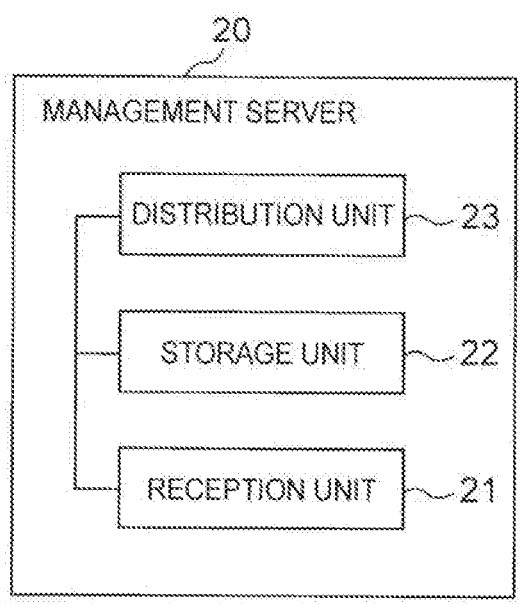
FIG. 27 It depicts a block diagram illustrating a configuration example of a management server that manages a record in a first management mode.

First, a case where a management server 20 manages a record in the first management mode will be described. FIG. 27 is a block diagram illustrating a configuration example of the management server 20 that manages a record in the first management mode. In the example illustrated in FIG. 27, the management server 20 includes a reception unit 21, a storage unit 22, and a distribution unit 23.

The reception unit 21 receives a record in a list learned by a gateway 10.

The storage unit 22 is a storage apparatus that stores the record received by the reception unit 21.

The distribution unit 23 distributes the record received by the reception unit 21 to a control unit 11 of each gateway 10 other than the gateway 10 that transmits the record.

The reception unit 21 and the distribution unit 23 are realized, for example, by a CPU of a computer that operates according to a program, and a communication interface.

Next, an example of processing progress of a case where the management server 20 manages a record in the first management mode will be described. In the example illustrated in the following, an operation in which the gateway 10a learns a record describing a MAC address of the device 72 and transmits the record to the management server 20, and the management server 20 distributes the record to the gateway 10b will be described.

FIG. 28 is a sequence diagram illustrating an example of processing progress of a case where the management server 20 manages a record in the first management mode.

Also, here, it is assumed that the learning item setting table illustrated in FIG. 29 is set in a control unit 11 of the gateway 10a (hereinafter, referred to as control unit 11a). That is, it is assumed that a first learning condition is designated and a "transmission source MAC address" is designated as a condition to be learned in the learning mode. Also, the control unit 11a adds an initial addition record to a list by being set to the learning mode. For example, as initial addition records, the control unit 11a adds the (n−2)th to the nth records exemplified in FIG. 4 to the list. However, in order to simplify a description, the description will be made on the assumption that a new record is created on the basis of the last initial addition record illustrated in FIG. 4 (nth record illustrated in FIG. 4).

The device 72 transmits an SYN packet with an IP address of the server 30 as a destination (Step S201).

A switch unit 12 of the gateway 10a (hereinafter, referred to as switch unit 12a) receives an SYN packet. This SYN packet is a new packet. That is, control information that matches header information of the SYN packet is not set in the switch unit 12a yet. In this case, the switch unit 12a notifies the control unit 11a of header information of the SYN packet (Step S202), and the switch unit 12a holds the SYN packet.

Since the header information of the SYN packet matches the nth record illustrated in FIG. 4, the control unit 11a generates control information, which indicates permission for communication by the SYN packet, as control information corresponding to the header information of the SYN packet (Step S203). Here, as an output destination of the packet, the control unit 11a describes, in the control information, a communication network described as an "output destination interface" in the nth record illustrated in FIG. 4.

Also, since the learning item setting table illustrated in FIG. 29 is set, the control unit 11a specifies a transmission source MAC address by extracting the transmission source MAC address from the header information. Then, the control unit 11a generates and stores a log in which the transmission source MAC address, information indicating permission for communication, and a mode being the learning mode are described (Step S204).

Moreover, the control unit 11a adds a record in which the transmission source MAC address specified in Step S204 is described to the list (Step S205). In the item of the output interface of this record, the control unit 11a describes a communication network described as the "output destination interface" in the nth record illustrated in FIG. 4. Also, for example, the control unit 11a may describe "added by learning" as supplementary information of this record. The control unit 11a describes "any" in all the other items. An example of a record added to the list in Step S205 is illustrated in FIG. 30. In FIG. 30, only one record added to the list in Step S205 is illustrated, and a whole list is not illustrated.

The transmission source MAC address specified in Step S204 corresponds to identification information of the device 72. Thus, the record illustrated in FIG. 30 is a record describing the identification information of the device 72 (MAC address of device 72).

Next, the control unit 11a sets the control information generated in Step S203 in the switch unit 12a (Step S206). The switch unit 12a outputs the held SYN packet according to the control information. That is, the switch unit 12a outputs the held SYN packet from a communication interface designated in the control information (Step S207). As a result, the server 30 receives the SYN packet.

Note that the server 30 that receives the SYN packet transmits an SYN_ACK packet, operations after the transmission of the SYN_ACK packet being similar to the operations in and after Step S19 illustrated in the first exemplary embodiment. Thus, in the following description, a description of the operation after the server 30 transmits the SYN_ACK packet will be omitted.

Also, the control unit 11a transmits the log generated in Step S204 and the record added to the list in Step S205 (see FIG. 30) to the management server 20 (Step S208).

The reception unit 21 of the management server 20 (see FIG. 27) receives the log and the record, and performs storing thereof in the storage unit 22.

Then, the distribution unit 23 of the management server 20 distributes the record received by the reception unit 21 to a control unit 11 of each gateway other than the gateway 10a that transmits the record (only the gateway 10b, in present example) (Step S209).

When receiving the record, a control unit 11 of the gateway 10b (hereinafter, referred to as control unit 11b) adds the record to the list held by the control unit 11b. As a result, the record illustrated in FIG. 30 is added to the list held by the control unit 11b.

It is assumed that the device 72 subsequently moves and is placed in a place where the gateway 10b can be used. Also, here, it is assumed that the control unit 11b of the gateway 10b is set to the operation mode.

After the movement, the device 72 again transmits an SYN packet a destination of which is the IP address of the server 30 (Step S210).

A switch unit 12 of the gateway 10b (hereinafter, referred to as switch unit 12b) receives the SYN packet. This SYN packet is a new packet. That is, control information that matches header information of the SYN packet is not set in the switch unit 12b yet. In this case, the switch unit 12b notifies the control unit 11b of the header information of the SYN packet (Step S211). Also, the switch unit 12b holds the SYN packet.

When being notified of the header information, the control unit 11 determines whether information included in the header information or information specified from an IP address included in the header information is described in any record in the list. In a case of referring to the record illustrated in FIG. 30, the control unit 11 extracts a transmission source MAC address included in the header information, and determines that the transmission source MAC address matches a transmission source MAC address "11:22:33:44:55:66" illustrated in FIG. 30.

Thus, the control unit 11b generates control information indicating permission for communication by the SYN packet. Here, as an output destination of the packet, the control unit 11b describes, in the control information, the output interface described in the record illustrated in FIG. 30. In the present example, an output interface "Ethernet1" (see FIG. 30) is described in the control information. Then, the control unit 11b sets the generated control information in the switch unit 12b (Step S212).

The switch unit 12b outputs the held SYN packet according to the control information. That is, the switch unit 12b outputs the held SYN packet from a communication interface designated in the control information (Step S213). As a result, the server 30 receives the SYN packet.

As described above, a description of the operations after the server 30 transmits an SYN_ACK packet will be omitted.

According to the first management mode, the management server 20 distributes the record added to the list by learning by the gateway 10a (see FIG. 30) to the control unit 11b of the gateway 10b. Thus, even in a case where the device 72 moves, and uses the gateway 10b, the gateway 10b can relay the packet transmitted by the device 72 to the server 30 without learning the record.

Figure 31:
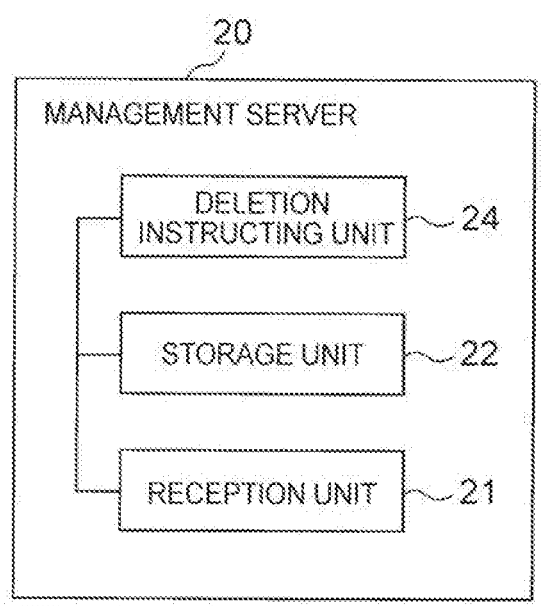
FIG. 31 It depicts a block diagram illustrating a configuration example of a management server that manages a record in a second management mode.

Next, a case where a management server 20 manages a record in the second management mode will be described. FIG. 31 is a block diagram illustrating a configuration example of the management server 20 that manages a record in the second management mode. In the example illustrated in FIG. 31, the management server 20 includes a reception unit 21, a storage unit 22, and a deletion instructing unit 24.

The reception unit 21 and the storage unit 22 are similar to the reception unit 21 and the storage unit 22 illustrated in FIG. 27.

In a case where the reception unit 21 receives a record, the deletion instructing unit 24 instructs a control unit 11 of each gateway 10, which is other than a gateway 10 that transmits the record, to delete a record in which identification information of a device described in the record is described. Note that the control unit 11 that receives this instruction deletes the corresponding record from a held list according to the instruction.

The reception unit 21 and the deletion instructing unit 24 are realized, for example, by a CPU of a computer that operates according to a program, and a communication interface.

Next, an example of processing progress of a case where the management server 20 manages a record in the second management mode will be described. In the example illustrated in the following, it is assumed that a gateway 10a learns a record in which a MAC address of a device 72 is described. Also, an operation in which a gateway 10b also learns the record, in which the MAC address of the device 72 is described, and transmits the record to the management server 20, and the management server 20 instructs the gateway 10a to delete the record will be described.

Figure 32:
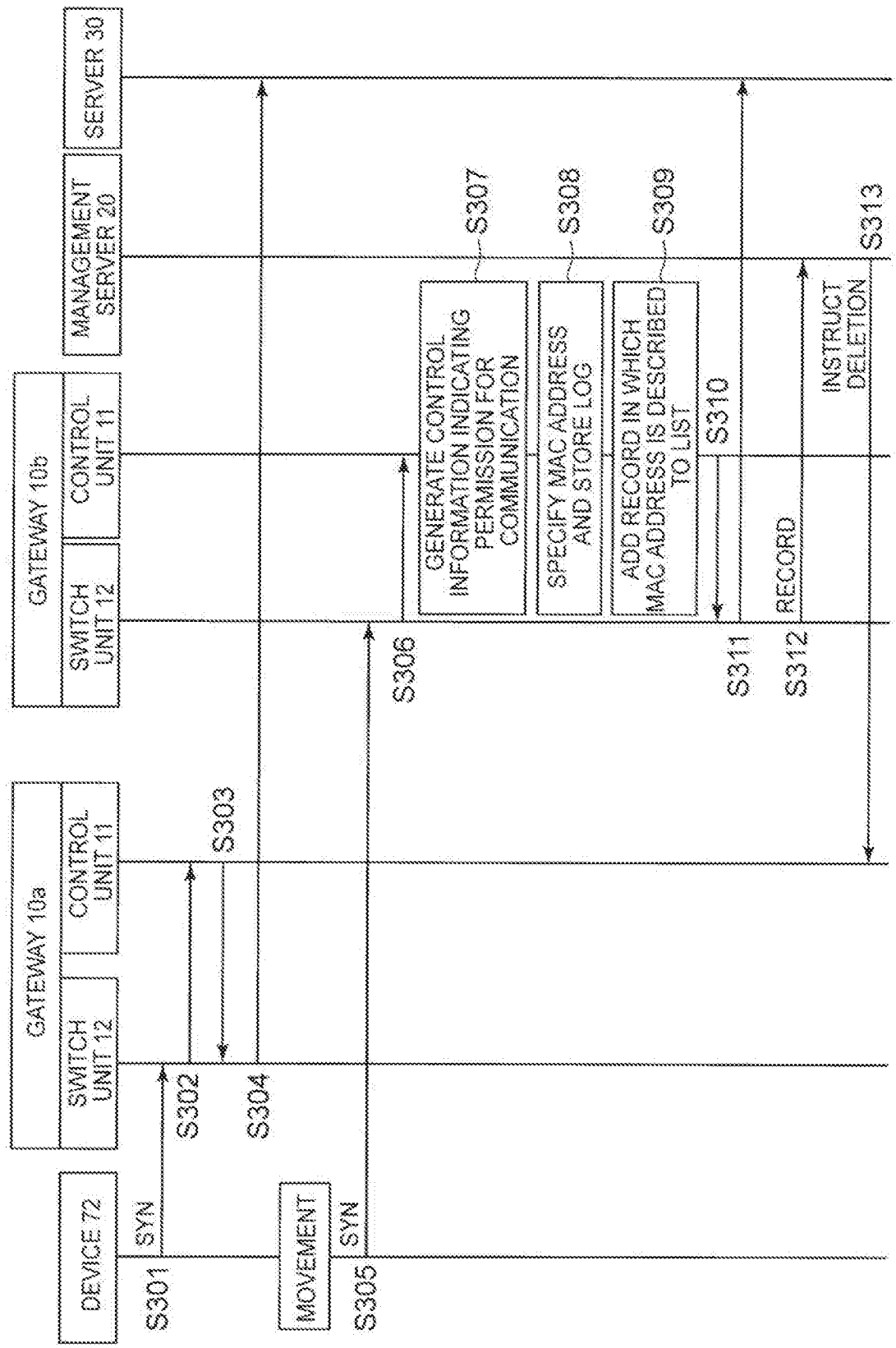
FIG. 32 It depicts a sequence diagram illustrating an example of processing progress of a case where the management server manages a record in the second management mode.

FIG. 32 is a sequence diagram illustrating an example of processing progress of a case where the management server 20 manages a record in the second management mode.

It is assumed that the control unit 11a of the gateway 10a has already learned the record illustrated in FIG. 30 and added the record to the list by transmission of a packet, a destination of which is the server 30, by the device 72 in the learning mode. This operation is similar to the operations in Step S201 to S207 illustrated in FIG. 28, and a description thereof is omitted here.

The record illustrated in FIG. 30 is added to the list held by the control unit 11a. Thus, in a case where the control unit 11a is set to the operation mode, the control unit 11a sets, in the switch unit 12a, control information permitting a transfer of a packet transmitted from the device 72 with the server 30 being a destination, and the switch unit 12a transfers the packet to the server 30 (Step S301 to S304). The operations in Steps S301 to S304 are similar to the operations in Steps S210 to S213 illustrated in FIG. 28, and a description thereof is omitted here.

Also, it is assumed that the learning item setting table illustrated in FIG. 29 is set in the control unit 11b of the gateway 10b. That is, it is assumed that a first learning condition is designated and a "transmission source MAC address" is designated as a condition to be learned in the learning mode. Also, the control unit 11b adds an initial addition record to the list by being set to the learning mode. For example, as initial addition records, the control unit 11b adds the (n−2)th to the nth records exemplified in FIG. 4 to the list. However, in order to simplify a description, the description will be made on the assumption that a new record is created on the basis of the last initial addition record illustrated in FIG. 4 (nth record illustrated in FIG. 4).

In the learning mode, the packet transmitted by the device 72 with the server 30 as a destination is relayed by the gateway 10b, whereby the control unit 11b of the gateway 10b learns the record illustrated in FIG. 30 and adds the record to the list held by the control unit 11b (Step S305 to S311). The operations in Steps S305 to S311 are similar to the operations in Steps S201 to S207 illustrated in FIG. 28, and a description thereof is omitted here. As a result, the record illustrated in FIG. 30 (record in which MAC address of device 72 is described as transmission source address) is also added to the list held by the control unit 11b.

The control unit 11*b* transmits the log generated in Step S308 and the record added to the list in Step S309 (see FIG. 30) to the management server 20 (Step S312).

The reception unit 21 of the management server 20 (see FIG. 31) receives the log and the record, and performs storing thereof in the storage unit 22.

Then, the deletion instructing unit 24 of the management server 20 (see FIG. 31) instructs a control unit 11*a* of each gateway other than the gateway 10*b* that transmits the record (only gateway 10*a*, in present example) to delete a record in which a MAC address "11:22:33:44:55:66" of the device 72 described in the record is described (Step S313).

According to the instruction, the control unit 11*a* deletes a record in which the MAC address "11:22:33:44:55:66" of the device 72 is described from the list held by the control unit 11*a*. The list held by the control unit 11*a* includes the record illustrated in FIG. 30, and the MAC address "11:22:33:44:55:66" of the device 72 is described in an item of a "transmission source MAC address" of the record. Thus, the control unit 11*a* deletes the record illustrated in FIG. 30 from the held list.

Since the device 72 moves, and communicates with the server 30 via the gateway 10*b*, the record learned on the basis of a packet transmitted by the device 72 becomes unnecessary in the gateway 10*a*. In the second management mode, the management server 20 instructs the gateway 10*a* to delete the record, and the gateway 10*a* deletes the record. Thus, since the number of records in the list is decreased, security vulnerability can be controlled and easiness of maintenance can be improved. Also, it is possible to improve a speed of record searching processing.

Next, a case where each of the devices 71 to 72 is a device that is attached to/detached from a connection interface provided in a gateway 10 will be described as an example. In this case, each gateway 10 is the gateway 10 described in the second exemplary embodiment (see FIG. 19). However, a control unit 11 of the gateway 10 (see FIG. 19) also performs an operation of transmitting a record added to a list by learning to the management server 20. As described above, in the present exemplary embodiment, a record describing identification information of a device is a management object. In the following description, it is assumed that a device is a device attached to/detached from a USB interface 63. Then, a case where there are three kinds of identification information of a device, these being a VID, a PID, and a serial number, and the gateway 10 learns a record in which the VID and the PID are described will be described as an example.

First, a case where a management server 20 manages a record in the first management mode will be described. In this case, since the management server 20 can be expressed by the block diagram illustrated in FIG. 27, a description will be made with reference to FIG. 27. Since a reception unit 21, a storage unit 22, and a distribution unit 23 have been described already, a description thereof is omitted here.

An example of processing progress of a case where the management server 20 manages a record in the first management mode will be described. In the example illustrated in the following, an operation in which a gateway 10*a* learns a record describing a VID and a PID of the device 72 and transmits the record to the management server 20, and the management server 20 distributes the record to a gateway 10*b* will be described.

Similarly to the above-described case, a control unit 11 of the gateway 10*a* is referred to as a control unit 11*a*. A control unit 11 of the gateway 10*b* is referred to as a control unit 11*b*. Also, a connection unit 17 of the gateway 10*a* is referred to as a connection unit 17*a*. A connection unit 17 of the gateway 10*b* is referred to as a connection unit 17*b*. Also, a USB interface 63 of the gateway 10*a* is referred to as a USB interface 63*a*. A USB interface 63 of the gateway 10*b* is referred to as a USB interface 63*b*.

Figure 33:
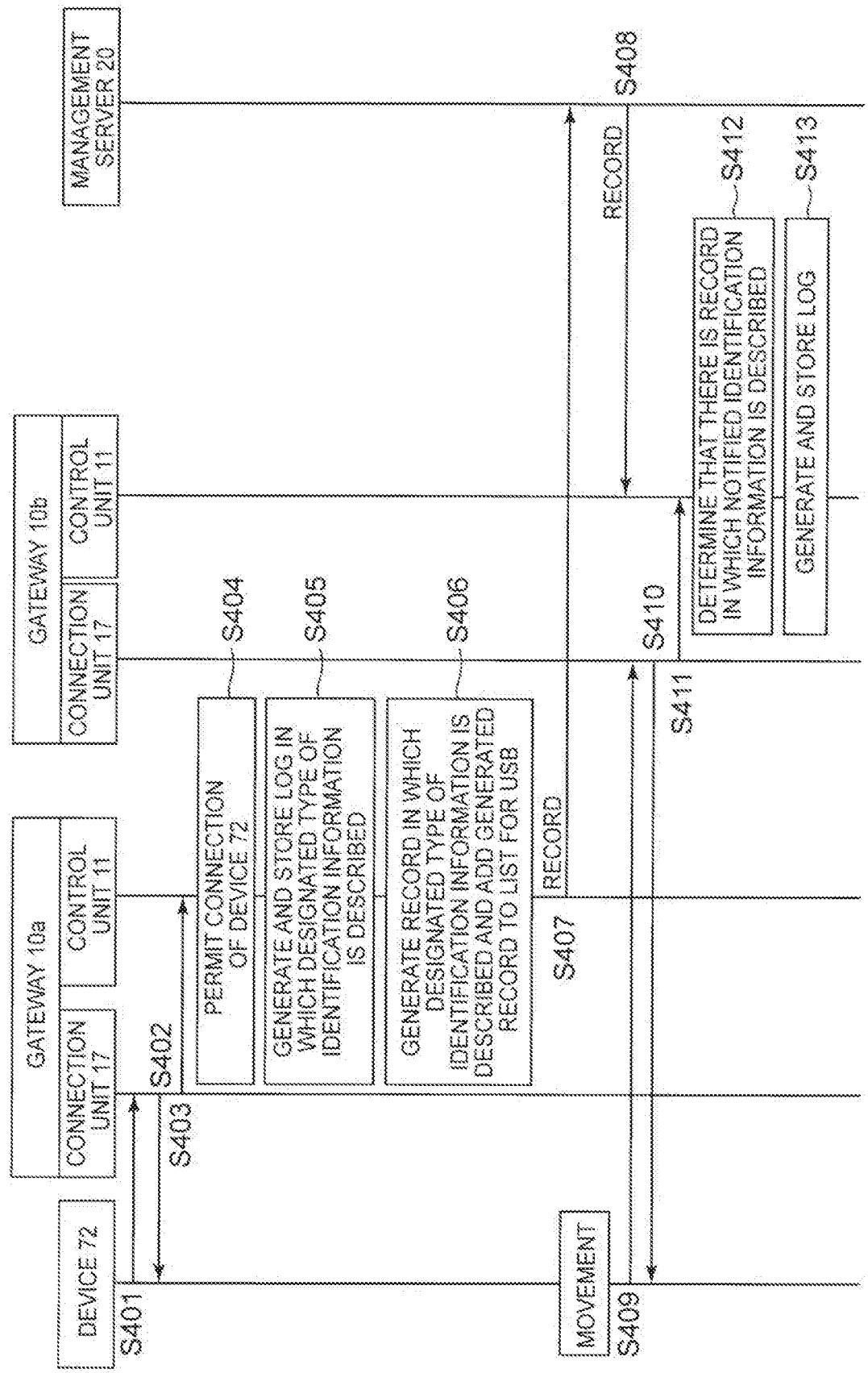
FIG. 33 It depicts a sequence diagram illustrating an example of processing progress of a case where the management server manages a record in the first management mode.

FIG. 33 is a sequence diagram illustrating an example of processing progress of a case where the management server 20 manages a record in the first management mode.

Also, here, it is assumed that the learning item setting table for a USB illustrated in FIG. 22 is set in the control unit 11*a* of the gateway 10*a*. That is, it is assumed that a VID and a PID are designated as learning objects among the three kinds of identification information. Also, it is assumed that when being designated to learn only a record in a list for a USB and being set to the learning mode, the control unit 11*a* adds an initial addition record (record in which any is set in all item) to the list for a USB (see FIG. 20). Moreover, it is assumed that a VID of the device 72 is "00:00:05" and a PID of the device 72 is "00:00:05."

When the device 72 is inserted into the USB interface 63*a* of the gateway 10*a* (Step S401), the connection unit 17*a* of the gateway 10*a* connects the device 72 with the gateway 10*a* (Step S402). Also, in Step S402, the connection unit 17*a* acquires various kinds of identification information (VID, PID, and serial number) of the device 72 from the device 72.

The connection unit 17*a* notifies the control unit 11*a* of the various kinds of identification information (VID, PID, and serial number) (Step S403).

In a case of receiving the notification of the VID, the PID, and the serial number, the control unit 11*a* permits the connection between the device 72 and the gateway 10*a* since the initial addition record is added to the list (Step S404). In a case of permitting the connection, the control unit 11*a* does not give a notification to the connection unit 17*a*. The connection unit 17*a* keeps connection information between the device 72 and the gateway 10*a* unless receiving a notification by the control unit 11*a*.

Also, the control unit 11*a* generates and stores a log in which identification information of a kind designated in the learning item setting table for a USB (VID and PID, in present example) (see FIG. 22) among various kinds of setting information notified in Step S403, connection being permitted, and a mode being the learning mode are described (Step S405).

Moreover, the control unit 11*a* generates a record in which a specific VID and PID are described in items designated in the learning item setting table for a USB (VID and PID, in present example) (see FIG. 22) among the various kinds of setting information notified in Step S403 and in which it is described in an item of supplementary information that addition is performed by learning, and adds the record to the list for a USB (Step S406). The control unit 11*a* describes "any" in an item of a serial number. An example of a record added to the list for USB in Step S406 is illustrated in FIG. 34. In FIG. 34, only one record added to the list for a USB in Step S406 is illustrated, and a whole list for a USB is not illustrated.

Next, the control unit 11*a* transmits the log generated in Step S405 and the record added to the list for a USB in Step S406 (see FIG. 34) to the management server 20 (Step S407).

The reception unit 21 of the management server 20 (see FIG. 27) receives the log and the record, and performs storing thereof in the storage unit 22.

Then, a distribution unit 23 of the management server 20 distributes the record received by the reception unit 21 to a control unit 11 of each gateway other than the gateway 10a that transmits the record (only gateway 10b, in present example) (Step S408).

When receiving the record, the control unit 11b of the gateway 10b adds the record to the list for a USB which list is held by the control unit 11b. As a result, the record illustrated in FIG. 34 is added to the list held by the control unit 11b.

Subsequently, it is assumed that the device 72 is detached from the gateway 10a, carried, and inserted into the USB interface 63b of the gateway 10b (Step S409). Also, here, it is assumed that the control unit 11b of the gateway 10b is set to the operation mode.

Then, the connection unit 17b of the gateway 10b connects the device 72 and the gateway 10b (Step S410). Also, in Step S410, the connection unit 17b acquires various kinds of identification information (VID, PID, and serial number) of the device 72 from the device 72.

The connection unit 17b notifies the control unit 11b of the various kinds of identification information (VID, PID, and serial number) (Step S411). The operations in Steps S409 to S411 are similar to the operations in Steps S401 to S403.

When receiving the notification of the various kinds of identification information (VID, PID, and serial number), the control unit 11b determines whether the identification information is described in any record. In the present example, the notified VID is "00:00:05" and the notified PID is "00:00:05." Thus, the control unit 11b determines that the record in which the notified VIP and PID are described (see FIG. 34) exists in the list for a USB (Step S412). Thus, the control unit 11b permits connection between the device 72 and the gateway 10b. The control unit 11b does not give a notification to the connection unit 17b in a case of permitting the connection, and the connection unit 17b keeps the connection between the device 72 and the gateway 10b in a case where there is no notification by the control unit 11b.

Also, the control unit 11b generates and stores a log in which the identification information (VID "00:00:05" and PID "00:00:05") that matches the identification information described in the record, and the connection being permitted are described (Step S413).

According to the first management mode, the management server 20 distributes the record added to the list (list for USB, in above example) by learning by the gateway 10a (see FIG. 34) to the control unit 11b of the gateway 10b. Thus, even in a case where the device 72 moves and is inserted into the USB interface 63b of the gateway 10b, the gateway 10b can permit the connection between the device 72 and the gateway 10b without learning the record.

Next, a case where a management server 20 manages a record in the second management mode will be described. In this case, since the management server 20 can be expressed by the block diagram illustrated in FIG. 31, a description will be made with reference to FIG. 31. Since a reception unit 21, a storage unit 22, and a deletion instructing unit 24 have been described already, the description is omitted here.

An example of processing progress of a case where the management server 20 manages a record in the second management mode will be described. In the example illustrated in the following, it is assumed that a gateway 10a learns a record in which a VID and a PID of a device 72 are described. Also, an operation in which a gateway 10b also learns the record, in which the VID and the PID of the device 72 are described, and transmits the record to the management server 20, and the management server 20 instructs the gateway 10a to delete the record will be described.

Similarly to the above case, it is assumed that the VID of the device 72 is "00:00:05" and the PID of the device 72 is "00:00:05."

Figure 35:
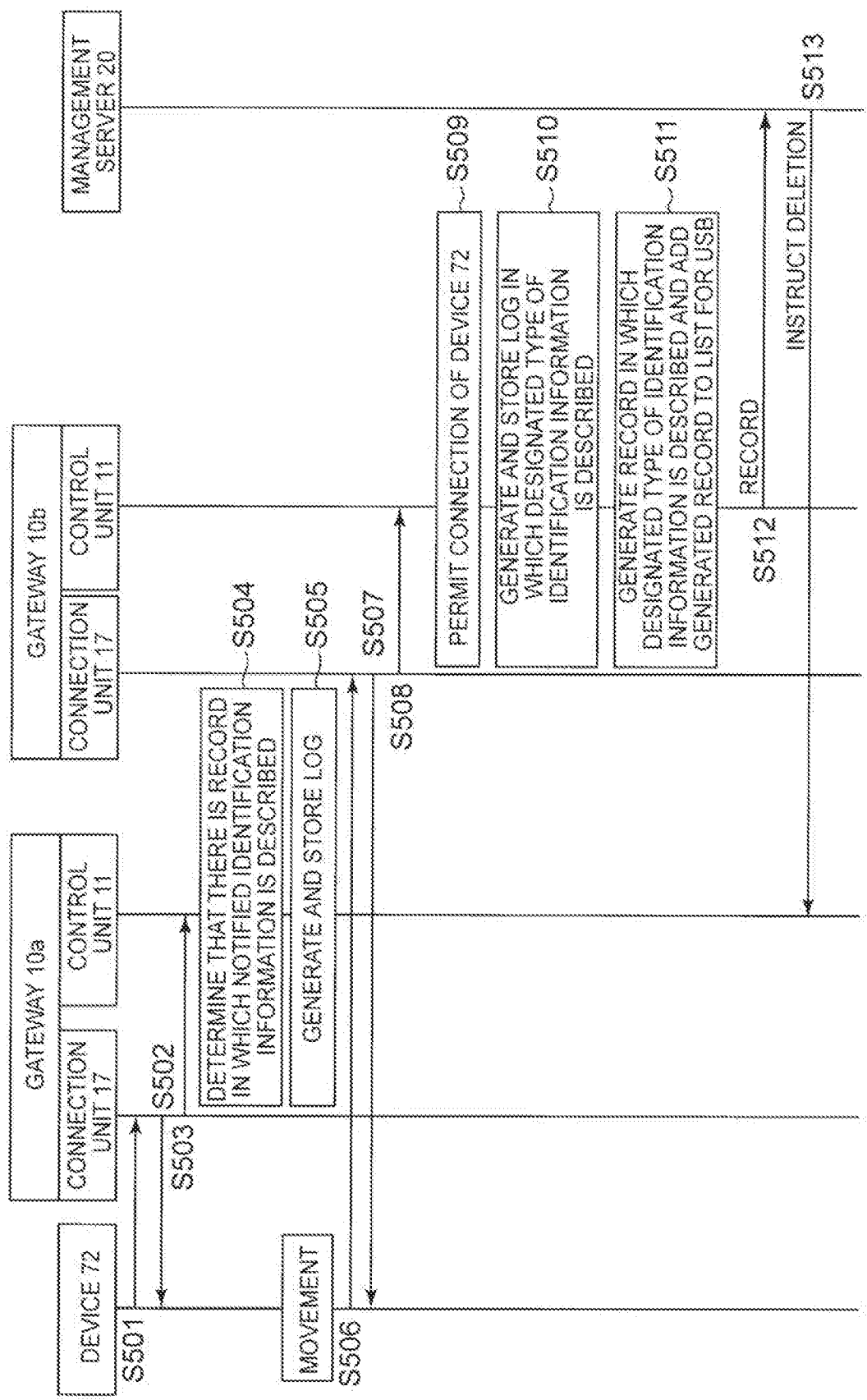
FIG. 35 It depicts a sequence diagram illustrating an example of processing progress of a case where the management server manages a record in the second management mode.

FIG. 35 is a sequence diagram illustrating an example of processing progress of a case where the management server 20 manages a record in the second management mode.

It is assumed that a control unit 11a of the gateway 10a has already learned the record illustrated in FIG. 34 and added the record to the list for a USB when the device 72 is inserted into a USB interface 63a in the learning mode. This operation is similar to the operations in Steps S401 to S406 illustrated in FIG. 33, and a description thereof is omitted here.

The record illustrated in FIG. 34 is added to the list for a USB which list is held by the control unit 11a. Thus, when the control unit 11a is set to an operation mode, the control unit 11a permits connection between the device 72 and the gateway 10a in a case where the device 72 is inserted into the USB interface 63a (Step S501 to S505). The operations in Steps S501 to S505 are similar to the operations in Steps S409 to S413 illustrated in FIG. 33, and a description thereof is omitted here.

Also, it is assumed that the learning item setting table for a USB illustrated in FIG. 22 is set in a control unit 11b of the gateway 10b. That is, it is assumed that a VID and a PID are designated as learning objects among the three kinds of identification information. Also, it is assumed that when being designated to learn only a record in the list for a USB and being set to a learning mode, the control unit 11b adds an initial addition record (record in which any is set in all item) to the list for a USB (see FIG. 20).

In the learning mode, when a daybus 72 is inserted into a USB interface 63b of the gateway 10b, the control unit 11b of the gateway 10b learns the record illustrated in FIG. 34 and adds the record to the list for a USB which list is held by the control unit 11b (Step S506 to S511). The operations in Steps S506 to S511 are similar to the operations in Steps S401 to S406 illustrated in FIG. 33, and a description thereof is omitted here. As a result, the record illustrated in FIG. 34 is also added to the list for a USB which list is held by the control unit 11b.

The control unit 11b transmits the log generated in Step S510 and the record added to the list for a USB in Step S511 (see FIG. 34) to the management server 20 (Step S512).

The reception unit 21 of the management server 20 (see FIG. 31) receives the log and the record, and performs storing thereof in the storage unit 22.

Then, a deletion instructing means 24 of the management server 20 (see FIG. 31) instructs a control unit 11a of each gateway other than the gateway 10b that transmits the record (only gateway 10a, in present example) to delete a record in which a VID "00:00:05" and a PID "00:00:05" of a device 72 described in the record are described (Step S513).

According to the instruction, the control unit 11a deletes the record in which the VID "00:00:05" and the PID "00:00:05" of the device 72 are described from the list for a USB which list is held by the control unit 11a. The list for a USB which list is held by the control unit 11a includes the record illustrated in FIG. 34, and the VID "00:00:05" and the PID "00:00:05" of the device 72 are described in the record. Thus, the control unit 11a deletes the record illustrated in FIG. 34 from the held list for a USB.

When the device 72 is detached from the gateway 10a, carried to an arranged place of the gateway 10b, and connected to the USB interface 63b of the gateway 10b, the record learned on the basis of insertion of the device 72 into the USB interface 63a becomes unnecessary in the gateway 10*a*. In the second management mode, the management server 20 instructs the gateway 10*a* to delete the record, and the gateway 10*a* deletes the record. Thus, since the number of records in the list is decreased, security vulnerability can be controlled and easiness of maintenance can be improved. Also, it is possible to improve a speed of record searching processing.

Also, in the third exemplary embodiment, a case where a control unit 11 of a gateway 10 adds a record to a list when being set to the learning mode has been described as an example. As described in the first exemplary embodiment or the second exemplary embodiment, when the learning mode is released (that is, when switching from learning mode to operation mode is performed), the control unit 11 may execute an operation of adding a new record to a list. Since this operation has been described already in the first exemplary embodiment and the second exemplary embodiment, a description thereof is omitted here.

Also, in the present invention, in a case where a packet received by the switch unit 12 is a new packet, the switch unit 12 gives a notification of header information of the received packet. This operation may be the following operation.

The switch unit 12 notifies the control unit 11 of the header information by sending a copy of the received new packet to the control unit 11. Then, the switch unit 12 holds the received packet. When control information corresponding to the header information of the packet is set, the switch unit 12 processes the held packet according to the control information.

Alternatively, the switch unit 12 may notify the control unit 11 of the header information of the packet by sending the whole packet to the control unit 11 without holding the received new packet. In this case, when setting the control information corresponding to the header information of the packet in the switch unit 12, the control unit 11 returns the packet to the switch unit 12. According to the control information, the switch unit 12 processes the packet returned from the control unit 11.

In such a manner, a method of notifying the control unit 11 of the header information of the packet received by the switch unit 12 is not limited to one method.

Next, an outline of the present invention will be described.

Figure 36:
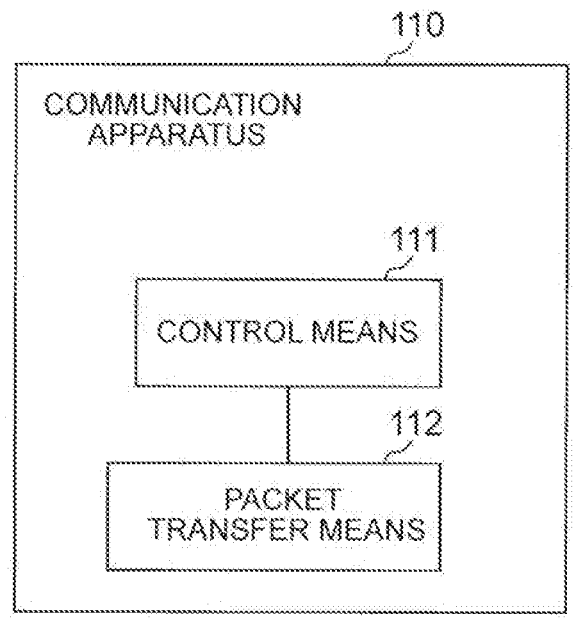
FIG. 36 It depicts a block diagram illustrating an example of an outline of a communication apparatus of the present invention.

FIG. 36 is a block diagram illustrating an example of an outline of a communication apparatus of the present invention. A communication apparatus 110 of the present invention includes a packet transfer means 112 and a control means 111.

The packet transfer means 112 (such as switch unit 12) transfers a packet.

The control means 111 (such as control unit 11 in first exemplary embodiment) sets, with respect to the packet transfer means 112, control information that defines an operation of the packet transfer means 112 according to header information of the packet.

When receiving a new packet that is a packet for which control information matching header information is not set yet, the packet transfer means 112 notifies the control means 111 of header information of the new packet.

The control means 111 holds a list of records including a plurality of items in which conditions for permitting communication can be described, a condition being described in at least a part of the plurality of items. Then, when the header information is notified by the packet transfer means 112, the control means 111 sets control information, which indicates permission for communication by the new packet, in the packet transfer means 112 in a case where information included in the header information or information specified from an IP address included in the header information are described in any of the records in the list. Also, in a case where the information included in the header information or the information specified from the IP address included in the header information is not described in any of the records in the list, the control means 111 sets, in the packet transfer means 112, control information indicating non-permission for communication by the new packet.

In a case of being set to a learning mode to learn a new record and in a case where an item corresponding to a condition that can be specified from an IP address is designated as an item a condition of which is to be learned, the control means 111 sets, in the packet transfer means 112, control information indicating permission for communication by a new packet when header information of the new packet is notified by the packet transfer means 112. Then, the control means 111 adds, to the list, a record in which a condition specified from an IP address in the header information is described in the designated item.

With such a configuration, it is possible to generate a list used for determination of whether to permit or not to permit communication by a packet in such a manner that a condition that is easily understood by an administrator is included.

Figure 37:
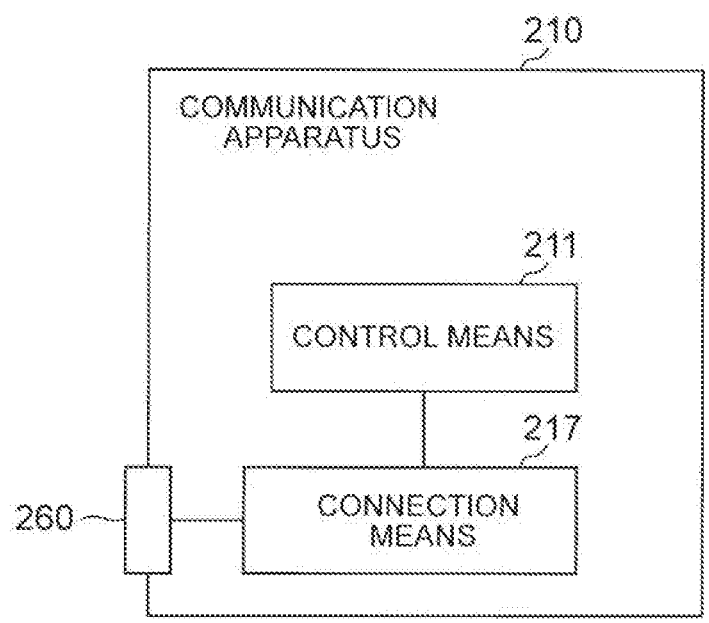
FIG. 37 It depicts a block diagram illustrating a different example of an outline of a communication apparatus of the present invention.

FIG. 37 is a block diagram illustrating a different example of an outline of a communication apparatus of the present invention. A communication apparatus 210 of the present invention includes a connection interface 260 for a device (such as USB interface 63 or BLE interface 64). Moreover, the communication apparatus 210 includes a connection means 217 and a control means 211.

The connection means 217 (such as connection unit 17) connects a device, which is inserted into the connection interface 260, with the communication apparatus 210.

The control means 211 (such as control unit 11 in second exemplary embodiment) controls the connection means 217.

When a device is inserted into the connection interface 260, the connection means 217 connects the device with the communication apparatus 210, and notifies the control means 211 of identification information of the device.

The control means 211 holds a list of records including one or more items in which identification information of a device can be described, identification information of a device being described in at least one item. Then, when identification information of a device is notified by the connection means 217, in a case where the identification information is described in any of the records in the list, the control means 211 permits connection between the device and the communication apparatus 210. In a case where the identification information is not described in any of the records in the list, the control means 211 does not permit the connection between the device and the communication apparatus 210.

In a case where the connection between the device and the communication apparatus 210 is not permitted, the connection means 217 disconnects the connection between the device and the communication apparatus 210.

In a case where an item corresponding to a kind of identification information to be learned is designated and a learning mode to learn a new record is set, the control means 211 permits the connection between the device and the communication apparatus 210 when identification information of the device is notified by the connection means 217. Then, the control means 211 adds, to the list, a record in which identification information corresponding to the item is described in the designated item.

With such a configuration, it is possible to generate a list used for determination of whether to permit or not to permit connection of a different device.

Figure 38:
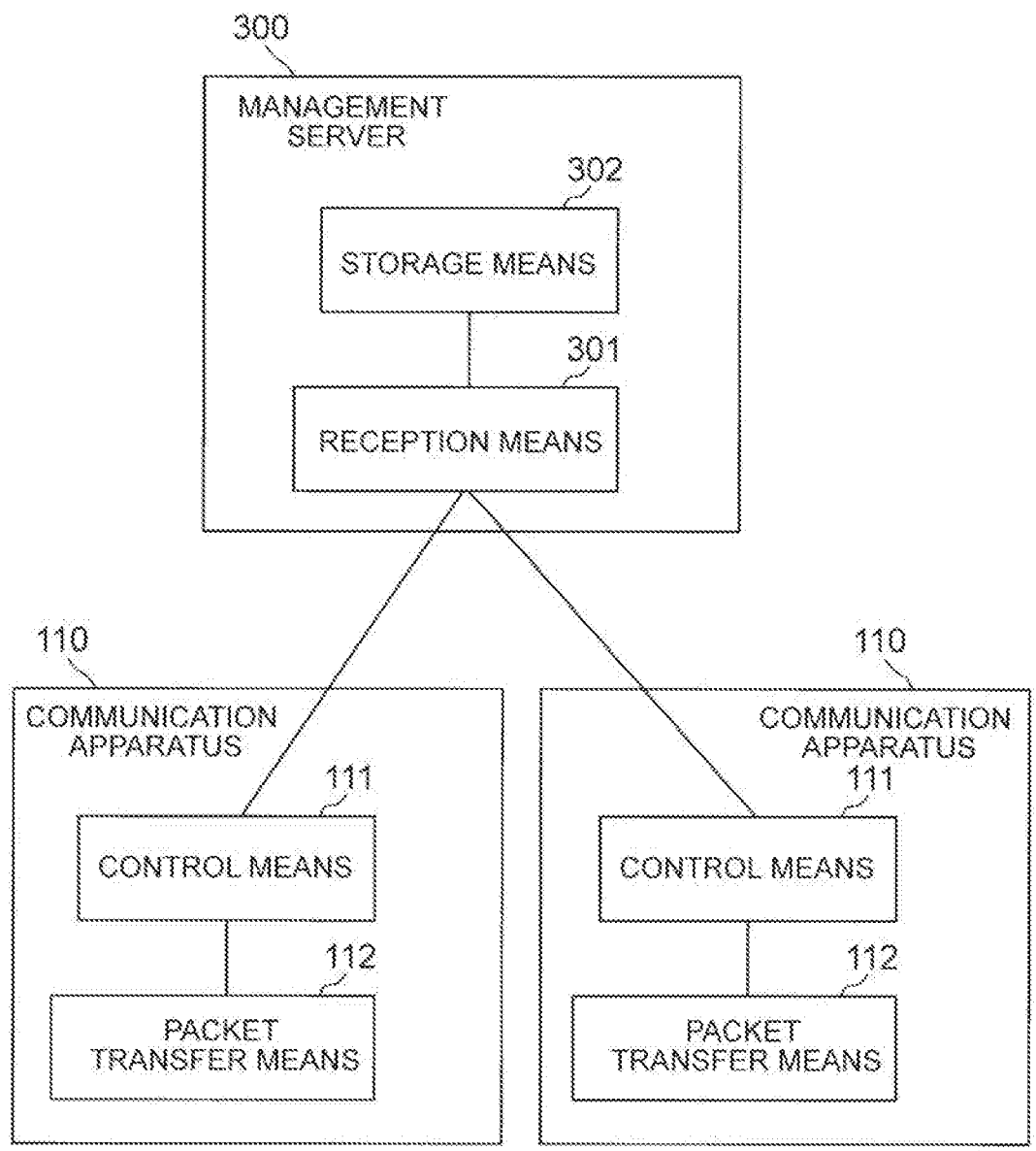
FIG. 38 It depicts a block diagram illustrating an example of an outline of a communication system of the present invention.

FIG. 38 is a block diagram illustrating an example of an outline of a communication system of the present invention. The communication system of the present invention includes a plurality of communication apparatuses 110 (such as gateway 10) and a management server 300 that manages the plurality of communication apparatuses 110.

Each of the communication apparatuses 110 includes a packet transfer means 112 and a control means 111.

The packet transfer means 112 (such as switch unit) transfers a packet.

The control means 111 (such as control unit 11 in first exemplary embodiment) sets, with respect to the packet transfer means 112, control information that defines an operation of the packet transfer means 112 according to header information of the packet.

When receiving a new packet that is a packet for which control information matching header information is not set yet, the packet transfer means 112 notifies the control means 111 of header information of the new packet.

The control means 111 holds a list of records including a plurality of items in which conditions for permitting communication can be described, a condition being described in at least a part of the plurality of items. Then, when the header information is notified by the packet transfer means 112, the control means 111 sets control information, which indicates permission for communication by the new packet, in the packet transfer means 112 in a case where information included in the header information or information specified from an IP address included in the header information are described in any of the records in the list. Also, in a case where the information included in the header information or the information specified from the IP address included in the header information is not described in any of the records in the list, the control means 111 sets, in the packet transfer means 112, control information indicating non-permission for communication by the new packet.

In a case where an item corresponding to identification information of a device in a transmission source of a packet is designated as an item a condition of which is to be learned, and a learning mode to learn a new record is set, the control means 111 sets, in the packet transfer means 112, control information indicating permission for communication by a new packet when header information of the new packet is notified by the packet transfer means 112. Then, the control means 111 adds, to the list, a record in which the identification information of the device in the transmission source of the new packet is described in the designated item, and transmits the record to the management server 300.

The management server 300 (such as management server 20) includes a reception means 301 and a storage means 302.

The reception means 301 (such as reception unit 21) receives a record. The storage means 302 (such as storage unit 22) stores the record.

With such a configuration, in a case where a list used for determination of whether to permit or not to permit communication by a packet is generated by a plurality of communication apparatuses, the list can be managed.

FIG. 39 is a block diagram illustrating a different example of an outline of a communication system of the present invention. The communication system of the present invention includes a plurality of communication apparatuses 210 (such as gateway 10) and a management server 300 that manages the plurality of communication apparatuses 210.

Each of the communication apparatuses 210 includes a connection interface 260 for a device, a connection means 217, and a control means 211. The connection interface 260, the connection means 217, and the control means 211 provided in each communication apparatus 210 are similar to the connection interface 260, the connection means 217, and the control means 211 illustrated in FIG. 37, and a description thereof is omitted here. However, the control means 211 transmits an added record in a list to the management server 300.

The management server 300 (such as management server 20) includes a reception means 301 and a storage means 302.

The reception means 301 (such as reception unit 21) receives a record. The storage means 302 (such as storage unit 22) stores the record.

According to such a configuration, in a case where a list used for determination of whether to permit or not to permit connection of a different device is generated by a plurality of communication apparatuses, the list can be managed.

The above-described exemplary embodiments of the present invention may be described in a manner of the following supplementary notes, but are not limited to the following.

(Supplementary Note 1)

A communication apparatus including:

a packet transfer means that transfers a packet; and a control means that sets, with respect to the packet transfer means, control information that defines an operation of the packet transfer means and according to header information of the packet, wherein the packet transfer means notifies, when receiving a new packet that is a packet for which control information that matches header information is not set yet, the control means of the header information of the new packet, the control means holds a list of records including a plurality of items in each of which a condition for permitting communication can be described, a condition being described in at least a part of the plurality of items, sets, in the packet transfer means, control information indicating permission for communication by the new packet in a case where information included in the header information or information specified from an IP address included in the header information is described in any of the records in the list when the header information is notified by the packet transfer means, and sets, in the packet transfer means, control information indicating non-permission for communication by the new packet in a case where information included in the header information or information specified from an IP address included in the header information is not described in any of the records in the list, and the control means sets, in a case of being set to a learning mode to learn a new record and in a case where an item corresponding to a condition that can be specified from an IP address is designated as an item a condition of which is to be learned, control information indicating permission for communication by the new packet in the packet transfer means when the header information of the new packet is notified by the packet transfer means, and adds, to the list, a record in which a condition specified from the IP address in the header information is described in the designated item.

(Supplementary Note 2)

The communication apparatus according to supplementary note 1, wherein when being notified of header information of a new packet by the packet transfer means while being set to the learning mode, the control means sets control information, which indicates permission for communication by the new packet, in the packet transfer means and adds, to the list, a record in which a condition specified from an IP address in the header information is described in a designated item.

(Supplementary Note 3)

The communication apparatus according to supplementary note 1, wherein the control means generates, when being notified of header information of a new packet by the packet transfer means and setting control information indicating permission for communication by the new packet in the packet transfer means while being set to the learning mode, a log in which a condition specified from an IP address in the header information is described, and adds a record, in which the condition specified from the IP address in the header information is described in a designated item, to the list on the basis of the log when the setting of the learning mode is released.

(Supplementary Note 4)

The communication apparatus according to any one of supplementary note 1 to supplementary note 3, wherein the control means stores, in a case where the packet transfer means receives a DNS query response from a DNS server, a correspondence relationship between an IP address and a domain name on the basis of the DNS query response, sets, when header information of a new packet is notified by the packet transfer means, control information indicating permission for communication by the new packet in the packet transfer means in a case of being set to the learning mode and in a case where an item corresponding to the domain name is designated as an item a condition of which is to be learned, and adds, to the list, a record in which a domain name specified from an IP address in the header information is described in the designated item.

(Supplementary Note 5)

The communication apparatus according to any one of supplementary note 1 to supplementary note 4, wherein the control means sets, when header information of a new packet is notified by the packet transfer means, control information indicating permission for communication by the new packet in the packet transfer means in a case of being set to the learning mode and in a case where an item corresponding to a process name is designated as an item a condition of which is to be learned, and adds, to the list, a record in which a process name specified from an IP address in the header information is described in the designated item.

(Supplementary Note 6)

The communication apparatus according to any one of supplementary note 1 to supplementary note 5, wherein the control means sets, when header information of a new packet is notified by the packet transfer means, control information indicating permission for communication by the new packet in the packet transfer means in a case of being set to the learning mode and in a case where an item corresponding to a user name of a process is designated as an item a condition of which is to be learned, and adds, to the list, a record in which a user name specified from an IP address in the header information is described in the designated item.

(Supplementary Note 7)

A communication apparatus with a connection interface for a device, the communication apparatus including:

a connection means that connects a device inserted into the connection interface with the communication apparatus; and a control means that controls the connection means, wherein the connection means connects, when a device is inserted into the connection interface, the device with the communication apparatus, and notifies the control means of identification information of the device, the control means holds a list of records including one or more items in each of which identification information of a device can be described, identification information of a device being described in at least one item, permits the connection between the device and the communication apparatus when the identification information of the device is notified by the connection means and in a case where the identification information is described in any of the records in the list, and does not permit the connection between the device and the communication apparatus in a case where the identification information is not described in any of the records in the list, the connection means disconnects the connection between the device and the communication apparatus in a case where the connection between the device and the communication apparatus is not permitted, and the control means permits, in a case of being set to a learning mode to learn a new record and in a case where an item corresponding to a kind of identification information to be learned is designated, the connection between the device and the communication apparatus when the identification information of the device is notified by the connection means, and adds, to the list, a record in which identification information corresponding to the item is described in the designated item.

(Supplementary Note 8)

The communication apparatus according to supplementary note 7, wherein when being notified of identification information of a device by the connection means while being set to the learning mode, the control means permits connection between the device and the communication apparatus and adds, to the list, a record in which identification information corresponding to a designated item is described in the item.

(Supplementary Note 9)

The communication apparatus according to supplementary note 7, wherein the control means generates, when being notified of identification information of a device by the connection means and permitting connection between the device and the communication apparatus while being set to the learning mode, a log in which the identification information is described, and adds a record, in which identification information corresponding to a designated item is described in the item, to the list on the basis of the log when setting of the learning mode is released.

(Supplementary Note 10)

A communication system including:

a plurality of communication apparatuses; and a management server that manages the plurality of communication apparatuses, wherein each of the communication apparatuses includes
a packet transfer means that transfers a packet, and
a control means which sets, with respect to the packet transfer means, control information that defines an operation of the packet transfer means according to header information of the packet,
the packet transfer means
notifies, when receiving a new packet that is a packet for which control information that matches header information is not set yet, the control means of the header information of the new packet,
the control means
holds a list of records including a plurality of items in each of which a condition for permitting communication can be described, a condition being described in at least a part of the plurality of items, sets, in the packet transfer means, control information indicating permission for communication by the new packet in a case where information included in the header information or information specified from an IP address included in the header information is described in any of the records in the list when the header information is notified by the packet transfer means, and sets, in the packet transfer means, control information indicating non-permission for communication by the new packet in a case where information included in the header information or information specified from the IP address of included in the header information is not described in any of the records in the list,
the control means
sets, when header information of a new packet is notified by the packet transfer means, control information indicating permission for communication by the new packet in the packet transfer means in a case of being set to a learning mode to learn a new record and in a case where an item corresponding to identification information of a device in a transmission source of a packet is designated as an item a condition of which is to be learned, and
adds a record, in which identification information of a device in a transmission source of the new packet is described in the designated item, to the list and transmits the record to the management server, and
the management server includes
a reception means that receives the record, and
a storage means that stores the record.
(Supplementary Note 11)
The communication system according to supplementary note 10, wherein
the management server includes
a distribution means that distributes a record received by the reception means to the control means of each of the communication apparatuses other than a communication apparatus that transmits the record.
(Supplementary Note 12)
The communication system according to supplementary note 10, wherein
the management server includes
a deletion instructing means that instructs, in a case where the reception means receives a record, the control means of each of the communication apparatuses other than a communication apparatus that transmits the record to delete a record in which identification information of a device described in the record is described.
(Supplementary Note 13)
A communication system including:
a plurality of communication apparatuses; and
a management server that manages the plurality of communication apparatuses, wherein each of the communication apparatuses includes
a connection interface for a device,
a connection means that connects a device inserted into the connection interface with the communication apparatus, and
a control means that controls the connection means,
the connection means
connects, when a device is inserted into the connection interface, the device and the communication apparatus, and notifies the control means of identification information of the device,
the control means
holds a list of records including one or more items in each of which identification information of a device can be described, identification information of a device being described in at least one item, permits the connection between the device and the communication apparatus when the identification information of the device is notified by the connection means and in a case where the identification information is described in any of the records in the list, and does not permit the connection between the device and the communication apparatus in a case where the identification information is not described in any of the records in the list,
the connection means
disconnects the connection between the device and the communication apparatus in a case where the connection between the device and the communication apparatus is not permitted,
the control means
permits, in a case of being set to a learning mode to learn a new record and in a case where an item corresponding to a kind of identification information to be learned is designated, the connection between the device and the communication apparatus when the identification information of the device is notified by the connection means, and
adds a record, in which identification information corresponding to a designated item is described in the item, to the list and transmits the record to the management server, and
the management server includes
a reception means that receives the record, and
a storage means that stores the record.
(Supplementary Note 14)
The communication system according to supplementary note 13, wherein
the management server includes
a distribution means that distributes a record received by the reception means to the control means of each of the communication apparatuses other than a communication apparatus that transmits the record.
(Supplementary Note 15)
The communication system according to supplementary note 13, wherein
the management server includes
a deletion instructing means that instructs, in a case where the reception means receives a record, the control means of each of the communication apparatuses other than a communication apparatus that transmits the record to delete a record in which identification information of a device described in the record is described.
(Supplementary Note 16)
A communication control method applied to a communication apparatus including a packet transfer means that transfers a packet, and a control means that sets, with respect to the packet transfer means, control information that defines an operation of the packet transfer means according to header information of the packet, the method including:

notifying, when receiving a new packet that is a packet for which control information matching header information is not set yet, the control means of the header information of the new packet, notifying being performed by the packet transfer means;

holding a list of records including a plurality of items in each of which a condition for permitting communication can be described, a condition being described in at least a part of the plurality of items, setting, in the packet transfer means, control information indicating permission for communication by the new packet in a case where information included in the header information or information specified from an IP address included in the header information is described in any of the records in the list when the header information is notified by the packet transfer means, and setting, in the packet transfer means, control information indicating non-permission for communication by the new packet in a case where information included in the header information or information specified from the IP address included in the header information is not described in any of the records in the list, holding and setting being performed by the control means; and setting, in a case of being set to a learning mode to learn a new record and in a case where an item corresponding to a condition that can be specified from the IP address is designated as an item a condition of which is to be learned, control information indicating permission for communication by the new packet in the packet transfer means when the header information of the new packet is notified by the packet transfer means, and adding, to the list, a record in which a condition specified from the IP address in the header information is described in the designated item, setting and adding being performed by the control means.

(Supplementary Note 17)

A device connection control method applied to a communication apparatus including a connection interface for a device, a connection means that connects a device inserted into the connection interface with the communication apparatus, and a control means that controls the connection means, the method including:

connecting, when a device is inserted into the connection interface, the device and the communication apparatus, and notifying the control means of identification information of the device, connecting and notifying being performed by the connection means;

holding a list of records including one or more items in each of which identification information of a device can be described, identification information of a device being described in at least one item, permitting the connection between the device and the communication apparatus when the identification information of the device is notified by the connection means and in a case where the identification information is described in any of the records in the list, and not permitting the connection between the device and the communication apparatus in a case where the identification information is not described in any of the records in the list, holding, permitting, and not permitting being performed by the control means;

disconnecting the connection between the device and the communication apparatus in a case where the connection between the device and the communication apparatus is not permitted, disconnecting being performed by the connection means; and permitting, in a case of being set to a learning mode to learn a new record and in a case where an item corresponding to a kind of identification information to be learned is designated, the connection between the device and the communication apparatus when the identification information of the device is notified by the connection means, and adding, to the list, a record in which identification information corresponding to a designated item is described in the item, permitting and adding being performed by the control means.

(Supplementary Note 18)

A communication apparatus management method applied to a communication system including a plurality of communication apparatuses and a management server that manages the plurality of communication apparatuses, each of the communication apparatuses including a packet transfer means that transfers a packet and a control means that sets, with respect to the packet transfer means, control information that defines an operation of the packet transfer means according to header information of the packet, the method including:

notifying, when receiving a new packet that is a packet for which control information matching header information is not set yet, the control means of the header information of the new packet, notifying being performed by the packet transfer means;

holding a list of records including a plurality of items in each of which a condition for permitting communication can be described, a condition being described in at least a part of the plurality of items, setting, in the packet transfer means, control information indicating permission for communication by the new packet in a case where information included in the header information or information specified from an IP address included in the header information is described in any of the records in the list when the header information is notified by the packet transfer means, and setting, in the packet transfer means, control information indicating non-permission for communication by the new packet in a case where information included in the header information or information specified from the IP address included in the header information is not described in any of the records in the list, holding and setting being performed by the control means;

setting, when header information of a new packet is notified by the packet transfer means, control information indicating permission for communication by the new packet in the packet transfer means in a case of being set to a learning mode to learn a new record and in a case where an item corresponding to identification information of a device in a transmission source of a packet is designated as an item a condition of which is to be learned, and adding, to the list, a record in which identification information of a device in a transmission source of the new packet is described in the designated item and transmitting the record to the management server, setting, adding, and transmitting being performed by the control means; and receiving the record and storing the record, receiving and storing being performed by the management server.

(Supplementary Note 19)

A communication apparatus management method applied to a communication system including a plurality of communication apparatuses and a management server that manages the plurality of communication apparatuses, each of the communication apparatuses including a connection interface for a device, a connection means that connects a device inserted into the connection interface with the communication apparatus, and a control means that controls the connection means, the method including:

connecting, when a device is inserted into the connection interface, the device and the communication apparatus, and notifying the control means of identification information of the device, connecting and notifying being performed by the connection means;

holding a list of records including one or more items in each of which identification information of a device can be described, identification information of a device being described in at least one item, permitting the connection between the device and the communication apparatus when the identification information of the device is notified by the connection means and in a case where the identification information is described in any of the records in the list, and not permitting the connection between the device and the communication apparatus in a case where the identification information is not described in any of the records in the list, holding, permitting, and not permitting being performed by the control means;

disconnecting the connection between the device and the communication apparatus in a case where the connection between the device and the communication apparatus is not permitted, disconnecting being performed by the connection means;

permitting, in a case of being set to a learning mode to learn a new record and in a case where an item corresponding to a kind of identification information to be learned is designated, the connection between the device and the communication apparatus when the identification information of the device is notified by the connection means, and adding, to the list, a record in which identification information corresponding to a designated item is described in the item, and transmitting the record to the management server, permitting, adding, and transmitting being performed by the control means; and receiving the record and storing the record, receiving and storing being performed by the management server.

(Supplementary Note 20)

A communication program installed in a computer including a packet transfer means that transfers a packet and a control means that sets, with respect to the packet transfer means, control information that defines an operation of the packet transfer means according to header information of the packet, the program causing a computer to execute notification processing in which the packet transfer means notifies, when receiving a new packet that is a packet for which control information matching header information is not set yet, the control means of header information of the new packet, control information setting processing in which the control means holds a list of records including a plurality of items in each of which a condition for permitting communication can be described, a condition being described in at least a part of the plurality of items, sets, in the packet transfer means, control information indicating permission for communication by the new packet in a case where information included in the header information or information specified from an IP address included in the header information is described in any of the records in the list when the header information is notified by the packet transfer means, and sets, in the packet transfer means, control information indicating non-permission for communication by the new packet in a case where information included in the header information or information specified from the IP address of included in the header information is not described in any of the records in the list, control information setting processing in a learning mode in which processing the control means sets, in a case of being set to a learning mode to learn a new record and in a case where an item corresponding to a condition that can be specified from the IP address is designated as an item a condition of which is to be learned, control information indicating permission for communication by the new packet in the packet transfer means when the header information of the new packet is notified by the packet transfer means, and record adding processing in which the control means adds, to the list, a record in which a condition specified from the IP address in the header information is described in the designated item.

(Supplementary Note 21)

A device connection control program installed in a computer including a connection interface for a device, a connection means that connects a device inserted into the connection interface with the computer, and a control means that controls the connection means, the program causing the computer to execute notification processing in which the connection means connects, when a device is inserted into the connection interface, the device and the computer and notifies the control means of identification information of the device, connection control processing in which the control means holds a list of records including one or more items in each of which identification information of a device can be described, identification information of a device being described in at least one item, permits the connection between the device and the computer when the identification information of the device is notified by the connection means and in a case where the identification information is described in any of the records in the list, and does not permit the connection between the device and the computer in a case where the identification information is not described in any of the records in the list, connection disconnection processing in which the connection means disconnects the connection between the device and the computer in a case where the connection between the device and the computer is not permitted, connection control processing for a learning mode in which processing the control means permits, in a case of being set to a learning mode to learn a new record and in a case where an item corresponding to a kind of identification information to be learned is designated, the connection between the device and the computer when the identification information of the device is notified by the connection means, and record adding processing in which the control means adds, to the list, a record in which identification information corresponding to a designated item is described in the item.

Although the present invention has been described with reference to exemplary embodiments, the present invention is not limited to the above-described exemplary embodiments. Various modifications that can be understood by those skilled in the art can be made within the scope of the present invention with respect to a configuration or a detail of the present invention.

INDUSTRIAL APPLICABILITY

The present invention can be suitably applied to a communication apparatus such as a gateway.

REFERENCE SIGNS LIST

10 Gateway (communication apparatus)
11 Control unit
12 Switch unit
17 Connection unit
20 Management server
21 Reception unit
22 Storage unit
23 Distribution unit
24 Deletion instructing unit
63 USB interface
64 BLE interface

The invention claimed is:

1. A communication apparatus comprising:
a processor; and
memory storing executable instructions that, when executed by the processor, causes the processor to perform as:
a packet transfer unit that transfers a packet; and
a control unit that sets, with respect to the packet transfer unit, control information that defines an operation of the packet transfer unit according to header information of the packet, wherein
the packet transfer unit
notifies, when receiving a new packet that is a packet for which control information that matches header information is not set yet, the control unit of the header information of the new packet,
the control unit
holds a list of records including a plurality of items in each of which a condition for permitting communication can be described, the condition being described in at least a part of the plurality of items, sets, in the packet transfer unit, the control information indicating permission for communication by the new packet in a case where information included in the header information or information specified from an IP address included in the header information is described in any of the records in the list when the header information is notified by the packet transfer unit, and sets, in the packet transfer unit, the control information indicating non-permission for communication by the new packet in a case where information included in the header information or information specified from an IP address included in the header information is not described in any of the records in the list, and
the control unit
sets, in a case of being set to a learning mode to learn a new record and in a case where an item corresponding to a condition that can be specified from the IP address is designated as an item a condition of which is to be learned, control information indicating permission for communication by the new packet in the packet transfer unit when the header information of the new packet is notified by the packet transfer unit, and
adds, to the list, a record in which a condition specified from the IP address in the header information is described in the designated item.

2. The communication apparatus according to claim 1, wherein
when being notified of the header information of the new packet by the packet transfer unit while being set to the learning mode,
the control unit sets the control information, which indicates the permission for communication by the new packet, in the packet transfer unit and adds, to the list, the record in which the condition specified from the IP address in the header information is described in the designated item.

3. The communication apparatus according to claim 1, wherein
the control unit
generates, when being notified of the header information of the new packet by the packet transfer unit and setting control information indicating permission for communication by the new packet in the packet transfer unit while being set to the learning mode, a log in which a condition specified from an IP address in the header information is described, and
adds the record, in which the condition specified from the IP address in the header information is described in the designated item, to the list of records on the basis of the log when the setting of the learning mode is released.

4. The communication apparatus according to claim 1, wherein the control unit
stores, in a case where the packet transfer unit receives a DNS query response from a DNS server, a correspondence relationship between an IP address and a domain name on the basis of the DNS query response,
sets, when the header information of the new packet is notified by the packet transfer unit, control information indicating permission for communication by the new packet in the packet transfer unit in a case of being set to the learning mode and in a case where an item corresponding to the domain name is designated as an item a condition of which is to be learned, and
adds, to the list, the record in which the domain name specified from the IP address in the header information is described in the designated item.

5. The communication apparatus according to claim 1, wherein
the control unit
sets, when the header information of the new packet is notified by the packet transfer unit, control information indicating permission for communication by the new packet in the packet transfer unit in a case of being set to the learning mode and in a case where an item corresponding to a process name is designated as an item a condition of which is to be learned, and
adds, to the list, the record in which the process name specified from the IP address in the header information is described in the designated item.

6. The communication apparatus according to claim 1, wherein
the control unit
sets, when the header information of the new packet is notified by the packet transfer unit, control information indicating permission for communication by the new packet in the packet transfer unit in a case of being set to the learning mode and in a case where an item corresponding to a user name of a process is designated as an item a condition of which is to be learned, and
adds, to the list, the record in which the user name specified from the IP address in the header information is described in the designated item.

7. A communication apparatus with a connection interface for a device, the communication apparatus comprising:
a processor; and
memory storing executable instructions that, when executed by the processor, causes the processor to perform as:
a connection unit that connects a device inserted into the connection interface with the communication apparatus; and
a control unit that controls the connection unit, wherein the connection unit
connects, when a device is inserted into the connection interface, the device with the communication apparatus, and notifies the control unit of identification information of the device,
the control unit
holds a list of records including one or more items in each of which identification information of a device can be described, identification information of a device being described in at least one item, permits the connection between the device and the communication apparatus when the identification information of the device is notified by the connection unit and in a case where the identification information is described in any of the records in the list, and does not permit the connection between the device and the communication apparatus in a case where the identification information is not described in any of the records in the list,
the connection unit disconnects the connection between the device and the communication apparatus in a case where the connection between the device and the communication apparatus is not permitted, and
the control unit
permits, in a case of being set to a learning mode to learn a new record and in a case where an item corresponding to a kind of identification information to be learned is designated, the connection between the device and the communication apparatus when the identification information of the device is notified by the connection unit, and
adds, to the list, the record in which identification information corresponding to the item is described in the designated item.

8. The communication apparatus according to claim 7, wherein
when being notified of identification information of a device by the connection unit while being set to the learning mode,
the control unit permits connection between the device and the communication apparatus and adds, to the list, the record in which identification information corresponding to the designated item is described in the item.

9. The communication apparatus according to claim 7, wherein
the control unit
generates, when being notified of identification information of a device by the connection unit and permitting connection between the device and the communication apparatus while being set to the learning mode, a log in which the identification information is described, and
adds the record, in which identification information corresponding to the designated item is described in the item, to the list of records on the basis of the log when setting of the learning mode is released.

10. A communication system comprising:
a plurality of communication apparatuses; and
a management server that manages the plurality of communication apparatuses, wherein
each of the communication apparatuses includes a processor; and memory storing executable instructions that, when executed by the processor, causes the processor to perform as:
a packet transfer unit that transfers a packet, and
a control unit which sets, with respect to the packet transfer unit, control information that defines an operation of the packet transfer unit according to header information of the packet,
the packet transfer unit
notifies, when receiving a new packet that is a packet for which control information that matches header information is not set yet, the control unit of the header information of the new packet,
the control unit
holds a list of records including a plurality of items in each of which a condition for permitting communication can be described, the condition being described in at least a part of the plurality of items, sets, in the packet transfer unit, the control information indicating permission for communication by the new packet in a case where information included in the header information or information specified from an IP address included in the header information is described in any of the records in the list when the header information is notified by the packet transfer unit, and sets, in the packet transfer unit, the control information indicating non-permission for communication by the new packet in a case where information included in the header information or information specified from the IP address of included in the header information is not described in any of the records in the list,
the control unit
sets, when the header information of the new packet is notified by the packet transfer unit, control information indicating permission for communication by the new packet in the packet transfer unit in a case of being set to a learning mode to learn a new record and in a case where an item corresponding to identification information of a device in a transmission source of a packet is designated as an item a condition of which is to be learned, and
adds a record, in which identification information of a device in a transmission source of the new packet is described in the designated item, to the list and transmits the record to the management server, and
the management server
receives the record, and
stores the record.

11. The communication system according to claim 10, wherein
the management server
distributes a record received by the management server to the control unit of each of the communication apparatuses other than a communication apparatus that transmits the record.

12. The communication system according to claim 10, wherein
the management server
instructs, in a case where the management server receives a record, the control unit of each of the communication apparatuses other than a communication apparatus that transmits the record to delete a record in which identification information of a device described in the record is described.

13. A communication system comprising:
a plurality of communication apparatuses; and
a management server that manages the plurality of communication apparatuses, wherein
each of the communication apparatuses includes
a connection interface for a device,
a processor; and
memory storing executable instructions that, when executed by the processor, causes the processor to perform as:
a connection unit that connects a device inserted into the connection interface with the communication apparatus, and
a control unit that controls the connection unit,
the connection unit
connects, when a device is inserted into the connection interface, the device and the communication apparatus, and notifies the control unit of identification information of the device,
the control unit
holds a list of records including one or more items in each of which identification information of a device can be described, identification information of a device being described in at least one item, permits the connection between the device and the communication apparatus when the identification information of the device is notified by the connection unit and in a case where the identification information is described in any of the records in the list, and does not permit the connection between the device and the communication apparatus in a case where the identification information is not described in any of the records in the list,
the connection unit
disconnects the connection between the device and the communication apparatus in a case where the connection between the device and the communication apparatus is not permitted,
the control unit
permits, in a case of being set to a learning mode to learn a new record and in a case where an item corresponding to a kind of identification information to be learned is designated, the connection between the device and the communication apparatus when the identification information of the device is notified by the connection unit, and
adds a record, in which identification information corresponding to a designated item is described in the item, to the list and transmits the record to the management server, and
the management server
receives the record, and
stores the record.

14. The communication system according to claim 13, wherein
the management server
distributes a record received by the management server to the control unit of each of the communication apparatuses other than a communication apparatus that transmits the record.

15. The communication system according to claim 13, wherein
the management server
instructs, in a case where the management server receives a record, the control unit of each of the communication apparatuses other than a communication apparatus that transmits the record to delete a record in which identification information of a device described in the record is described.

16. A communication control method applied to a communication apparatus including a processor, and memory storing executable instructions that, when executed by the processor, causes the processor to perform as: a packet transfer unit that transfers a packet, and a control unit that sets, with respect to the packet transfer unit, control information that defines an operation of the packet transfer unit according to header information of the packet, the method comprising:
notifying, when receiving a new packet that is a packet for which control information matching header information is not set yet, the control unit of the header information of the new packet,
notifying being performed by the packet transfer unit;
holding a list of records including a plurality of items in each of which a condition for permitting communication can be described, the condition being described in at least a part of the plurality of items, setting, in the packet transfer unit, the control information indicating permission for communication by the new packet in a case where information included in the header information or information specified from an IP address included in the header information is described in any of the records in the list when the header information is notified by the packet transfer unit, and setting, in the packet transfer unit, the control information indicating non-permission for communication by the new packet in a case where information included in the header information or information specified from the IP address included in the header information is not described in any of the records in the list,
holding and setting being performed by the control unit; and
setting, in a case of being set to a learning mode to learn a new record and in a case where an item corresponding to a condition that can be specified from the IP address is designated as an item a condition of which is to be learned, control information indicating permission for communication by the new packet in the packet transfer unit when the header information of the new packet is notified by the packet transfer unit, and
adding, to the list, a record in which a condition specified from the IP address in the header information is described in the designated item,
setting and adding being performed by the control unit.

* * * * *